US011479472B2

(12) United States Patent
Papouchado et al.

(10) Patent No.: US 11,479,472 B2
(45) Date of Patent: Oct. 25, 2022

(54) SYSTEMS AND METHODS TO RECOVER VALUE-ADDED MATERIALS FROM GYPSUM

(71) Applicant: Elixsys, inc., Bainbridge Island, WA (US)

(72) Inventors: Lucien M. Papouchado, Aiken, SC (US); Barry E. Sheetz, Lemont, PA (US); Leonard Passmore, Clarksville, VA (US); Joseph D. Preston, Bainbridge Island, WA (US)

(73) Assignee: Elixsys, Inc., Bainbridge Island, WA (US)

( * ) Notice: Subject to any disclaimer, the term of this patent is extended or adjusted under 35 U.S.C. 154(b) by 0 days.

(21) Appl. No.: 17/321,437

(22) Filed: May 15, 2021

(65) Prior Publication Data

US 2021/0269321 A1 Sep. 2, 2021

Related U.S. Application Data

(63) Continuation-in-part of application No. 16/749,860, filed on Jan. 22, 2020, now Pat. No. 11,148,956.

(60) Provisional application No. 63/149,045, filed on Feb. 12, 2021, provisional application No. 63/025,548, filed on May 15, 2020, provisional application No. 62/878,542, filed on Jul. 25, 2019, provisional application No. 62/824,523, filed on Mar. 27, 2019, provisional application No. 62/810,066, filed on Feb. 25, 2019, provisional application No. 62/796,541, filed on Jan. 24, 2019.

(51) Int. Cl.

| | |
|---|---|
| ***B01D 9/00*** | (2006.01) |
| ***B01D 21/26*** | (2006.01) |
| ***B01D 36/02*** | (2006.01) |
| ***B01D 36/04*** | (2006.01) |
| ***C01C 1/244*** | (2006.01) |
| ***C01F 11/18*** | (2006.01) |

(52) U.S. Cl.

CPC ............ *C01F 11/18* (2013.01); *B01D 9/0022* (2013.01); *B01D 9/0059* (2013.01); *B01D 21/262* (2013.01); *B01D 36/02* (2013.01); *B01D 36/045* (2013.01); *C01C 1/244* (2013.01); *B01D 2009/0086* (2013.01); *C01P 2006/80* (2013.01)

(58) Field of Classification Search

CPC .. B01D 9/0022; B01D 9/0036; B01D 9/0059; B01D 21/262; B01D 36/02; B01D 36/045; B01D 2009/0086; B03D 1/02; B03D 1/08; B03D 1/087; C01C 1/24; C01C 1/244; C01F 7/04; C01F 11/18; C01F 11/182; C01F 11/185; C01F 11/28; C01F 11/46; C01P 2004/50; C01P 2004/64; C01P 2006/80; C01P 2004/03; C01D 3/04

See application file for complete search history.

(56) References Cited

U.S. PATENT DOCUMENTS

| | | | |
|---|---|---|---|
| 4,057,512 | A | 11/1977 | Vadovic et al. |
| 4,092,401 | A | 5/1978 | Dreulle |
| 4,121,945 | A | 10/1978 | Hurst et al. |
| 4,252,777 | A | 2/1981 | McDowell et al. |
| 5,403,496 | A | 4/1995 | Kramer et al. |
| 6,022,406 | A | 2/2000 | Roux et al. |
| 6,027,708 | A | 2/2000 | Rayalu et al. |
| 6,074,458 | A | 6/2000 | Bittner et al. |
| 7,837,961 | B2 | 11/2010 | Boudreault et al. |
| 7,871,583 | B2 | 1/2011 | Jinguo et al. |
| 8,241,594 | B2 | 8/2012 | Boudreault et al. |
| 8,758,719 | B2 | 6/2014 | Hasinoff et al. |
| 9,181,603 | B2 | 11/2015 | Boudreault et al. |
| 9,193,601 | B2 | 11/2015 | Ghosh et al. |

(Continued)

FOREIGN PATENT DOCUMENTS

| | | | |
|---|---|---|---|
| AU | 4319696 | A | 7/1996 |
| CN | 103964480 | A | 8/2014 |

(Continued)

OTHER PUBLICATIONS

"Ammonium Sulfate WFGD Technology—Overview for General Industry Information," Marsulex Enviromental Technologies, Jul. 2007, 6 pages.

Bai G., et al., "Thermal Decomposition of Coal Fly Ash by Concentrated Sulfuric Acid and Alumina Extraction Process Based on It," Fuel Processing Technology, Manuscript Draft, Manuscript No. FUPROC-D-10-00083, Department of Chemistry, College of Science, Xian University of Architecture & Technology, Xian, 710055, China, Jun. 2011, 25 pages.

"Calcium Chloride, A Guide to Physical Properties," Occidental Chemical Corporation, Sep. 5, 2014, pp. 1-9.

(Continued)

*Primary Examiner* — Timothy C Vanoy

(74) *Attorney, Agent, or Firm* — Polsinelli PC

(57) ABSTRACT

Disclosed herein are systems and methods from processing flue gas desulfurization (FGD) gypsum feedstock and ash feedstocks, either separately or together. FGD gypsum conversion comprises reacting FGD gypsum (calcium sulfate) feedstock or phosphogypsum, in either batch or continuous mode, with ammonium carbonate reagent to produce commercial products comprising ammonium sulfate and calcium carbonate. A process to separate the impurities and convert the calcium carbonate to a pure precipitated calcium carbonate is disclosed. These impurities include a concentrate of valuable Rare Earth Elements, and radioactive thorium and uranium. A process to convert calcium sulfite to calcium sulfate using oxygen and a catalyst is also disclosed. Ash conversion comprises a leach process followed by a sequential precipitation process to selectively precipitate products at predetermined pHs resulting in metal hydroxides which may be converted to oxides or carbonates. The processes may be controlled by use of one or more processors.

27 Claims, 61 Drawing Sheets

(56) References Cited

U.S. PATENT DOCUMENTS

| | | | |
|---|---|---|---|
| 9,315,382 | B2 | 4/2016 | Chaifetz et al. |
| 9,382,600 | B2 | 7/2016 | Boudreault et al. |
| 9,410,227 | B2 | 8/2016 | Boudreault et al. |
| 9,534,274 | B2 | 1/2017 | Boudreault et al. |
| 9,556,500 | B2 | 1/2017 | Boudreault et al. |
| 9,682,868 | B2 | 6/2017 | Hasinoff et al. |
| 10,399,862 | B2 | 9/2019 | Paynter et al. |
| 10,626,482 | B2 | 4/2020 | Peterson et al. |
| 10,718,036 | B2 | 7/2020 | Hajiani |
| 2003/0010156 | A1 | 1/2003 | Tedjar et al. |
| 2007/0224109 | A1 | 9/2007 | Chaifetz et al. |
| 2015/0328645 | A1 | 11/2015 | Filippov et al. |
| 2015/0344318 | A1 | 12/2015 | Lee et al. |
| 2016/0185597 | A1 | 6/2016 | Chaifetz et al. |
| 2016/0221834 | A1 | 8/2016 | Hasinoff et al. |
| 2018/0265948 | A1 | 9/2018 | Laudal et al. |
| 2018/0363098 | A1 | 12/2018 | Huang et al. |
| 2019/0153562 | A1 | 5/2019 | Wang et al. |
| 2020/0002784 | A1 | 1/2020 | Peterson et al. |

FOREIGN PATENT DOCUMENTS

| | | | | |
|---|---|---|---|---|
| CN | 105 087 934 | A | * 11/2015 | ............ Y02P 10/20 |
| CN | 105671304 | A | 6/2016 | |
| CN | 105087934 | B | 5/2018 | |
| DE | 2700718 | A1 | 7/1977 | |
| KR | 20200032663 | A | 3/2020 | |
| WO | 9619304 | A1 | 6/1996 | |
| WO | 2013037054 | A1 | 3/2013 | |
| WO | 2013104059 | A1 | 7/2013 | |
| WO | 2013142957 | A1 | 10/2013 | |
| WO | 2014008586 | A1 | 1/2014 | |
| WO | 2016023054 | A1 | 2/2016 | |
| WO | 2016051098 | A1 | 4/2016 | |

OTHER PUBLICATIONS

"Calcium Chloride Handbook, A Guide to Properties, Forms, Storage and Handling," Dow Chemical Company, Aug. 2003, pp. 1-27.

Chou M.I.M., et al., "Manufacture of Ammonium Sulfate Fertilizer for Gypsum-Rich Byproduct of Flue Gas Desulfurization—A Prefeasibility Cost Estimate," Dec. 12, 1996, pp. 580-586.

"DD-6 Activated Alumina, Fluoride and Arsenic Removal," BASF The Chemical Company, 2006, 1 page.

"Duke Energy Coal Combustion Product Management Study," Phase 3—Alternative and Innovative Technologies, Final Report, Electric Power Research Institute, May 2016, 77 pages.

Fenelonov V.B., et al., "The Properties of Cenospheres and the Mechanism of Their Formation During High-Temperature Coal Combustion at Thermal Power Plans," KONA Powder and Particle, 2010, Journal No. 28, pp. 189-208.

Ferrarini S.F., et al., "Integrated Synthesis of Zeolites Using Coal Fly Ash: Element Distribution in the Products, Washing Waters and Effluent," Journal of the Brazilian Chemical Society, 2016, vol. 27 (11), pp. 2034-2045.

Gray L.M., et al., "Physical Cleaning of High Carbon Fly Ash," Apr. 20, 2002, 14 pages.

International Search Report and Written Opinion for International Application No. PCT/US2020/015102, dated Apr. 20, 2020, 9 pages.

Izquierdo M., et al., "Leaching behaviour of elements from coal combustion fly ash: an overview," May 2012, pp. 1-34.

Li S., et al., "An Efficient Approach for Lithium and Aluminum Recovery from Coal Fly Ash by Pre-Desilication and Intensified Acid Leaching Processes," Metals, 2017, vol. 7 (272), pp. 1-12.

Liu N., et al., "Extraction of Aluminum from Coal Fly Ash by Alkali Activation with Microwave Heating," Journal of Residuals Science & Technology, 2016, vol. 13, Suppl. 1, pp. S181-S187.

Lokeshappa B., et al., "Single Step Extractions of Metals in Coal Fly Ash," Resources and Environment, 2012, vol. 2 (2), pp. 1-8.

Murtha M.J., et al., "Recovery of Alumina From Coal Fly Ash by High Temperature Chlorination," Proceedings of the Iowa Academy of Science, 1976, vol. 83 (4), Article 4, pp. 125-129.

Renew J.E., et al., "Impact of Salt on Metal Leaching From Coal Fly Ash," World of Coal Ash (WOCA), Conference in Nashville, TN, May 5-7, 2015, 25 pages.

Scheetz B.E., "Chemistry and Mineralogy of Coal Fly Ash: Basis for Beneficial Use," Materials Research Institute, The Pennsylvania State University, Jan. 2004, pp. 1-10.

Sedres G., "Recovery of SiO2 and Al2O3 from Coal Fly Ash," A Thesis submitted in Fulfilment of the Requirements for the Degree of Magister Scientiae in the Department of Chemistry, University of Western Cape, May 2016, 161 pages.

Sheherban S., "Ash Utilization With Silica and Metals Recovery," The International Association of Sciences Inc, Dec. 31, 1996, pp. 1138-1142.

Tolhurst L., "Commercial Recovery of Metals from Coal Ash," World of Coal Ash (WOCA), Conference in Nashville, TN, May 5-7, 2015, 9 pages.

"Sumitomo Chemical," Product Databook, Dec. 2015, 16 pages.

Wazne M., et al., "Production of Ammonium Sulfate Fertilizer from Waste Gypsum," Nov. 18, 2009, pp. 1-5.

Yao Z.T., et al., "A Review of the Alumina Recovery From Coal Fly Ash, With a Focus in China," Fuel, Mar. 15, 2014, vol. 120, pp. 74-85.

* cited by examiner

Production Plant process for FGD gypsum conversion

FGD gypsum composition used in preliminary testing

| FGD Gypsum Feedstock Composition | | | |
|---|---|---|---|
| Element | % | Element | g/t |
| Si | 0.25 | Ag | < 2 |
| Al | 0.08 | As | < 30 |
| Fe | 0.06 | Ba | 7.3 |
| Mg | 0.11 | Be | < 0.03 |
| Ca | 23.3 | Bi | < 20 |
| K | 0.02 | Cd | < 2 |
| Ti | 0.01 | Co | < 4 |
| P | < 0.01 | Cu | < 4 |
| Mn | < 0.01 | Li | < 70 |
| Cr | < 0.01 | Mo | <5 |
| V | < 0.01 | Na | 40 |
| LOI | 21.3 | Ni | < 20 |
| S | 16.4 | Pb | < 20 |
| C(t) | 0.16 | Sb | < 30 |
| | | Se | < 30 |
| | | Sn | < 20 |
| | | Sr | 310 |
| | | Tl | < 30 |
| | | U | < 20 |
| | | Y | 0.7 |
| | | Zn | < 7 |

Fig. 3

Particle size distribution of the FGD used in preliminary testing

Ammonium Sulfate product composition

| Ammonium Sulfate Crystal Assay (g/t) | | | |
|---|---|---|---|
| Y | <0.2 | Cd | <2 |
| U | <20 | Co | <4 |
| Si | <700 | Cr | <4 |
| Al | 6 | Cu | <0.5 |
| Fe | 269 | Li | <5 |
| Mg | 16 | Mo | <5 |
| Ca | 489 | Ni | <20 |
| Na | <10 | Pb | <20 |
| K | <20 | Sb | <10 |
| Ti | 3.4 | Se | <30 |
| P | <30 | Sn | <20 |
| Mn | <0.3 | Sr | 13.2 |
| Ag | <2 | Tl | <30 |
| As | <30 | V | <2 |
| Ba | 4.6 | Zn | <8 |
| Be | <0.03 | C(t) | 0.09% |
| Bi | <20 | S(t) | 21.8% |
| Impurities > DL | | 0.17% | |

Fig. 6

Results from initial FGD test conversions

Test Conditions

| Test ID | C3 | C5 | C6 | C7 | C9 | C10 | C11 | C12 | C13 | C14 | C15 |
|---|---|---|---|---|---|---|---|---|---|---|---|
| Feed | FGD | FGD | FGD | FGD | FGD | FGD | FGD | FGD | FGD | FGD | FGD |
| Initial % Solids | 25 | 25 | 25 | 100 | 50 | 25 | 25 | 25 | 100 | 25 | 100 |
| Final % Solids | 10 | 11 | 12 | 10 | 16 | 7 | 16 | 12 | 6 | 17 | 11 |
| Reagent | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ |
| Reagent Strength (%) | 100 | 100 | 100 | 30 | 100 | 100 | 100 | 100 | 15 | 100 | 15 |
| Reagent Add'n Method | 130% per hour | 100% per hour | 100% per hour | 100% per hour | 100% per hour | 100% per hour | 100% at t=0 | 200% at t=0 | 100% per hour | 150% at t=0 | 200% at t=0 |
| Total Dose (% stoich.) | 390 | 300 | 300 | 300 | 300 | 300 | 100 | 200 | 300 | 150 | 200 |
| Retention Time (h) | 3 | 3 | 3 | 3 | 3 | 3 | 3 | 3 | 3 | 3 | 3 |
| Temperature (°C) | ambient | ambient | ambient | ambient | ambient | ambient | ambient | ambient | ambient | ambient | ambient |
| Seeding/Catalyst | none | none | none | none | none | none | none | none | none | none | none |
| Weight Loss (%) | 42 | 41 | 40 | 44 | 44 | 30 | 36 | 43 | 44 | 43 | 44 |
| Final Solids Colour | tan | lt. brown/grey | lt. brown/grey | lt. brown/grey | grey | v lt grey | grey | grey | grey | tan | tan |

Fig. 7

Calculated Final ammonium sulfate purity based on ICP and WRA

| Test ID | Solution Grade $(NH_4)_2SO_4$ (%)[1] | $CaCO_3$ | Grade (%) |
|---|---|---|---|
| | | by Ca | by WRA[2] |
| **C3** | 99.981 | 95 | 99 |
| **C5** | 99.995 | 94 | 99 |
| **C6** | 99.996 | 94 | 99 |
| **C7** | 99.997 | 98 | 99 |
| **C9** | 99.991 | 99 | 99 |
| **C10** | 99.996 | 97 | 98 |
| **C11** | 99.995 | 70 | 99 |
| **C12** | 99.985 | 97 | 99 |
| **C13** | 99.999 | 97 | 99 |
| **C14** | 99.988 | 97 | 99 |
| **C15** | 99.996 | 97 | 99 |
| **C16** | 99.998 | 98 | 98 |
| **C17** | 99.990 | 96 | 98 |
| **C18** | 99.997 | 97 | 98 |
| **C19** | 99.993 | 91 | 98 |
| **C20** | 99.992 | 95 | 98 |
| **C21** | 99.992 | 95 | 98 |
| **C22** | 99.993 | 96 | 99 |

[1] Sum of elements in ICP scan above DL's, C(t) excluded

[2] Impurity Whole Rock Analysis oxide basis (100% - impurities

Fig. 8

Schematic of continuous pilot plant demonstration

Exemplary products produced by the continuous pilot plant

Composition of Ammonium Sulfate Crystal Product by the pilot plant

| Test # | Composition—Analytical | | | Composition—XRD | | | | | |
|---|---|---|---|---|---|---|---|---|---|
| | Purity, % | Impurity, g/t | S% by Leco | $(NH_4)_2SO_4$ | $N_2O_5\bullet(SO_3)_4$ | $(NH_4)_3H(SO_4)_2$ | $(NH_4)_5(NO_3)_3SO_4$ | N% by XRD | S% by XRD |
| PP2-Ev1 | 99.94 | 642 | 23.1 | 97.5 | 1.0 | 1.4 | - | 21.0 | 24.3 |
| PP2-Ev2 | 99.84 | 1557 | 23.5 | 98.8 | 1.2 | - | - | 21.0 | 24.3 |
| PP2-Ev3 | 99.90 | 986 | 23.3 | 96.8 | 1.0 | 0.7 | 1.5 | 21.2 | 24.1 |
| PP2-Ev4 | 99.95 | 534 | 23.1 | 98.0 | 0.9 | 0.5 | 0.6 | 21.1 | 24.2 |
| TEC-1 | 99.91 | 879 | 21.9 | 100.0 | - | - | - | 21.2 | 24.3 |
| TEC-2 | 99.98 | 233 | 22.5 | 100.0 | - | - | - | 21.2 | 24.3 |

Fig. 13

Calcium Carbonate Whitening Process

Calcium carbonate whitened product

Catalyst process to separate the impurities from the calcium carbonate product

Major components of Class F and Class C ashes

| Ash Feedstock Bulk % Composition Major Earth Forming Oxides | | |
|---|---|---|
| Major Oxides | Class F | Class C |
| $SiO_2$ | 35.1 | 26.2 |
| $Al_2O_3$ | 18.1 | 16.4 |
| $Fe_2O_3$ | 16 | 8.15 |
| MgO | 1.1 | 6.28 |
| CaO | 13.3 | 25.7 |
| $Na_2O$ | 1.11 | 2.73 |
| $K_2O$ | 1.3 | 0.67 |

Fig. 22

Ash Feedstock Composition
Major, Minor, and Trace Metals

| Analyte (%) | Class F Ash | Class C Ash |
|---|---|---|
| $SiO_2$ | 35.1 | 26.2 |
| $AL_2O_3$ | 18.1 | 16.4 |
| $Fe_2O_3$ | 16 | 8.15 |
| MgO | 1.1 | 6.28 |
| CaO | 13.3 | 25.7 |
| $Na_2O$ | 1.11 | 2.73 |
| $K_2O$ | 1.31 | 0.67 |
| $TiO_2$ | 0.91 | 1.37 |
| $P_2O_5$ | 0.33 | 1.8 |
| MnO | 0.03 | 0.02 |
| $Cr_2O_3$ | 0.01 | 0.01 |
| $V_2O_5$ | 0.03 | 0.04 |
| LOI | 10 | 3.55 |
| Sum | 97.3 | 92.9 |
| C(t) | 4.74 | 2.49 |
| S | 1.59 | 2.09 |

| Analyte (g/t) | Class F Ash | Class C Ash |
|---|---|---|
| La | 47 | 65 |
| Ce | 98 | 124 |
| Pr | 11.9 | 13.5 |
| Nd | 45 | 56 |
| Sm | 10.2 | 11.6 |
| Eu | 1.9 | 2.9 |
| Gd | 9 | 10 |
| Tb | 1.6 | 1.5 |
| Dy | 7.5 | 9.1 |
| Ho | 1.6 | 1.8 |
| Y | 43.6 | 46 |
| Er | 4.2 | 5.6 |
| Tm | 0.7 | 0.9 |
| Yb | 5.7 | 4.7 |
| Lu | 1 | 0.7 |
| Sc | < 25 | < 25 |
| Th | 17.8 | 23.6 |
| U | 5.6 | 9.8 |

| Analyte (g/t) | Class F Ash | Class C Ash |
|---|---|---|
| Ag | < 2 | < 2 |
| As | < 100 | < 30 |
| Ba | 1370 | 7890 |
| Be | 6.97 | 4.25 |
| Bi | < 20 | < 20 |
| Cd | < 2 | < 4 |
| Co | 28 | 43 |
| Cu | 68.2 | - |
| Li | 74 | 8 |
| Mo | < 9 | < 30 |
| Ni | 61 | 109 |
| Pb | < 60 | 102 |
| Sb | < 10 | < 10 |
| Se | < 30 | < 60 |
| Sn | < 20 | < 50 |
| Sr | 1750 | 3360 |
| Ti | < 30 | < 30 |
| Zn | 105 | 275 |

Fig. 23

Mineralogical Compositions of the Ash Feedstocks

Mineralogical Composition of the Ashes
Semi-quantitative XRD

| Formula | Mineral | Class F Ash | Class C Ash |
|---|---|---|---|
| | | (wt %) | (wt %) |
| $SiO_2$ | Quartz | 12.6 | 7.3 |
| $SiO_2$ | Tridymite | 5.7 | - |
| $Al_6Si_2O_{13}$ | Mullite | 18.5 | 11.4 |
| $NaAlSi_3O_8$ | Albite | 10.0 | 13.3 |
| $KAlSi_3O_8$ | Microcline | 8.1 | 2.9 |
| $(Al_2Si_2)_5(OH)_4$ | Kaolinite | - | 7.4 |
| $Fe_2O_3$ | Hematite | 6.2 | 2.5 |
| $FeCl_3$ | Iron Chloride | - | 8.2 |
| $\gamma$-$Fe_2O_3$ | Maghemite | 8.0 | - |
| $FeCO_3$ | Siderite | 3.4 | - |
| $FeTiO_3$ | Ilmenite | - | 2.1 |
| $CaSO_4$ | Anhydrite | 6.8 | 15.2 |
| $CaCO_3$ | Calcite | 3.2 | - |
| $Ca_5(PO_4)_3OH$ | Hydroxylapatite | - | 3.5 |
| CaO | Calcium Oxide | - | 13.2 |
| $Ca(OH)_2$ | Portlandite | 10.5 | - |
| CaO | Lime | - | 1.7 |
| $CaMg(CO_3)$ | Dolomite | 3.1 | - |
| MgO | Periclase | - | 5.7 |
| $Ba(Sr)SO_4$ | Barite, Strontian | - | 1.6 |
| C | Graphite | 3.0 | 2.4 |
| $TiO_2$ | Anatase | 0.9 | - |
| NaCl | Halite | - | 1.7 |
| | TOTAL | 100 | 100 |

Fig. 24

Ash Leaching results with HCL and HNO3 3:1

| Leaching Results (6 hrs) 3:1 6N HCl / 6N $HNO_3$ (14% Solids) | | |
|---|---|---|
| Element | Class F % Extract | Class C % Extract |
| Si | 0 | 0 |
| Al | 67 | 92 |
| Fe | 88 | 93 |
| Mg | 86 | 94 |
| Ca | 95 | 89 |
| Na | 72 | 84 |
| K | 61 | 72 |
| Ti | 49 | 8 |
| P | 88 | 51 |
| Mn | 81 | 90 |
| TREE | 75 | 88 |
| C(t) | 1 | 2 |
| S(t) | 72 | 17 |

Fig. 25

Ash Leaching results with H2SO4 and 0.006N NaF

| Leaching Results (6 hrs) 6N $H_2SO_4$ + 0.006N NaF (14% Solids) | | |
|---|---|---|
| Element | Class F % Extract | Class C % Extract |
| Si | 0 | 1 |
| Al | 50 | 91 |
| Fe | 52 | 89 |
| Mg | 76 | 92 |
| Ca | 3 | 2 |
| Na | 58 | 79 |
| K | 45 | 67 |
| Ti | 37 | 81 |
| P | 80 | 96 |
| Mn | 68 | 83 |
| TREE | 12 | 3 |
| C(t) | 1 | 2 |
| S(t) | 88 | 75 |

Fig. 26

Ash Leching results with H2SO4 and 0.05% CaF2

| Leaching Results (6 hrs) 6N $H_2SO_4$ + 0.05% $CaF_2$ (14% Solids) | | |
|---|---|---|
| Element | Class F % Extract | Class C % Extract |
| Si | 0 | 1 |
| Al | 56 | 87 |
| Fe | 56 | 85 |
| Mg | 79 | 89 |
| Ca | 2 | 2 |
| Na | 60 | 78 |
| K | 49 | 69 |
| Ti | 45 | 80 |
| P | 80 | 92 |
| Mn | 69 | 83 |
| TREE | 11 | 4 |
| C(t) | | |
| S(t) | 87 | 73 |

Fig. 27

Ash leaching results with pH 1.5 HCl and 11 % HCL

| Leaching Results HCl 1.5 pH then 11% HCl (4hr each stage) | | |
|---|---|---|
| Element | Class F % Extract | Class C % Extract |
| Si | 0 | 0 |
| Al | 37 | 94 |
| Fe | 57 | 92 |
| Mg | 68 | 96 |
| Ca | 93 | 97 |
| Na | 42 | 87 |
| K | 4 | 83 |
| Ti | 27 | 6 |
| P | 81 | 54 |
| Mn | 83 | 90 |
| TREE | 49 | 78 |
| C(t) | 18 | 3 |
| S(t) | 93 | 91 |

Fig. 28

Ash leaching results with pH 1.5 HCl and 30 % HCL

| Leaching Results<br>HCl 1.5 pH then 30% HCl<br>(4hr each stage) | | |
|---|---|---|
| Element | Class F<br>% Extract | Class C<br>% Extract |
| Si | 5 | 0 |
| Al | 55 | 92 |
| Fe | 88 | 93 |
| Mg | 81 | 94 |
| Ca | 94 | 94 |
| Na | 60 | 83 |
| K | 53 | 75 |
| Ti | 43 | 35 |
| P | 90 | 67 |
| Mn | 77 | 90 |
| TREE | 66 | 85 |
| C(t) | 1 | 5 |
| S(t) | 33 | 66 |

Fig. 29

Ash leaching results with 30% HCl after 24 hours

| Leaching Results 30% HCl 24hrs | |
|---|---|
| Element | Class C % Extract |
| Si | 0 |
| Al | 95 |
| Fe | 98 |
| Mg | 98 |
| Ca | 97 |
| Na | 86 |
| K | 79 |
| Ti | 47 |
| P | 73 |
| Mn | 99 |
| TREE | 91 |
| C(t) | 7 |
| S(t) | 83 |

Fig. 30

XRD analysis of Class C and Class F ash leach residues

| Composition | Class C Residue (wt %) | Class F Residue (wt %) |
|---|---|---|
| $NaAlSi_3O_8$ | 7.2 | 16.7 |
| $BaSO_4$ | - | 6.5 |
| $TiO_2$ | 0.9 | - |
| $CaCO_3$ | 1.5 | - |
| $CaMg(CO_3)$ | 2.5 | - |
| C | 8.1 | 5.9 |
| $Fe_2O_3$ | 7.3 | 3.1 |
| $Ca_5(PO_4)_3OH$ | - | 9.8 |
| $FeTiO_3$ | - | 2.7 |
| $Fe_3O_4$ | 4.0 | - |
| $\sim Al_6Si_3O_{15}$ | 25.4 | 1.0 |
| $KAlSi_3O_8$ | 7.2 | 4.9 |
| $SiO_2$ | 35.7 | 49.6 |
| | 100 | 100 |

Fig. 34

Cumulative precipitation % versus pulp pH for Class C ash using caustic

Percentage composition of precipitate Hydroxides at different pHs using Caustic

| % Composition of Precipitate Hydroxides at Different pHs | | | | | | | | | | | | | |
|---|---|---|---|---|---|---|---|---|---|---|---|---|---|
| pH 3 | | pH 4 | | pH 5-8 | | pH 9 | | pH 10 | | pH 11 | | pH 13 | |
| Fe | 87.500 | Al | 88.53 | Al | 56.36 | Mn | 71.8 | Mg | 75.4 | Mg | 100 | Ca | 100 |
| Al | 6.700 | Fe | 4.01 | Mg | 11.05 | Ni | 14.1 | Ca | 24.6 | | | | |
| pH 3 | 4.800 | Na | 3.57 | Ce | 7.22 | La | 8.7 | | | | | | |
| Ti | 0.379 | Mg | 1.83 | Zn | 6.08 | Zn | 5.4 | | | | | | |
| V | 0.372 | Ca | 1.27 | Nd | 3.59 | | | | | | | | |
| Cr | 0.120 | P | 0.40 | Pb | 3.32 | | | | | | | | |
| Mo | 0.065 | Zn | 0.20 | Y | 3.07 | | | | | | | | |
| Sc | 0.023 | K | 0.07 | Mn | 2.98 | | | | | | | | |
| Th | 0.007 | Ni | 0.06 | La | 1.85 | | | | | | | | |
| U | 0.007 | V | 0.02 | Pr | 0.87 | | | | | | | | |
| | | Sr | 0.02 | Ni | 0.77 | | | | | | | | |
| | | Y | 0.02 | Sm | 0.64 | | | | | | | | |
| | | Li | 0.02 | Gd | 0.60 | | | | | | | | |
| | | U | 0.01 | Dy | 0.46 | | | | | | | | |
| | | Ce | 0.01 | Cu | 0.33 | | | | | | | | |
| | | Nd | 0.01 | Er | 0.22 | | | | | | | | |
| | | Co | 0.01 | Yb | 0.18 | | | | | | | | |
| | | Cr | 0.01 | Eu | 0.14 | | | | | | | | |
| | | Mo | 0.01 | Fe | 0.11 | | | | | | | | |
| | | | | Ho | 0.09 | | | | | | | | |
| | | | | Tb | 0.06 | | | | | | | | |
| | | | | Ag | 0.01 | | | | | | | | |

Fig. 38

Cations and anions for the sodium chloride final stream for class C ash after caustic neutralization

| Cations | mg/L | Anions |
|---|---|---|
| Al | 0.3 | |
| Cations | 66.7 | |
| Na | 53,000 | Chloride |
| K | 363 | |
| Ba | 2.23 | |
| Sr | 151 | |

Fig. 46

Precipitation results versus pH for class C ash using the lime flowsheet

| Test # | P19 | | P21 | | P22 | | P23 | | P32 | |
|---|---|---|---|---|---|---|---|---|---|---|
| PPt weight | 17g | | 50g | | 5g | | 8g | | | |
| pH & % | 2.5 | % | 4 | % | 9 | % | 11 | % | $Na_2CO_3$ | % |
| Al | 1.28 | 3.45 | 19.0 | 72.5 | 6.54 | 17.68 | 0.15 | 0.37 | 0.0 | 0.03 |
| Fe | 32.5 | 87.58 | 0.50 | 1.9 | 2.51 | 6.79 | 0.06 | 0.15 | 0.0 | 0.02 |
| Mg | 1.04 | 2.80 | 0.65 | 2.5 | 25.10 | 67.86 | 37.1 | 91.83 | 0.0 | 0.02 |
| Ca | 0.44 | 1.18 | 5.52 | 21.1 | 1.30 | 3.51 | 2.91 | 7.20 | 38.5 | 99.03 |
| Na | 0.04 | 0.11 | 0.33 | 1.3 | 0.08 | 0.23 | 0.08 | 0.19 | 0.3 | 0.74 |
| K | 0.03 | 0.08 | 0.09 | 0.3 | 0.01 | 0.03 | 0.02 | 0.05 | 0.0 | 0.03 |
| P | 1.74 | 4.69 | <0.04 | 0.2 | 0.02 | 0.06 | 0.01 | 0.03 | 0.0 | 0.03 |
| Mn | 0.01 | 0.02 | 0.003 | 0.0 | 0.37 | 1.00 | 0.005 | 0.01 | 0.0 | 0.03 |
| TREE | 0.02 | | 0.03 | | 0.53 | 1.43 | 0.02 | 0.05 | | |
| La-Sm | 0.01 | | 0.03 | | 0.41 | | 0.02 | | | |
| Eu-Lu,Y | 0.00 | | 0.01 | | 0.12 | | 0.00 | | | |
| TOTALS | 37.11 | | 26.2 | | 36.99 | | 40.37 | | 38.9 | |

Fig. 48

Optional Process for burning off carbon from the silica product

Optional process for refining the silica product

Sulfite to Sulfate conversion Process using Oxygen and Mn catalyst

Sulfite to sulfate conversion using 50% oxygen + Mn catalyst
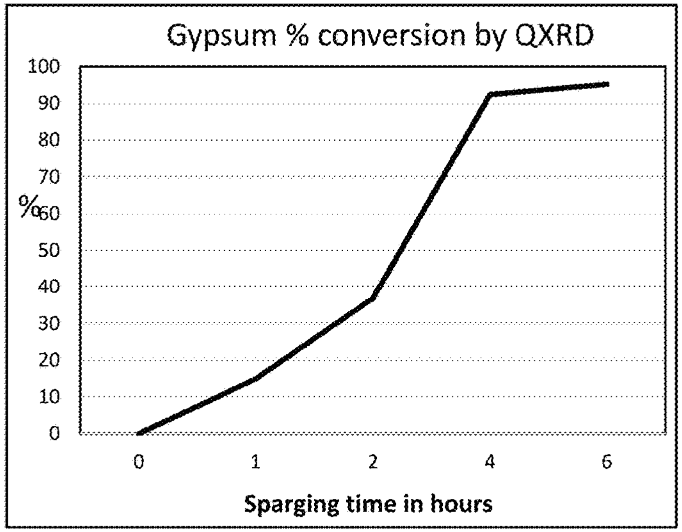
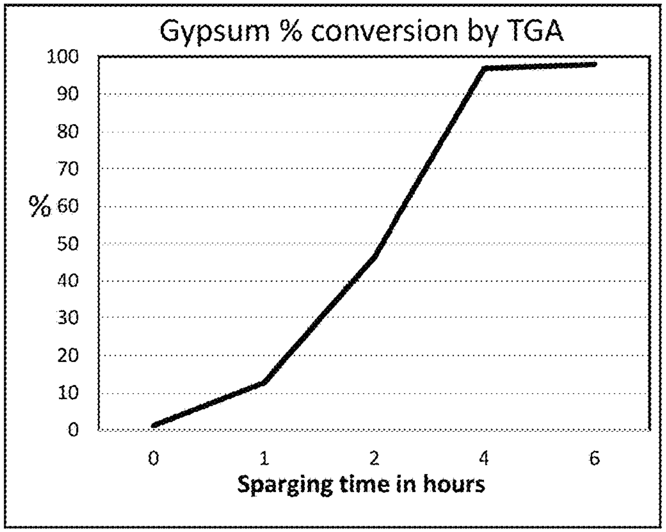
| | 0 | 1 | 2 | 4 | 6 |
|---|---|---|---|---|---|
| Amorphous | 43.84 | 30.53 | 23.32 | 7.64 | 4.84 |
| Gypsum ($CaSO_4 \cdot 2H_2O$) | 0 | 14.88 | 36.83 | 92.35 | 95.15 |
| Hannebachite (CaSO3·H2O) | 56.75 | 52.45 | 37.83 | 0 | 0 |
| Calcite (CaCO3) | 0 | 2.13 | 1.13 | 0 | 0 |
| | 0 | 1 | 2 | 4 | 6 |
|---|---|---|---|---|---|
| Gypsum ($CaSO_4 \cdot 2H_2O$) | 1.24 | 12.68 | 46.39 | 96.84 | 97.88 |
| Hannebachite (CaSO3·H2O) | 93.56 | 83.29 | 51.98 | 2.88 | 2.12 |
| Calcite (CaCO3) | 0 | 3.53 | 1.62 | 0 | 0 |
Fig. 52

Sulfite to sulfate conversion using 10% oxygen + Mn catalyst
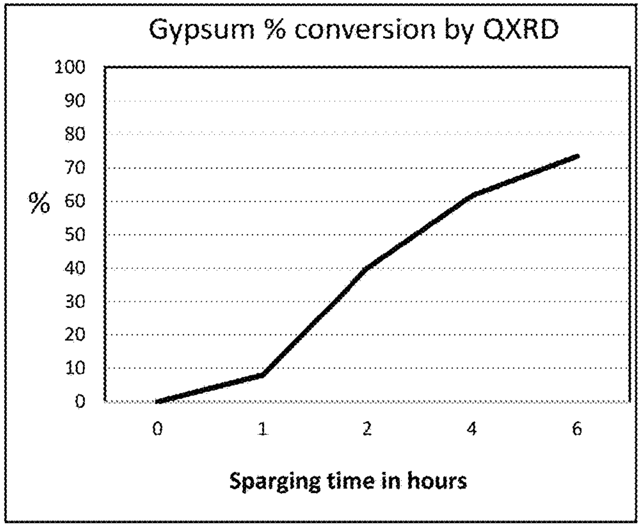
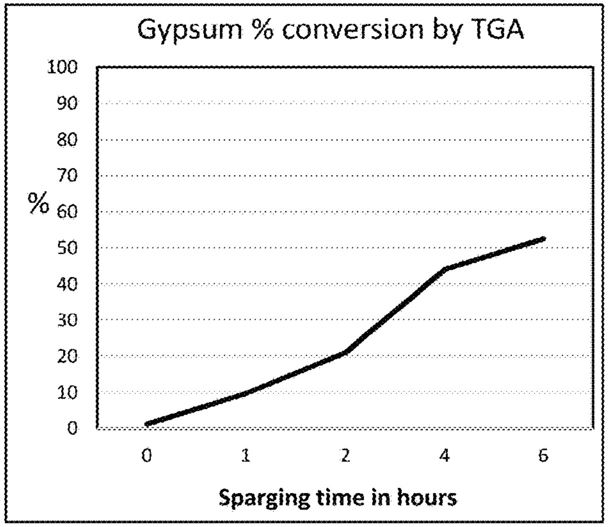
| | 0 | 1 | 2 | 4 | 6 |
|---|---|---|---|---|---|
| Amorphous | 43.94 | 40.31 | 17.4 | 13.22 | 7.74 |
| Gypsum ($CaSO_4 \cdot 2H_2O$) | 0 | 7.83 | 40 | 61.66 | 73.42 |
| Hannebachite (CaSO3·H2O) | 56.75 | 44.57 | 32.72 | 24.76 | 18.71 |
| Calcite (CaCO3) | 0 | 7.17 | 0.87 | 0 | 0 |
| | 0 | 1 | 2 | 4 | 6 |
|---|---|---|---|---|---|
| Gypsum ($CaSO_4 \cdot 2H_2O$) | 1.24 | 9.69 | 20.95 | 44.15 | 52.58 |
| Hannebachite (CaSO3·H2O) | 93.56 | 81.78 | 68.68 | 50.91 | 42.07 |
| Calcite (CaCO3) | 0 | 8.58 | 10.3 | 4.91 | 5.33 |
Fig. 53

Sulfite to sulfate conversion using air without oxygen addition

| | 0 | 1 | 2 | 4 | 6 |
|---|---|---|---|---|---|
| Amorphous | 43.94 | 40.26 | 48.33 | 35.28 | 32.85 |
| Gypsum ($CaSO_4 \cdot 2H_2O$) | 0 | 7.37 | 10.3 | 20.84 | 28.88 |
| Hannebachite (CaSO3·H2O) | 56.75 | 44.98 | 35.9 | 38.57 | 33.34 |
| Calcite (CaCO3) | 0 | 6.45 | 5.47 | 5.25 | 4.91 |

| | 0 | 1 | 2 | 4 | 6 |
|---|---|---|---|---|---|
| Gypsum ($CaSO_4 \cdot 2H_2O$) | 1.24 | 7.58 | 13.04 | 21.54 | 31.55 |
| Hannebachite (CaSO3·H2O) | 93.56 | 85.56 | 78.33 | 70 | 65.47 |
| Calcite (CaCO3) | 0 | 6.85 | 8.61 | 8.44 | 2.97 |

Example of a phosphogypsum assay

| | % |
|---|---|
| Ca % | 26.0 |
| S % | 15.7 |
| Si % | 1.25 |
| | **43.0** |
| P % | 0.066 |
| C % | 0.040 |
| Al % | 0.036 |
| Na % | 0.033 |
| Sr % | 0.031 |
| Fe % | 0.029 |
| Ti % | 0.025 |
| Ba % | 0.018 |
| | **0.278** |

| | ppm |
|---|---|
| K g/t | 49 |
| Cr g/t | 7 |
| Mg g/t | 6 |
| Mn g/t | 4 |
| V g/t | 4 |
| Be g/t | 0.1 |
| | **70.1** |

| | ppm |
|---|---|
| Li g/t | < 80 |
| As g/t | < 30 |
| Se g/t | < 30 |
| Ni g/t | < 20 |
| Pb g/t | < 20 |
| Sn g/t | < 20 |
| Bi g/t | < 20 |
| Sb g/t | < 10 |
| Mo g/t | < 5 |
| Co g/t | < 4 |
| Cu g/t | < 3 |
| Ag g/t | < 2 |
| Cd g/t | < 2 |
| Zn g/t | < 2 |
| Hg g/t | < 0.3 |

| REE | ppm |
|---|---|
| Ce g/t | 120 |
| La g/t | 66 |
| Y g/t | 53 |
| Nd g/t | 44 |
| Pr g/t | 12.6 |
| Gd g/t | 7.2 |
| Sm g/t | 6.7 |
| Dy g/t | 6.3 |
| Er g/t | 4.9 |
| Yb g/t | 3.5 |
| Eu g/t | 1.9 |
| Ho g/t | 1.5 |
| Tb g/t | 0.9 |
| Tm g/t | 0.6 |
| | **329.1** |
| Tl g/t | < 30 |
| Sc g/t | < 25 |
| Lu g/t | < 0.5 |

| | |
|---|---|
| Th g/t | 11.6 |
| U g/t | 4.6 |

Fig. 55

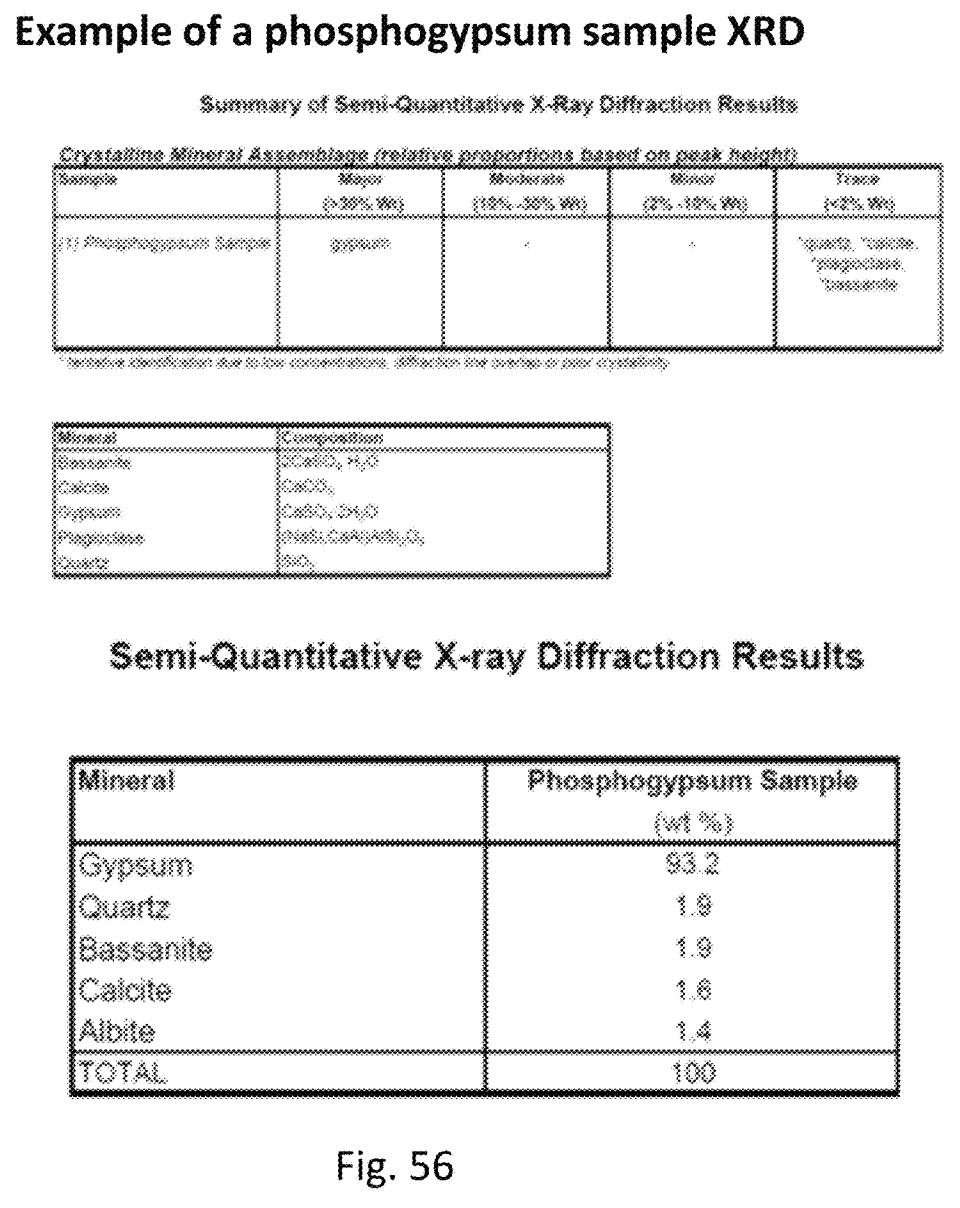

Example of a phosphogypsum sample XRD

Summary of Semi-Quantitative X-Ray Diffraction Results

*Crystalline Mineral Assemblage (relative proportions based on peak height)*

| Sample | Major (>30% Wt) | Moderate (10%-30% Wt) | Minor (2%-10% Wt) | Trace (<2% Wt) |
|---|---|---|---|---|
| (1) Phosphogypsum Sample | gypsum | - | - | *quartz, *calcite, *plagioclase, *bassanite |

[illegible]

| Mineral | Composition |
|---|---|
| Bassanite | $2CaSO_4 \cdot H_2O$ |
| Calcite | $CaCO_3$ |
| Gypsum | $CaSO_4 \cdot 2H_2O$ |
| Plagioclase | $(NaSi,CaAl)AlSi_2O_8$ |
| Quartz | $SiO_2$ |

Semi-Quantitative X-ray Diffraction Results

| Mineral | Phosphogypsum Sample (wt %) |
|---|---|
| Gypsum | 93.2 |
| Quartz | 1.9 |
| Bassanite | 1.9 |
| Calcite | 1.6 |
| Albite | 1.4 |
| TOTAL | 100 |

Fig. 56

Production Plant process for Phosphogypsum conversion

Module 1– Calcium Carbonate Whitening PG

Scanning Electron Micrograph of our Nanoparticle Sized Precipitated Calcium Carbonate

Scanning Electron Micrograph of Fibrous Mullite Crystals I

SYSTEMS AND METHODS TO RECOVER VALUE-ADDED MATERIALS FROM GYPSUM

RELATED APPLICATIONS

This application takes priority to U.S. Patent App. No. 63/025,548, entitled Systems and Methods to Oxidize Calcium Sulfite From Flue Gas Desulfurization Scrubbers to Calcium Sulfate, filed May 15, 2020, and to U.S. Patent App. No. 63/149,045 entitled Systems and Methods to Recover Value-Added Materials from Gypsum, filed Feb. 12, 2021, the entire contents of which are incorporated herein by reference. This application also is a continuation-in-part of U.S. patent application Ser. No. 16/749,860, entitled Systems and Methods to Treat Flue Gas Desulfurization Waste to Produce Ammonium Sulfate and Calcium Carbonate Products, filed Jan. 22, 2020, now U.S. Pat. No. 11,148,956, issued Oct. 19, 2021, which takes priority to U.S. Patent App. No. 62/878,542, entitled Systems and Methods for Pretreatment of Feedstocks Comprising Sulfites, filed Jul. 25, 2019, U.S. Patent App. No. 62/824,523, entitled Reducing the Cost of Reagents for Treating Metal Bearing Wastes, filed Mar. 27, 2019, U.S. Patent App. No. 62/810,066, entitled Removal of Chloride from Flue Gas Desulfurization Feed, filed Feb. 25, 2019, and U.S. Patent App. No. 62/796,541, entitled Systems and Methods to Treat Flue Gas Desulfurization (FGD) Waste to Produce High Purity Ammonium Sulfate and Calcium Carbonate Products, filed Jan. 24, 2019, the entire contents of which are incorporated herein by reference. This application is related to U.S. Patent App. No. 62/796,549, entitled Systems and Methods to Chemically Treat Metal-bearing Waste Streams to Recover Value-added Materials, filed Jan. 24, 2019, U.S. Patent App. No. 62/796,550, entitled Systems and Methods to Chemically Treat Metal-bearing Waste Streams to Recover Value-added Materials, filed Jan. 24, 2019, U.S. patent application Ser. No. 16/749,860 entitled Systems and Methods to Treat Flue Gas Desulfurization Waste to Produce High Purity Ammonium Sulfate and Calcium Carbonate Products, filed Jan. 22, 2020, and U.S. patent application Ser. No. 16/752,477 entitled Systems and Methods to Chemically Treat Metal-Bearing Waste Streams to Recover Value-Added Materials, filed Jan. 24, 2020, PCT App. No. PCT/US2020/015102 entitled Systems and Methods to Treat Flue Gas Desulfurization and Metal-Bearing Waste Streams to Recover Value-Added Materials, filed Jan. 24, 2020, the entire contents of which are incorporated herein by reference.

The above-incorporated material constitutes “essential material” within the meaning of 37 CFR 1.57(d)(1)-(3), applicant(s) have included the specification to expressly recite the essential material that is incorporated by reference as allowed by the applicable rules.

INVENTORS

| | | | |
|---|---|---|---|
| Lucien M. Papouchado | US Citizen | US Resident | Aiken, SC |
| Barry E. Sheetz | US Citizen | US Resident | Lemont, PA |
| Leonard Passmore | US Citizen | US Resident | Clarksville, VA |
| Joseph D. Preston | US Citizen | US Resident | Bainbridge Island, WA |

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD

This disclosure relates generally to chemical processing of Coal Combustion Products (CCP) and phosphoric acid production waste to produce value-added, marketable products while simultaneously minimizing or eliminating one or more resultant waste streams.

BACKGROUND

Coal combustion products (CCP) comprise fly ash (fine particulates collected in electrostatic precipitators), lime or limestone from an absorption spray tower, which separates out sulfur oxide (SOX) gases, and bottom ash which remains after coal combustion. The lime or limestone in the absorption bed reacts with the SOX gases resulting in calcium sulfite (hannebachite, $CaSO_3.0.5H_2O$). The calcium sulfite is often oxidized to calcium sulfate, which is referred to as flue gas desulfurization (FGD) gypsum. In some coal plants, the calcium sulfite/sulfate byproduct is separated from the other byproducts while in others it is mixed in with the ash.

Currently, the primary applications of calcium sulfate ($CaSO_4$) or FGD gypsum are in the wallboard industry and as a soil amendment. The fly ash is commonly used in the construction industry as a cement additive. However, significant portions of FGD gypsum and ash are not marketable; thus, they are stored in piles and ponds, and present a plethora of environmental issues.

Many efforts have focused on utilizing specific components of CCPs, such as converting calcium sulfate to ammonium sulfate fertilizer and calcium carbonate filler. Others have attempted to extract specific elements out of the CCPs, such as aluminum or rare earth elements. To date there has not been a successful effort to treat the entire inventory and convert it to value-added, marketable products with minimal or no waste.

Phosphogypsum (PG) refers to the calcium sulfate hydrate formed as a by-product of the production of fertilizer from phosphate rock. It is mainly composed of gypsum ($CaSO_4.2H_2O$). Although gypsum is a widely used material in the construction industry, phosphogypsum is usually not used; rather, it is stored indefinitely because of its weak radioactivity. The long-duration storage is controversial. Somewhere between 100,000,000 and 280,000,000 tons are estimated to be produced annually as a consequence of processing phosphate rock for the production of phosphate fertilizers. Phosphogypsum is a side-product from the production of phosphoric acid (FIG. 61) by treating phosphate ore (apatite) with sulfuric acid according to the following reaction (1):

$$Ca_5(PO_4)_3X+5H_2SO_4+10H_2O\rightarrow 3H_3PO_4+5(CaSO_4.2H_2O)+HX \quad (1)$$

where X may include OH, F, Cl, or Br.

Phosphogypsum is radioactive due to the presence of naturally occurring uranium and thorium, and their daughter isotopes radium, radon, etc. In addition, many phosphate deposits contain several hundreds of parts per million of valuable rare earth elements. Marine-deposited phosphate typically has a higher level of radioactivity than igneous phosphate deposits, because uranium is present in seawater. Other components of PG are cadmium (5-28 ppm), fluoride (ca 1%), and silica. The United States Environmental Protection Agency has banned most applications of phosphogypsum having a $^{226}Ra$ concentration of greater than 10 picocurie/gram (0.4 Bq/g). As a result, phosphogypsum that exceeds this limit is stored in large stacks.

Central Florida has a large quantity of phosphate deposits, particularly in the Bone Valley region; many PG stacks are located near Fort Meade, Fla. However, the marine-deposited phosphate ore from central Florida is weakly radioactive, and as such, the phosphogypsum by-product (in which the radionuclides are somewhat concentrated) is too radioactive to be used for most applications. As a result, there are about 1 billion tons of phosphogypsum stacked in 25 stacks in Florida (22 are in central Florida) and about 30 million new tons are generated each year.

What is needed are methods for treating whole stocks of FGD gypsum and PG to reduce waste and produce marketable products.

SUMMARY

Disclosed herein are systems and methods for processing flue gas desulfurization (FGD) gypsum feedstock and ash feedstocks, either separately or together, as well as other gypsum feedstocks such as phosphogypsum. FGD gypsum conversion comprises reacting FGD gypsum (calcium sulfate) feedstock, in either batch or continuous mode, with an ammonium carbonate reagent to produce commercial products comprising ammonium sulfate and calcium carbonate. Similarly, phosphogypsum (PG), which is a byproduct of phosphoric acid production, can be processed in a similar manner to produce ammonium sulfate and calcium carbonate having similar applications. This is covered in more detail in the section "PHOSPHOGYPSUM CONVERSION SYSTEMS AND METHODS". Ash conversion comprises a leach process followed by a precipitation process to selectively precipitate components at one or more predetermined pHs resulting in metal hydroxides, which may be optionally converted to oxides or carbonates. The processes may be controlled by use of one or more processors.

An exemplary embodiment of the disclosure is a system comprising a calcium sulfate feedstock comprising calcium sulfate and at least two impurities; a mixer to combine ammonia gas, carbon dioxide, and water, resulting in an ammonium carbonate reagent solution; one or more first reactors to combine and react the calcium sulfate feedstock with the ammonium carbonate reagent solution; the reaction forming a first reacted slurry, comprising calcium carbonate, ammonium sulfate, and the at least two impurities; a first filter to separate the calcium carbonate and the at least two impurities from the first reacted slurry, producing an ammonium sulfate filtrate; an evaporator to evaporate water from the ammonium sulfate filtrate to produce an ammonium sulfate liquor; a crystallizer to crystallize and agglomerate the ammonium sulfate liquor, resulting in ammonium sulfate crystals; a centrifuge to separate the ammonium sulfate crystals from the ammonium sulfate liquor; a dryer to dry the ammonium sulfate crystals; a second reactor to combine and dissolve the calcium carbonate and the at least two impurities with a solvent, resulting in a second reacted slurry, the second reacted slurry comprising solutes of the at least two impurities, calcium, and at least one insoluble component; a second filter to separate the at least one insoluble component from the second liquor, resulting in a second filtrate comprising the solutes of the at least two impurities and the calcium nitrate, wherein the second filtrate has a pH; a third reactor to combine the second filtrate with a first base to precipitate a first metal from the second filtrate, wherein the first base is added until the pH of the second filtrate increases to a first predetermined pH, and wherein the first metal is at least one of the at least two impurities; a third filter to separate the first metal from the second filtrate, resulting in a third filtrate comprising the calcium and a solute of the second of the at least two impurities, wherein the third filtrate has a pH; a fourth reactor to combine the third filtrate with a second base to precipitate a second metal from the third filtrate, wherein the second base is added until the pH of the third filtrate increases to a second determined pH, wherein the second metal is the second of the at least two impurities; a fourth filter to separate the second metal from the third filtrate, resulting in a fourth filtrate comprising the calcium; a fifth reactor to combine the fourth filtrate with a soluble carbonate to precipitate calcium carbonate from the fourth filtrate, wherein the soluble carbonate is added until the pH of the fourth filtrate increases to a third predetermined pH; and a fifth filter to separate the calcium carbonate from the fourth filtrate.

Applicant(s) herein expressly incorporate(s) by reference all of the following materials identified in each paragraph below. The incorporated materials are not necessarily "prior art".

U.S. patent application Ser. No. 15/669,870, entitled System and Method for Distributed Trading Platform, filed Aug. 4, 2017, herein incorporated by reference in its entirety.

U.S. patent application Ser. No. 15/675,697, entitled Systems and Methods for Using Smart Contracts to Control the Trade, Supply, Manufacture, and Distribution of Commodities, filed Aug. 11, 2017, herein incorporated by reference in its entirety.

If it is believed that any of the above-incorporated material constitutes "essential material" within the meaning of 37 CFR 1.57(d)(1)-(3), applicant(s) reserve the right to amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

Further, the inventors are informed of the standards and application of the special provisions of 35 U.S.C. § 112(f). Thus, the use of the words "function," "means", or "step" in the Detailed Description or Description of the Drawings or claims is not intended to somehow indicate a desire to invoke the special provisions of 35 U.S.C. § 112(f) to define the systems, methods, processes, and/or apparatuses disclosed herein. To the contrary, if the provisions of 35 U.S.C. § 112(f) are sought to be invoked to define the embodiments, the claims will specifically and expressly state the exact phrases "means for" or "step for" and will also recite the word "function" (i.e., will state "means for performing the function of . . . "), without also reciting in such phrases any structure, material, or act in support of the function. Thus, even when the claims recite a "means for performing the function of . . . " or "step for performing the function of . . . ", if the claims also recite any structure, material, or acts in support of that means or step, then it is the clear intention of the inventors not to invoke the provisions of 35 U.S.C. § 112(f). Moreover, even aif the provisions of 35 U.S.C. § 112(f) are invoked to define the claimed embodiments, it is intended that the embodiments not be limited only to the specific structures, materials, or acts that are described in the preferred embodiments, but in addition, include any and all structures, materials, or acts that perform the claimed function as described in alternative embodiments or forms, or that are well known present or later-developed equivalent structures, materials, or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

FIG. 3 is a table showing the composition of an FGD gypsum feedstock used in testing.

FIG. 6 depicts crystallized ammonium sulfate product assays for product generated in testing of the FGD conversion process.

FIG. 7 depicts example test conditions and results from testing of the FGD conversion process.

FIG. 8 depicts calculated final product purity generated in testing of the FGD conversion process.

FIG. 13 depicts a composition of an ammonium sulfate product produced by the pilot production plant depicted in FIG. 9.

FIG. 22 is a table depicting the major earth forming oxides of a class F and a class C ash feedstock used in preliminary testing of the ash conversion process.

FIG. 23 is a table depicting the major, minor, and trace elemental composition of the class F and class C ash feedstocks used in preliminary testing of the ash conversion process.

FIG. 24 is a table depicting mineralogical composition of the class F and class C ash feedstocks used in preliminary testing of the ash conversion process.

FIG. 25 is a table depicting leaching results of class F and class C ash feedstocks using 3:1 hydrochloric acid to nitric acid.

FIG. 26 is a table depicting leaching results of class F and class C ash using sulfuric acid and sodium fluoride.

FIG. 27 is a table depicting leaching results of class F and class C ash feedstock using sulfuric acid and calcium fluoride.

FIG. 28 is a table depicting leaching results of class F and class C ash feedstock using hydrochloric acid in two stages starting with hydrochloric acid at pH 1.5 followed by 11% hydrochloric acid.

FIG. 29 is a table depicting leaching results of class F and class C ash feedstock using hydrochloric acid in two stages starting with hydrochloric acid at pH 1.5 followed by 30% hydrochloric acid.

FIG. 30 is a table depicting leaching results of class C ash feedstock using 30% hydrochloric acid for 24 hours on the residue after leaching in FIG. 29.

FIG. 34 depicts X-ray Diffraction (XRD) mineralogical compositions of class C and class F leach residues resulting from FIG. 28 and FIG. 29 leaches.

FIG. 38 is a table depicting the percent composition of the various precipitate hydroxides at different pHs using caustic for class C ash feedstock.

FIG. 46 is a table depicting cations and anion for the sodium chloride final stream anions for class C ash feedstock after caustic neutralization.

FIG. 48 is a table showing results from the lime precipitation flowsheet testing.

FIG. 52 depicts the kinetic data for the conversion of sulfite to sulfate at 50% oxygen with Mn catalyst.

FIG. 53 depicts the kinetic data for the sulfite to sulfate reaction at 10% oxygen with Mn catalyst.

FIG. 55 depicts a phosphogypsum assay of a U.S. Sample.

FIG. 56 depicts semi-quantitative X-ray diffraction results.

Elements and acts in the figures are illustrated for simplicity and have not necessarily been rendered according to any particular sequence or embodiment.

DETAILED DESCRIPTION

Although the disclosure described herein is susceptible to various modifications and alternative iterations, specific embodiments thereof have been described in greater detail herein. It should be understood, however, that the detailed description of the systems and methods is not intended to limit the disclosure to the specific embodiments disclosed. Rather, it should be understood that the disclosure is intended to cover modifications, equivalents, and alternatives falling within the spirit and scope of the disclosure. In the following description, and for the purposes of explanation, numerous specific details, process durations, and/or specific formula values are set forth in order to provide a thorough understanding of the various aspects of exemplary embodiments. However, it will be understood by those skilled in the relevant arts that the apparatus, systems, and methods herein may be practiced without all of these specific details, process durations, and/or specific formula values. It should be noted that there are different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized, and structural and functional changes may be made without departing from the scope.

Headings are for organizational purposes only and are not intended to be limiting. Embodiments described under the various headings herein are interoperable with embodiments under other headings.

Overview

Figure 1:
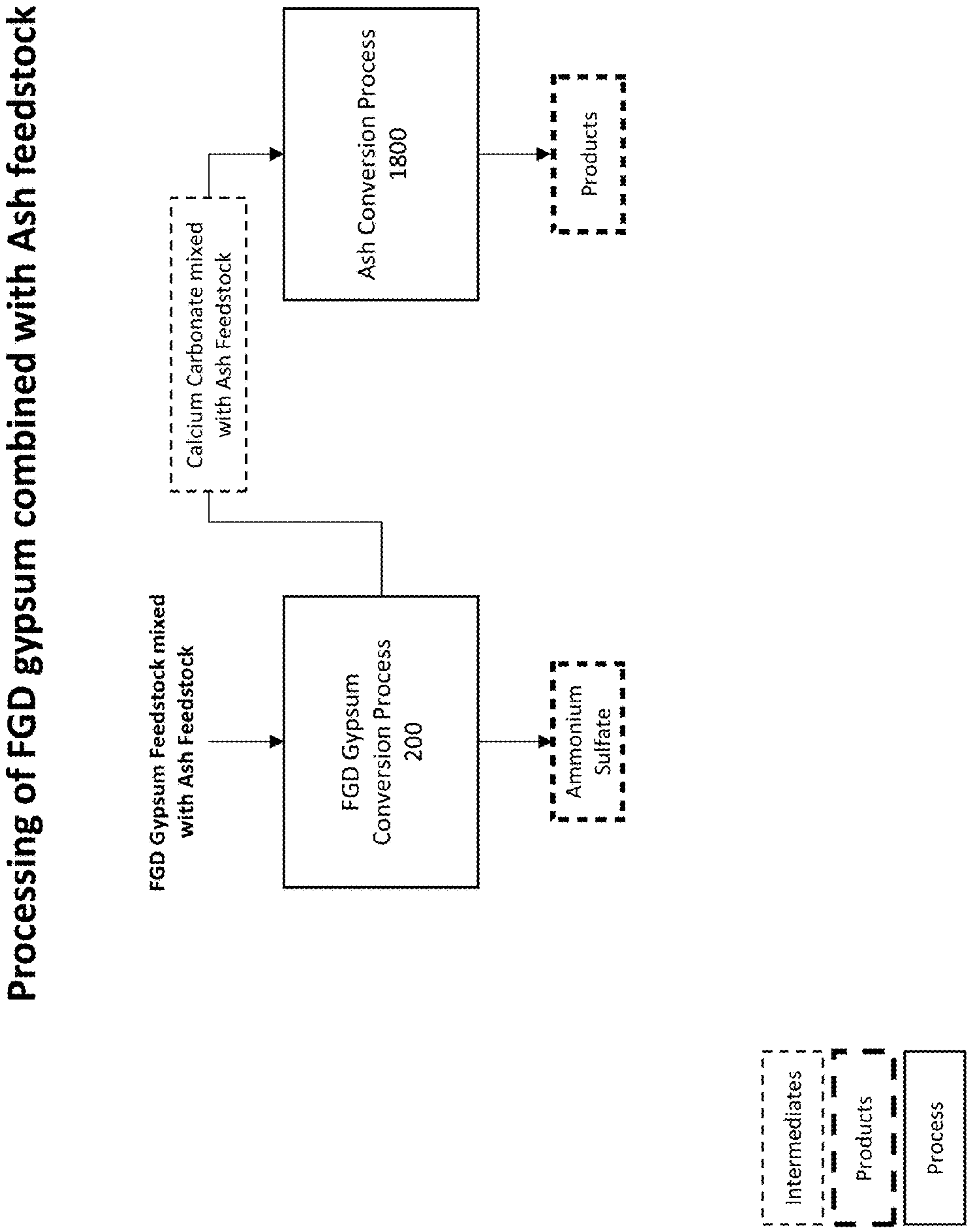
FIG. 1 depicts a system and method for combining an FGD gypsum conversion process with an ash conversion process.
Figure 2:
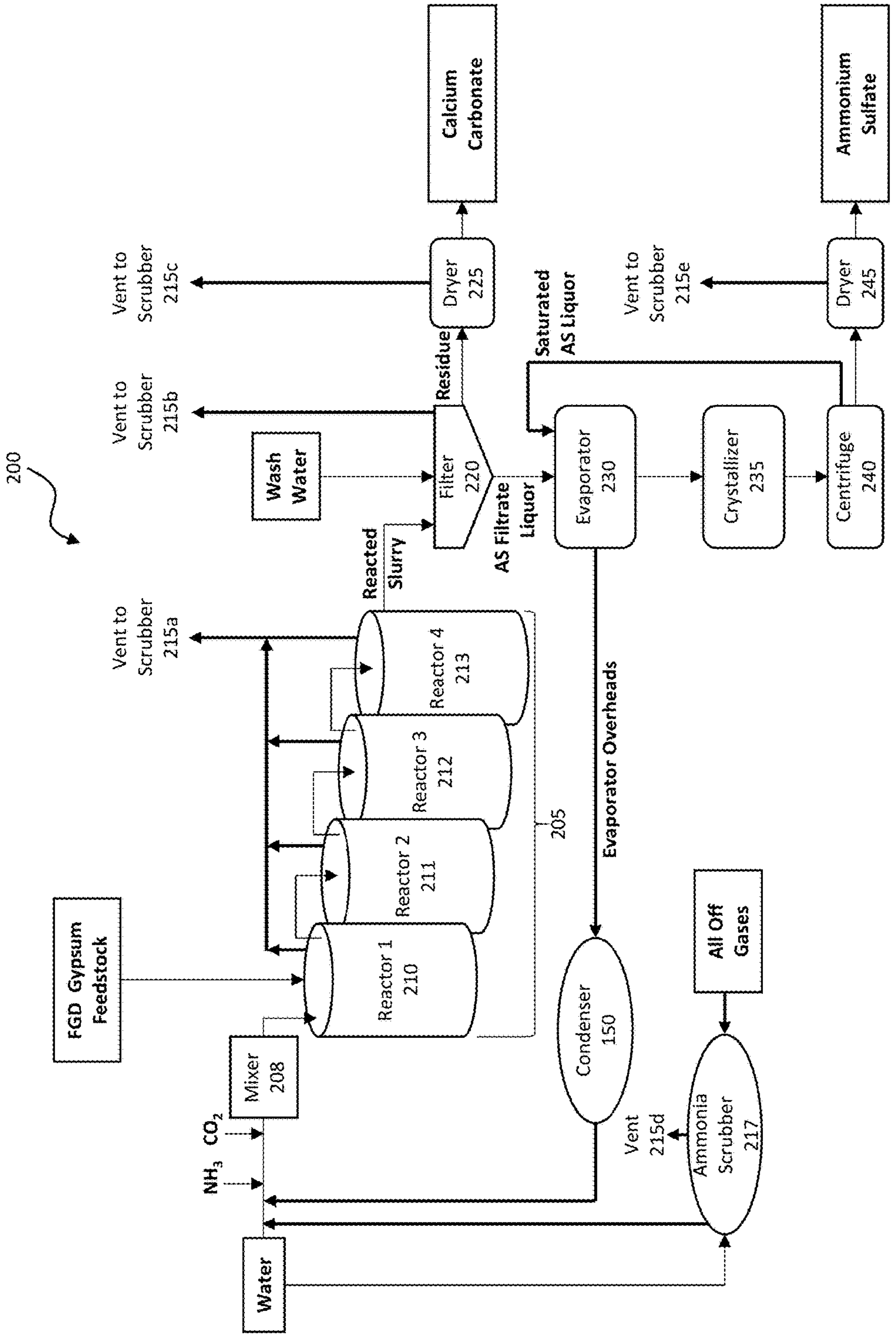
FIG. 2 depicts an embodiment of a production plant for implementing an FGD gypsum conversion process.

FIG. 1 depicts an ash conversion process 1800 combined with an FGD gypsum conversion process 200 (FIG. 2). The depicted ash conversion process 1800 may be the lime embodiment 1800*a* (FIGS. 18 and 19) or the caustic embodiment 1800*b* (FIGS. 20 and 21) or variations thereof as disclosed herein. In the depicted embodiment of the combined conversion system and method, FGD gypsum feedstock that is mixed with ash is processed in the FGD gypsum conversion process 200 resulting in an ammonium sulfate product and a calcium carbonate product that is mixed with ash. The calcium carbonate and the FGD are insoluble and are separated in the filtration process. The calcium carbonate product that is mixed with ash is processed through the ash conversion process 1800 resulting in the ash conversion process products as disclosed herein. In reference to the FIGS. 2, 18, and 20, the calcium carbonate, mixed with ash, from dryer 225 (FIG. 2) in the FGD gypsum conversion process proceeds to leach tank 1810 (FIGS. 18 and 20) in the ash conversion process.

Gypsum Conversion Systems and Methods

Disclosed herein are systems and methods for reacting flue gas desulfurization (FGD) gypsum (calcium sulfate) feedstock or phosphogypsum (PG), in either batch or continuous mode, with an ammonium carbonate reagent to produce commercial products, wherein the commercial products comprise ammonium sulfate and calcium carbonate. The FGD gypsum may have impurities as shown in FIG. 3. The systems and methods described herein are highly beneficial to the coal industry in that they produce higher value products from coal waste. The primary reaction is shown in equation (2) below.

$$CaSO_4.2H_2O\ \text{(insoluble)}+(NH_4)_2CO_3\ \text{(soluble)}\rightarrow (NH_4)_2SO_4\ \text{(soluble)}+CaCO_3\ \text{(insoluble)}+2H_2O \quad (2)$$

The mixture of ammonium sulfate and calcium carbonate is referred to as the first reacted slurry. FIG. 2 depicts an embodiment of a production plant 200 for implementing an FGD gypsum conversion process resulting in at least two commercial products. In the depicted embodiment, FGD gypsum (calcium sulfate) feedstock is fed, either in batch or continuous mode, into a reactor cascade 205 (comprising reactors 210, 211, 212, and 213) with ammonium carbonate reagent, which may be synthesized from ammonia and carbon dioxide gases or supplied as a powder. In some embodiments, the FGD gypsum feedstock may be fed to the system using a quantitative powder feeder or a gravimetric feeder optionally coupled to a screw feeder (not shown). In some embodiments, the FGD gypsum feedstock is in powder form. In embodiments where the FGD gypsum feedstock is moist, it may require drying prior to feeding to avoid blockages in the feeder. In some embodiments, the FGD gypsum feedstock may be dried to 7% by weight or less moisture content.

The number of reactors in the reactor cascade 205 may vary depending on throughput required, the size and type of reactors, and the reaction time needed. In some embodiments, there may be between three and five reactors. As an example, for a two-hour reaction with four reactors having total volume V, the scaled total volume needed would be 4/3 V for three reactors and 2V for two reactors. The same rule applies when increasing the number of reactors. In some embodiments, the size of the reactors 210, 211, 212, and 213 may be reduced using weirs.

The one or more reactors 210, 211, 212, and 213 may be connected in overflow mode (material overflows from the top of a reactor to the next reactor) or underflow mode (material flows from the bottom of a reactor to the next reactor), or material may be transferred using one or more pumps between the one or more reactors. In some embodiments, the one or more reactors 210, 211, 212, and 213 may be continuously stirred tank reactors (CSTRs), stirred tank reactors and/or plug-flow reactors. In some embodiments, the first reactor 210 may be a small, high intensity reactor to thoroughly mix the FGD gypsum feedstock and reagent, followed by two to three (larger, in some embodiments) reactors 211, 212, and/or 213 to hold the mixture long enough for the reaction to reach completion (i.e. 99+% conversion of FGD gypsum feedstock) resulting in a reacted slurry. In the depicted embodiment, the reactor cascade 205 vents ammonia gas from the ammonium carbonate reagent through vent 215_a_ to the scrubber 217. Either water or between 0.01 to 0.1M sulfuric acid may be used in the scrubber 217. The ammonia from the vents 215_a-e_ dissolves in water to yield ammonium hydroxide or, in the case of sulfuric acid, the ammonia reacts to form ammonium sulfate. The ammonium hydroxide or ammonium sulfate from the scrubber 217 may optionally be recycled back into the reagent feed line into reactor 210, in some embodiments.

After the reaction has reached completion, the first reacted slurry is pumped, underflows, or overflows from the reactor cascade 205 into a filter 220 resulting in calcium carbonate residue and ammonium sulfate filtrate. Wash water is pumped through filter 220 in the depicted embodiment. Ammonia off-gases from the filter 220 vent through vent 215_c_ to scrubber 217. In some embodiments, filter 220 may be a drum filter or other similar continuous filter. The calcium carbonate residue from filter 220 proceeds to dryer 225 to produce calcium carbonate product. In the depicted embodiment, dryer 225 vents through vent 215_c_ ammonia to scrubber 217. In some embodiments, the calcium carbonate product may be further processed. Further processing options are discussed in the Examples.

In the depicted embodiment, ammonium sulfate filtrate proceeds from filter 220 to evaporator 230 where water is evaporated from the ammonium sulfate liquor to form an ammonium sulfate liquor, and then to crystallizer 235 where ammonium sulfate crystals are produced in the ammonium sulfate liquor. Centrifuge 240 separates the ammonium sulfate crystals from the ammonium sulfate liquor resulting in separated ammonium sulfate crystals and saturated ammonium sulfate liquor. Dryer 245 dries the separated ammonium sulfate crystals resulting in ammonium sulfate product. The dryer 245 vents through vent 215_e_ to scrubber 217. In some embodiments, saturated ammonium sulfate liquor may be pumped from the centrifuge 240 back into the evaporator 230. Overheads or vapors coming off the top of the evaporator 230, containing excess ammonium carbonate reagent, may optionally proceed through a condenser 250 (evaporator condensate) to be recycled back into the reactor cascade 205 to react with the FGD gypsum feedstock thus reducing reagent demand and reducing waste streams. In the depicted embodiment, water is pumped into the reactor cascade 205 and into the ammonia scrubber 217. In the depicted embodiment, all off-gases, including water vapor and ammonia in some embodiments, vent through vents 215_a_, 215_b_, 215_c_, 215_d_, 215_e_ to ammonia scrubber 217.

In some embodiments, the ammonium sulfate may be vacuum evaporated to form a salt. The salt may then be allowed to crystallize out, and the crystallized product is then filtered using a solid/liquid separation device. The conditions in the crystallizer 235 may be controlled to produce larger crystals which are more desirable in some markets. The ammonium sulfate product may be greater than or equal to 99% pure. The ammonium sulfate crystallization and the centrifuge separation processes may be continuous or batch processes.

Filter 220 and centrifuge 235 are both solid/liquid separators and may be substituted by other solid/liquid separators in other embodiments. For example, a belt filter may be used in place of filter 220 and a rotating drum filter may be used in place of the centrifuge 235. In some embodiments, a spray dryer may be used in place of the evaporator 230 and crystallizer 235. The spray dryer evaporates the water and forms small crystals all in one step. Continuous filtration systems other than those depicted in FIG. 2 may be utilized in the process. The equipment used in the process may be sized to fit the desired input/output. Material transfer between processes and/or equipment may be carried out with the use of pumps, etc.

Reagents

In the embodiment depicted in FIG. 2, ammonium carbonate reagent is synthesized using ammonia ($NH_3$) and carbon dioxide ($CO_2$) gases in flowing water. In some embodiments, the $NH_3$ and $CO_2$ gas are injected in the stoichiometric ratio of 2:1 respectively. The gases may be introduced sequentially using gas nozzles into a flowing water stream in either a batch process or a continuous process. The gases are best fed sequentially with the $NH_3$ first followed by the $CO_2$ because $NH_3$ is more soluble in water than $CO_2$ and $CO_2$ is more soluble in ammonium hydroxide than in plain water. This order of gas introduction into the water has been found to reduce the chances of an ammonia gas release. In alternative embodiments, the order of gas introduction into the water may be reversed. Sequential feed of the $NH_3$ and $CO_2$ gases reduces chance of clogging in the gas nozzle; however, the $NH_3$ and $CO_2$ gases may be premixed, in some embodiments. The $NH_3$ and $CO_2$ gases may be mixed with process water using a mixer 108 such as an in-line mixer or a reactor tank with mixer resulting in an ammonium carbonate reagent solution. In some embodiments, the gases may be fed directly into mixer 208.

The pH may optionally be monitored to ensure carbonate is formed (formed between pH 8.7-9.0), rather than bicarbonate, which is formed at lower pHs. Conductivity and/or the specific gravity may be monitored using an electric conductivity meter and a hydrometer, respectively, to determine the concentration of ammonium carbonate reagent formed. Both conductivity and specific gravity increase as the concentration of the ammonium carbonate formed in solution increases. For example, for a 15% concentration of ammonium carbonate in solution, the conductivity is 80-90 mS/cm (milli-siemens/centimeter).

The resulting ammonium carbonate reagent may be fed directly into reactor cascade 205. In some embodiments, the ammonium carbonate reagent is added in excess (more than stoichiometric) to ensure the reaction goes to completion (i.e. until all the FGD gypsum feedstock is reacted). In some embodiments, 140% stoichiometric addition of the ammonium carbonate reagent results in the reaction going to completion. If the reaction is not complete, then the calcium carbonate product is contaminated with FGD gypsum feedstock.

Products

In some embodiments, to make the products more commercially attractive, the ammonium may be agglomerated in an agglomerator to larger, more flowable particles to facilitate product application. In some embodiments, the particles are several millimeters in size. In some embodiments the ammonium sulfate and/or calcium carbonate products may be further treated with coating agents, such as stearic acid and stearates, to improve their properties for specific markets, such as to reduce their moisture absorption. In some embodiments, the ammonium sulfate and/or calcium carbonate products may be treated with an additive to reduce the absorption of water.

Ammonium Sulfate

The ammonium sulfate product produced by production plant 200 (FIG. 2) may be used as a solution. In some embodiments, the ammonium sulfate product is greater than 99% pure. In some embodiments, the ammonium sulfate solid product is fertilizer grade. Ammonium sulfate is primarily used in the global fertilizer industry as a soil amendment to replenish depleted levels of nitrogen and sulfur to the soil. An additional use in the fertilizer industry is as an adjuvant for various insecticides, herbicides, and fungicides. Ammonium sulfate may also be used in non-agricultural products and processes such as for flameproofing of select materials, textile dyeing, a cattle feed supplement, and for certain water treatment processes.

Calcium Carbonate

Figure 15:
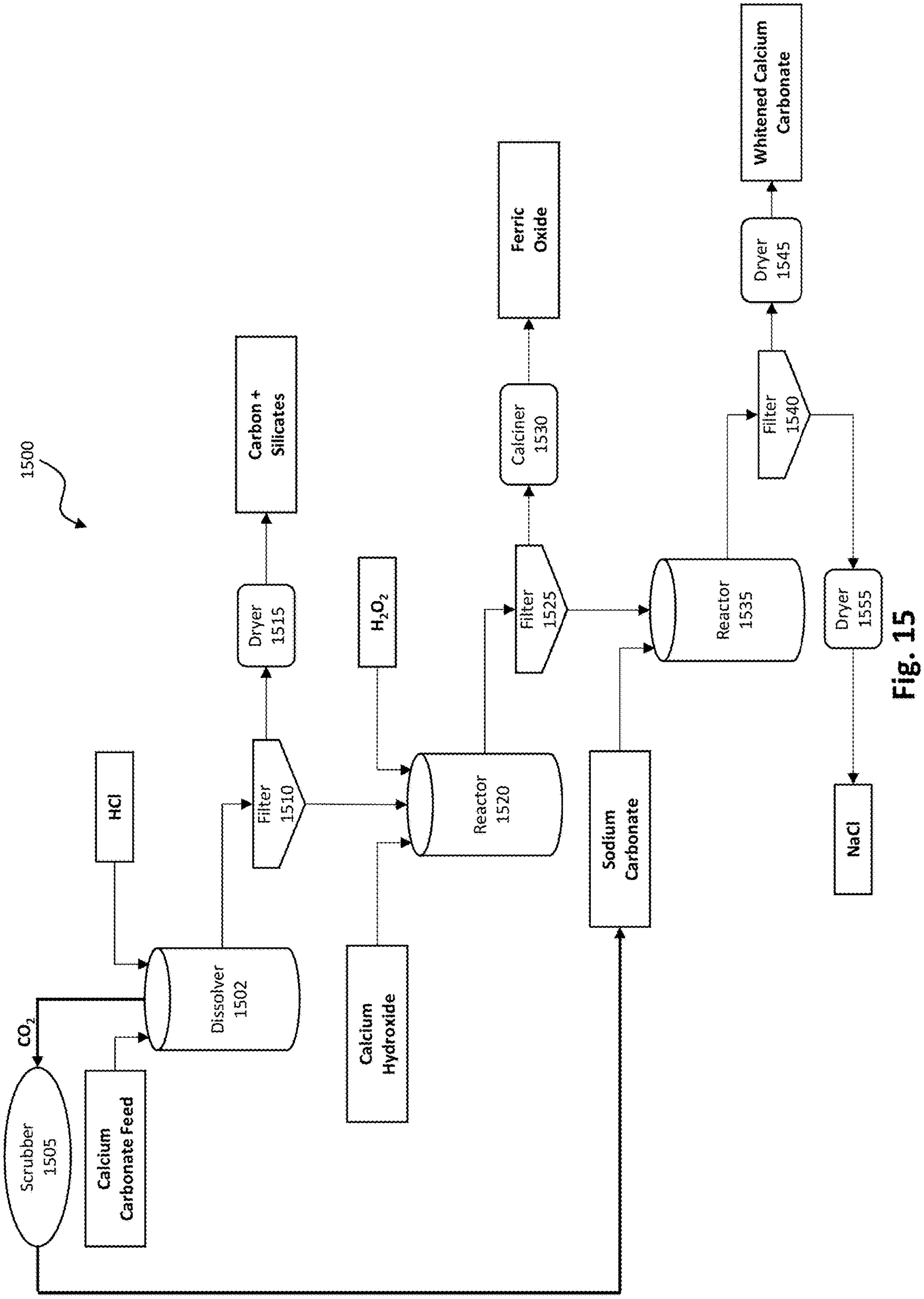
FIG. 15 depicts an embodiment of an acid dissolution calcium carbonate whitening process.
Figure 17:
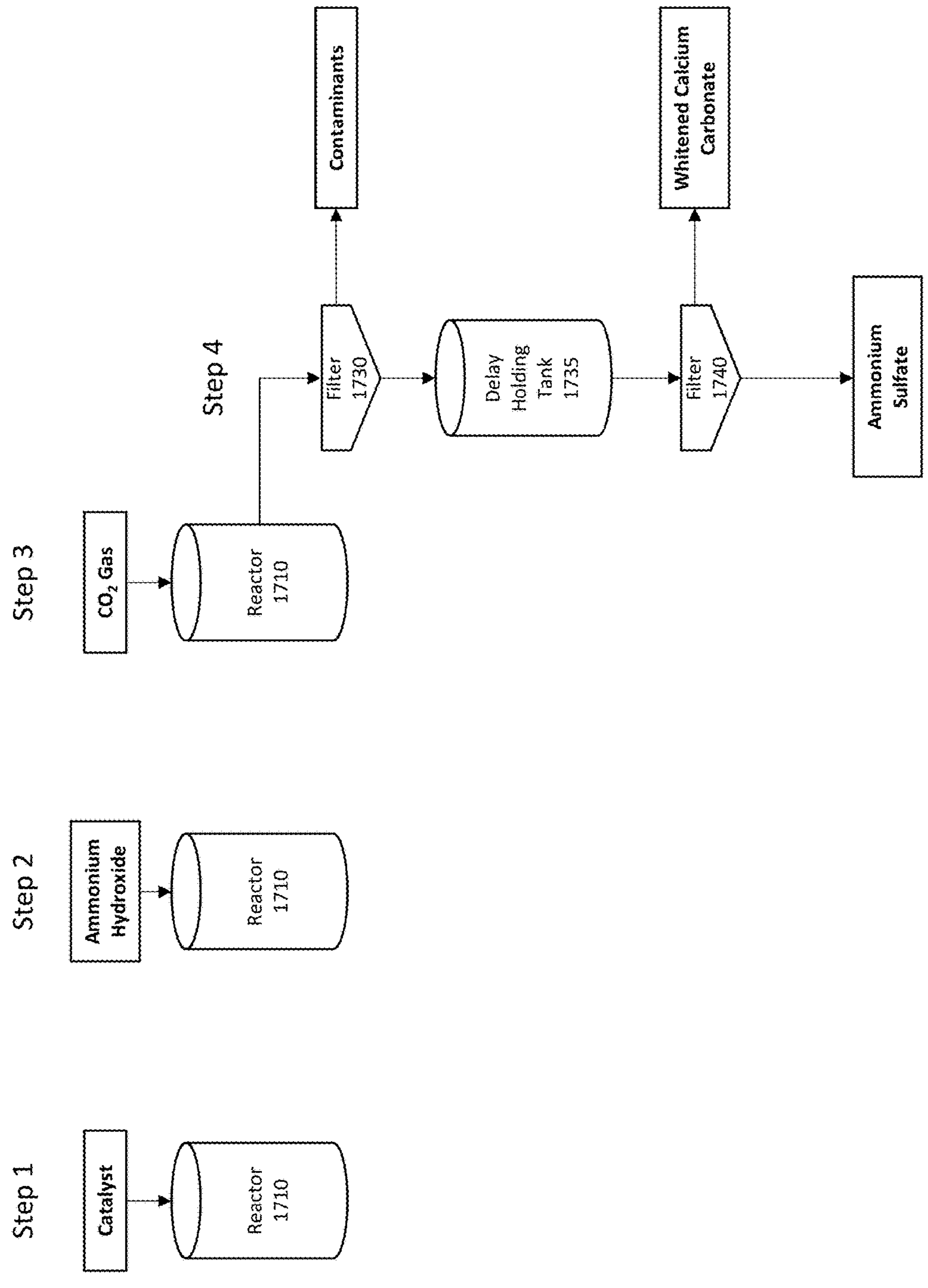
FIG. 17 depicts an example embodiment of a process for using a catalyst to separate impurities from calcium carbonate product produced by the FGD conversion process.
Figure 58:
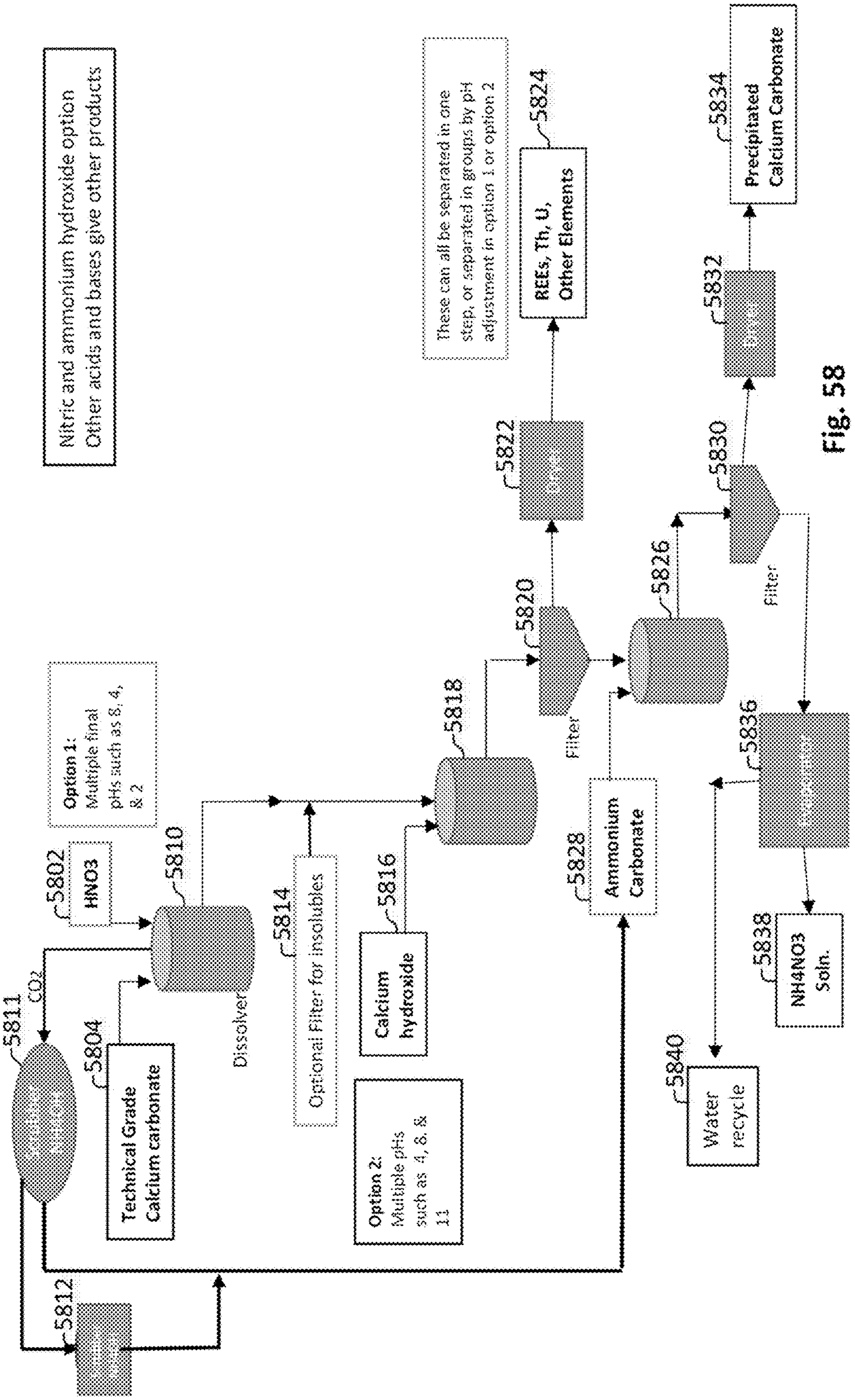
FIG. 58 depicts a calcium carbonate whitening process for PG gypsum flowsheet.

The calcium carbonate product produced by production plant 200 (FIG. 2) is insoluble. In some embodiments, the calcium carbonate product may contain small amounts of impurities, such as carbon and iron, which may cause it to have a grey or tan color. In the case of phosphogypsum, these impurities also contain valuable rare earth elements (REEs) as well thorium and uranium (FIG. 56). In some embodiments, the calcium carbonate is 90-99 wt % pure. In some embodiments, the calcium carbonate product may be further processed to obtain a higher purity white precipitated calcium carbonate (PCC) product which typically has higher market value. Some exemplary calcium carbonate whitening processes are described in the examples under the heading Calcium Carbonate Processing below (FIGS. 15, 17, 58).

Calcium carbonate has a plethora of uses in many diverse industries including: the oil and gas industry as drilling fluid make-up to increase the fluid density, as an additive to control fluid loss to formation, and in oilfield cementing as a loss circulation material; the building materials and construction industry for roofing shingles, tiles, and cement, brick, and concrete block manufacture; and commercial applications such as industrial filler in the paper, paint, plastics, and rubber industries.

Calcium Carbonate Processing

1. Acid Dissolution

In some embodiments, the calcium carbonate product produced by the FGD gypsum conversion process may comprise contaminants such as iron, carbon, and silicates. When such contaminants are present, the calcium carbonate may proceed through further processing to remove such contaminants resulting in a purer product. In some embodiments, such as the acid dissolution calcium whitening system and process 1500 depicted in FIG. 15, the calcium carbonate product may be dissolved in dissolver 1502 in dilute acid (such as hydrochloric acid (HCl), nitric acid ($HNO_3$), or another acid forming a soluble calcium salt). The basic reaction is shown in equation (3) below:

$$CaCO_3\ (\text{insoluble}) + 2HCl + \text{impurities} \rightarrow CO_2 + Ca(Cl)_2\ (\text{soluble}) + H_2O + \text{impurities} \quad (3)$$

The carbon dioxide generated by equation 2 in dissolver 1502, in the depicted embodiment, may proceed to scrubber 1505 containing sodium hydroxide to form sodium carbonate or optionally potassium hydroxide to form potassium carbonate or ammonium hydroxide to produce ammonium carbonate.

The mixture resulting from equation 3 may then be filtered by filter 1510 with solid impurities proceeding to dryer 1515 and liquids proceeding to reactor 1520. The dried solids may comprise carbon and silicates, in some embodiments. If an iron contaminant is present in the calcium carbonate product produced by the FGD conversion process, hydrogen peroxide ($H_2O_2$) may be added to reactor 1520 to oxidize ferrous iron to ferric iron. An amount of base such as calcium hydroxide (in depicted embodiment), sodium hydroxide, and/or sodium carbonate may also be added to reactor 1520 to raise the pH in the reactor to 3 or higher to precipitate ferric hydroxide. The advantage of using calcium hydroxide is that the amount of high purity precipitated calcium carbonate produced is increased by the amount of calcium neutralizing agent used, thus improving process economics. The amount of base added is the amount that is necessary to reach the desired pH value. This reaction with sodium hydroxide and hydrogen peroxide is shown in equation (4), below:

$$Fe^{++} + H_2O_2 + NaOH \rightarrow Fe(III)(OH)_3\ (\text{insoluble}) + Na^+ \quad (4)$$

The slurry resulting from equation 4 in reactor 1520 may be filtered with filter 1525 to remove ferric hydroxide solids. In some embodiments, some carbon impurity may also filter out with the ferric hydroxide. In some embodiments, the ferric hydroxide is transferred to calciner 1530 resulting in a ferric oxide product.

In some embodiments, one or more pH adjustments and filtration steps to precipitate and filter other impurities (FIG. 3) may be performed in addition to those described here. FIG. 38 shows compositions of metals that can be precipitated at different pH levels. Precipitation of different metals is further described below.

The filtrate from filter 1525 comprises a purified calcium chloride solution, or a mixed calcium and sodium chloride solution depending on the base used, which may then be combined with sodium carbonate, carbon dioxide, potassium carbonate, ammonium carbonate, or another soluble carbonate in reactor 1535 to produce precipitated calcium carbonate. The mixture may proceed through filter 1540 to separate solids and liquids. The solids may proceed through dryer 1545 to produce a white and high purity (>98%) precipitated calcium carbonate product. The precipitation reaction with sodium carbonate is shown in equation (5).

$$Ca(Cl)_2 + Na_2CO_3 \rightarrow 2NaCl + CaCO_3(\text{insoluble}) \quad (5)$$

The precipitated calcium carbonate (PCC) is high purity and is an agglomeration of nano particles (FIG. 59) which increases its high value applications.

The filtrate from filter 1540 may proceed through dryer 1555 to produce sodium chloride. If potassium carbonate is used instead of sodium carbonate, the product would be potassium chloride, which can be used as a fertilizer. If ammonium carbonate is used instead of sodium carbonate, the product would be ammonium chloride, which can also be used as a fertilizer.

In some embodiments wherein HCl was used in the acid dissolution calcium carbonate whitening process, the economics of the purification of calcium carbonate may be significantly improved if the resultant NaCl filtrate is regenerated back to NaOH and HCl using a chlor-alkali cell process.

In some embodiments wherein $HNO_3$ is used in the acid dissolution, the products produced would be sodium nitrate, potassium nitrate, and ammonium nitrate depending on the soluble carbonate used, each of which is a fertilizer. They each also produce precipitated calcium carbonate. In some embodiments wherein phosphoric acid is used in the acid dissolution, the products produced would be converted to sodium phosphate, potassium phosphate, or ammonium phosphate. They all also produce precipitated calcium carbonate.

Figure 16:
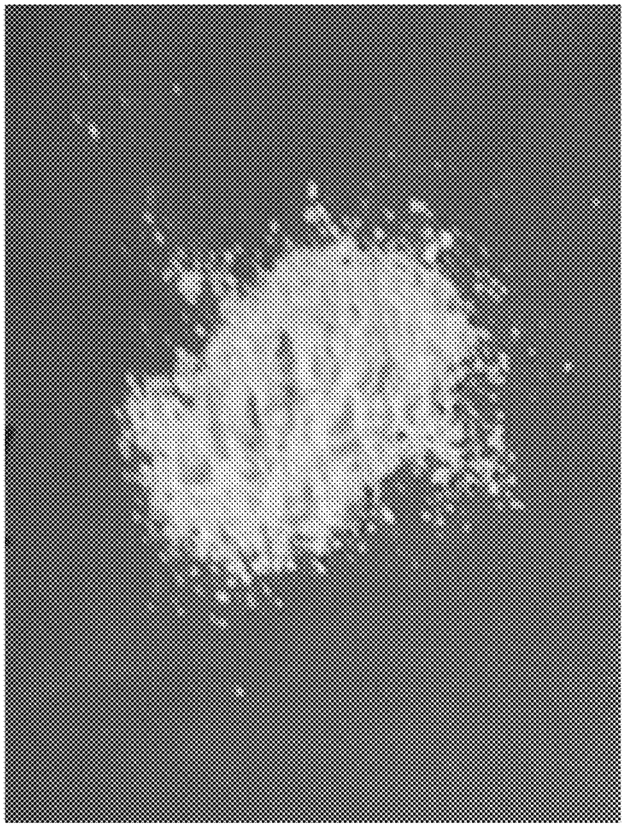
FIG. 16 depicts a whitened calcium carbonate product produced by the calcium carbonate whitening process depicted in FIG. 15.
Figure 59:
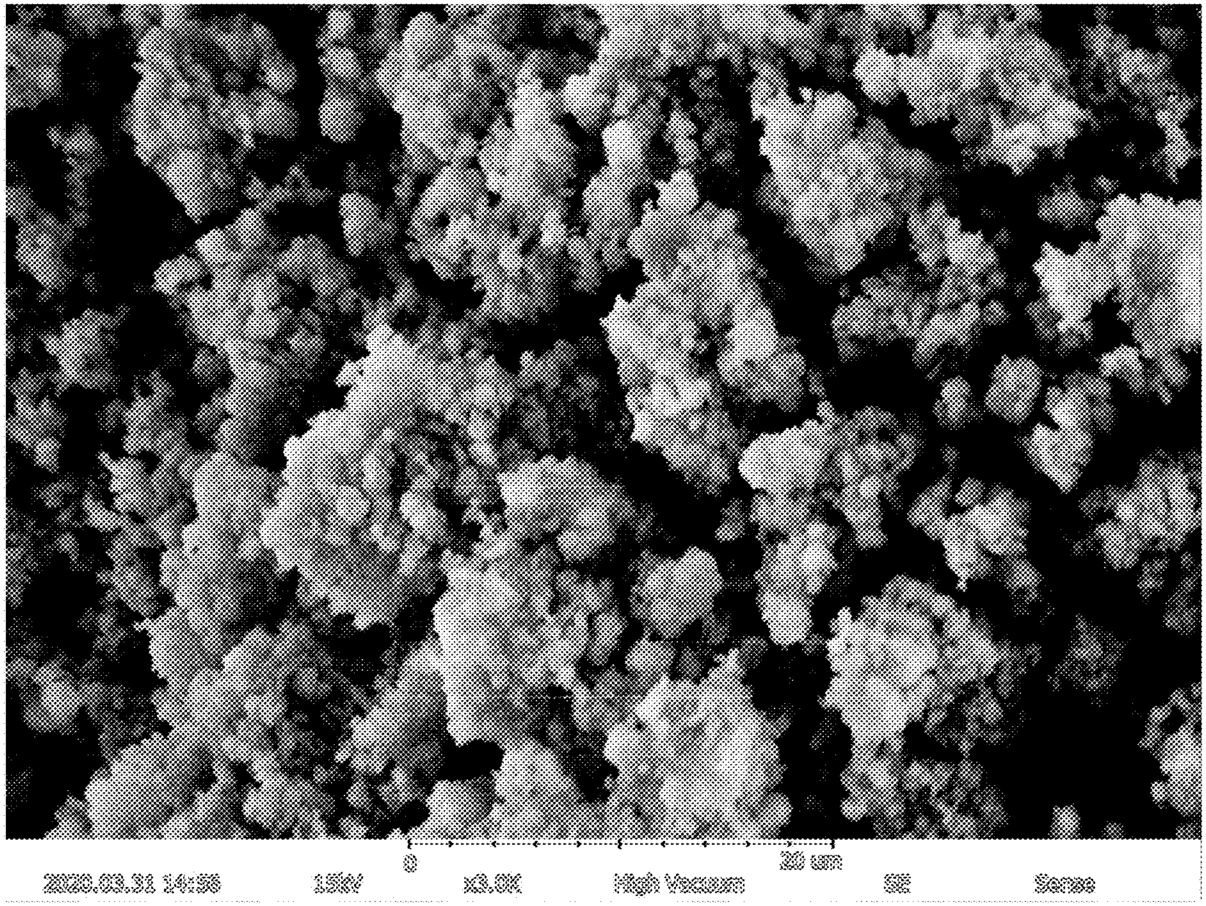
FIG. 59 is a Scanning Electron Micrograph of the nanoparticle size of our precipitated calcium carbonate particles.
Figure 60:
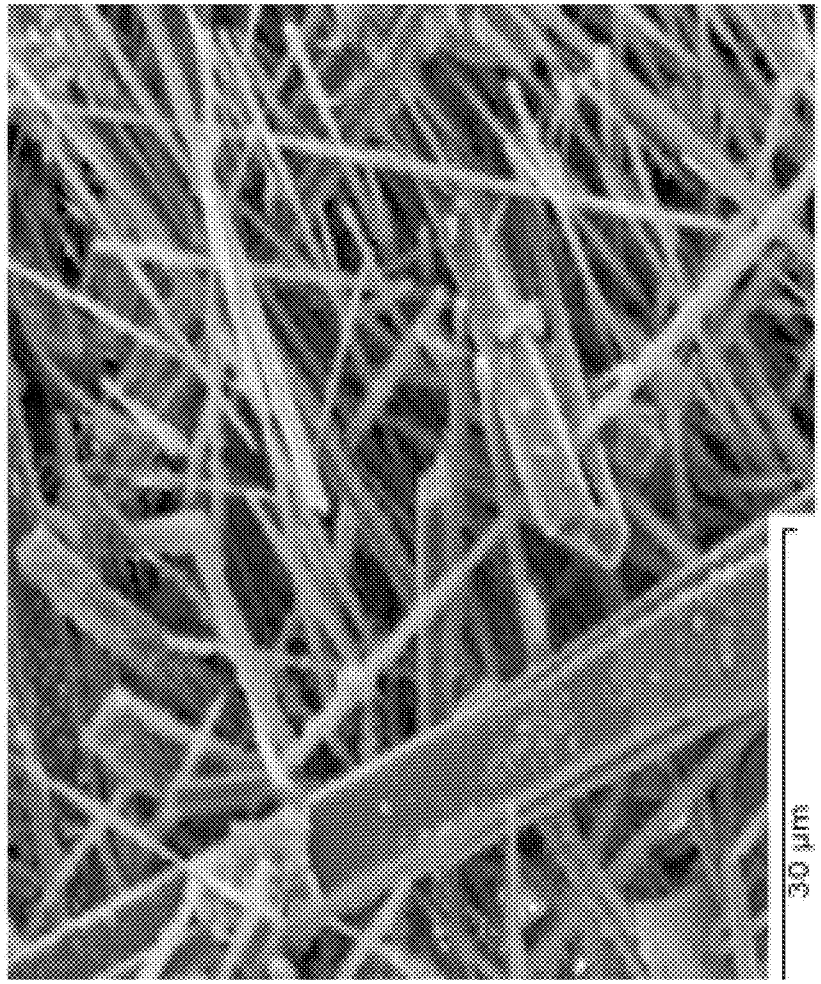
FIG. 60 is a Scanning Electron Micrograph of the fibrous Mullite in the coal ash residue.

In the case of the calcium carbonate produced from a phosphogypsum feedstock, an acid such as nitric acid, hydrochloric acid, or any other acid forming a soluble calcium salt, is used to dissolve the calcium carbonate. The $CO_2$ generated from that reaction is absorbed in a base such as ammonium hydroxide or sodium hydroxide to form the corresponding carbonates. There are then two approaches to separate the REEs and the radioactive elements as well as the other impurities: The first approach is to adjust the final pH in the initial dissolution to different values such that different impurities can be separated. The second approach is to dissolve all the impurities under acid conditions and then separate them by incremental increases in pH (FIG. 59 depicts the process and these options). This second approach is based on the separation technology disclosed in the "Ash Conversion Systems and Methods". The final processing step is to use the ammonium carbonate (or sodium carbonate) produced to precipitate the solubilized calcium to form a high purity, nano-sized (SEM in FIG. 60) precipitated calcium carbonate (PCC). FIG. 16 depicts a whitened calcium carbonate product generated by the calcium whitening process depicted in FIG. 15.

2. Catalyst

In some embodiments, a catalyst to delay the formation of calcium carbonate may be added to the reactor cascade 205 (FIG. 2) so that impurities (or impurities plus ash, in some embodiments) may be filtered out before the precipitate is formed. The addition of a catalyst results in a fine white and high purity (>98%) precipitated calcium carbonate product.

FGD gypsum feedstock may comprise contaminants including carbon and/or fly ash, in some embodiments. An example embodiment of a process for using a catalyst to separate impurities from calcium carbonate is depicted in FIG. 17. In some embodiments, a quantity of a catalyst (0.5-7% by weight, in some embodiments) may be added to an FGD gypsum slurry mixture in a reactor 1710 wherein the FGD gypsum slurry mixture comprises a suspension in the range of 1% to 25% (4%, in some embodiments) weight by mass of FGD gypsum feedstock in water. The catalyst is allowed to mix, by means of a stirring mechanism in some embodiments, with the slurry for several minutes (5-30 minutes, in some embodiments). After mixing, an ammonium hydroxide solution may be added to the reactor vessel 1710 resulting in 1:1 ammonium hydroxide to slurry volumetric ratio. This addition of the ammonium hydroxide is immediately followed by the introduction of carbon dioxide gas at a rate of 4 L/minute±1 L/minute, in some embodiments. The concentration of the ammonium hydroxide solution is the concentration required to stoichiometrically react with all of the sulfate in the FGD gypsum slurry to form ammonium sulfate according to equation (6):

$$2NH_4OH+CaSO_4.2H_2O+CO_2\rightarrow(NH_4)_2SO_4+CaCO_3+3H_2O \quad (6)$$

The progress of the reaction can be followed by monitoring the pH which starts out at approximately 11.6 and with time drops to pH 7. At pH 7 all hydroxide has reacted and the solution is filtered (immediately, in some embodiments) through a 0.45 to 0.7 micron filter 1730. Filtration of the reacted FGD gypsum solution results in the separation of tramp fly ash and carbon from the resulting liquid comprising dissolved calcium carbonate and ammonium sulfate. The calcium carbonate in solution will separate from the ammonium sulfate solution in delay holding tank 1735 and can be collected by an additional filtration step 1740 using a 0.45 to 0.7 micron filter. In some embodiments, one or more of the filtration steps may be carried out using a filter composed of glass fibers.

The precipitation of calcium carbonate may be aided by seeding the solution with the desired crystalline form of calcium carbonate. In some embodiments, a small amount of precipitated calcium carbonate may be recycled back to the reactor cascade 205 (FIG. 2). The seeds may be calcite. In some embodiments, the precipitated calcium carbonate particles may be nanoparticles. In some embodiments, the solution containing the calcium carbonate may be heated to cause the calcium carbonate precipitate to coagulate, thus improving filtration. The solution passing filtration step 1740 contains the ammonium sulfate which can be harvested by various crystallization methods known in the art. In some embodiments, a catalyst is used to slow down the precipitation of calcium carbonate in order to allow the solution to be filtered. Some of the catalyst may remain in the ammonium sulfate solution and/or the crystallized product. The catalyst does not react with the reactants therefore it may be recaptured and/or recycled, in some embodiments.

In some embodiments, the filtered ammonium sulfate solution may be returned to the beginning of the process to make up the FGD gypsum feedstock slurry. In some embodiments, the appropriate concentration of catalyst may remain in the recycled solution such that no further addition of the catalyst is necessary. In some embodiments, more catalyst may be added to the solution as needed.

The calcium carbonate whitening process with catalyst can also be performed in the production plant embodiment shown in FIG. 2 with some modifications. For instance, referring to FIG. 2, the calcium carbonate whitening process with catalyst of FIG. 17 may replace filter 220. Reacted slurry from the reactor cascade 205 would proceed into reactor 1710 (FIG. 17) through the process depicted in FIG. 17 with the liquor from filter 1740 (FIG. 17) proceeding to evaporator 230 and the whitened calcium carbonate optionally proceeding through dryer 225. In some embodiments, the catalyst may be added to the reactor cascade directly and the reacted slurry with catalyst may proceed from the reactor cascade 205 to filter 1730 (FIG. 17) (i.e. reactor cascade 205 from FIG. 2 replaces reactor 1710 in FIG. 17).

Environmental Benefits

The processes described herein are environmentally sound with internal recycles and near zero waste. All parts of the processes where ammonia gas may be released may be exhausted to one or more water (or dilute sulfuric acid) scrubbers where the ammonia is recaptured and recycled to one or more of systems/processes (FIGS. 2 & 58). Coupling to an adjacent Haber process (a process for producing ammonia from nitrogen and hydrogen), in some embodiments, could minimize the amount of ammonia that would need to be stored on site, thus reducing the hazards associated with storing large quantities of ammonia. Locating a production plant 200 (FIG. 2) near a source of carbon dioxide, such as a coal power plant in some embodiments, could allow around 10% by volume of the carbon dioxide emissions from the coal power plant to be utilized in the production plant 200 (FIG. 2) using a side stream taken from the exhaust stack. $CO_2$ gas may be provided from other processes, plants, or sources including naturally occurring or stored $CO_2$ gas which may be pumped from underground formations. Carbon capture is another potential environmental benefit of the processes described herein as $CO_2$ gas is converted to a solid carbonate compound. In some embodiments, one or more internal recycles may be incorporated to recover reagents resulting in near-zero waste streams, which is of significant environmental benefit.

FGD Gypsum Feedstock Mixed with Ash

In some embodiments, where the FGD gypsum feedstock is mixed with coal ash, the FGD conversion process can produce a high purity ammonium sulfate and a second product that is comprised of calcium carbonate and ash (FIG. 1). This product can be marketed as such, particularly to building material applications, or further processed in other separation schemes. The processing system and methods for FGD gypsum feedstock that is mixed with ash is the same as that depicted in FIG. 2; however, the calcium carbonate product may be lower purity than that generated from an FGD gypsum feedstock that is not mixed with ash. The amount of ash in FGD gypsum feedstock that is mixed with ash affects the purity of the calcium carbonate product when FGD gypsum feedstock mixed with ash is used in the FGD gypsum conversion process. FIG. 1 depicts a process where FGD feedstock mixed with ash can be processed in the FGD conversion process and the calcium carbonate mixed with ash can be processed in the ash conversion process depicted in FIGS. 18 through 21. In some embodiments, where the FGD sulfite feedstock is mixed with coal ash, The sulfite is first converted to sulfate via oxidation described in the next section and then processed through the FGD conversion to produce a high purity ammonium sulfate and a second product that is comprised of calcium carbonate and ash.

Removal of Chloride from Flue Gas Desulfurization Gypsum Feedstock

Some FGD gypsum feedstock contains levels of chloride that are too high for certain applications. The excess chloride is removed from FGD gypsum feedstock through a process of water leaching, in some embodiments. Water leaching may be carried out at any temperature between room temperature (20° C.) and boiling (100° C.).

There are several techniques to remove impurities from the filtrate after the water leach before discharge including ion exchange columns, reverse osmosis, and other similar deionization techniques known in the art.

A test was run to determine where the chloride in FGD gypsum feedstock winds up when processed through the FGD gypsum conversion process. In the test, FGD gypsum feedstock containing 0.5% by weight chloride was processed by reacting with ammonium carbonate to convert the calcium sulfate to calcium carbonate and ammonium sulfate. That test showed that the $CaCO_3$ product had a chloride concentration of 16 ppm and the ammonium sulfate had a chloride concentration of 434 ppm. The filtrate from the ammonium sulfate crystallization had a chloride concentration of 672 ppm. On a weight percentage basis, the filtrate from the ammonium sulfate crystallization contains most of the chloride at 94.2% by weight, the ammonium sulfate contained 5.2% by weight, and the calcium carbonate 0.6% by weight. These results showed that water leaching to remove chlorides in the FGD gypsum feedstock prior to FGD conversion processing greatly enhances the purity of the ammonium sulfate and calcium carbonate products by reducing the chloride impurity from 0.5% by weight to 100 ppm.

Sulfite to Sulfate Conversion

In some cases, the FGD gypsum feedstock may be in the form of a calcium sulfite slurry. In such embodiments, an oxidation step may be required to convert calcium sulfite to calcium sulfate. While there are several well-established methods to oxidize calcium sulfite to calcium sulfate, none have been coupled to a more comprehensive conversion process. The conversion of calcium sulfite to calcium sulfate (gypsum) in the scrubber tower with air is known in the art.

Figure 14:
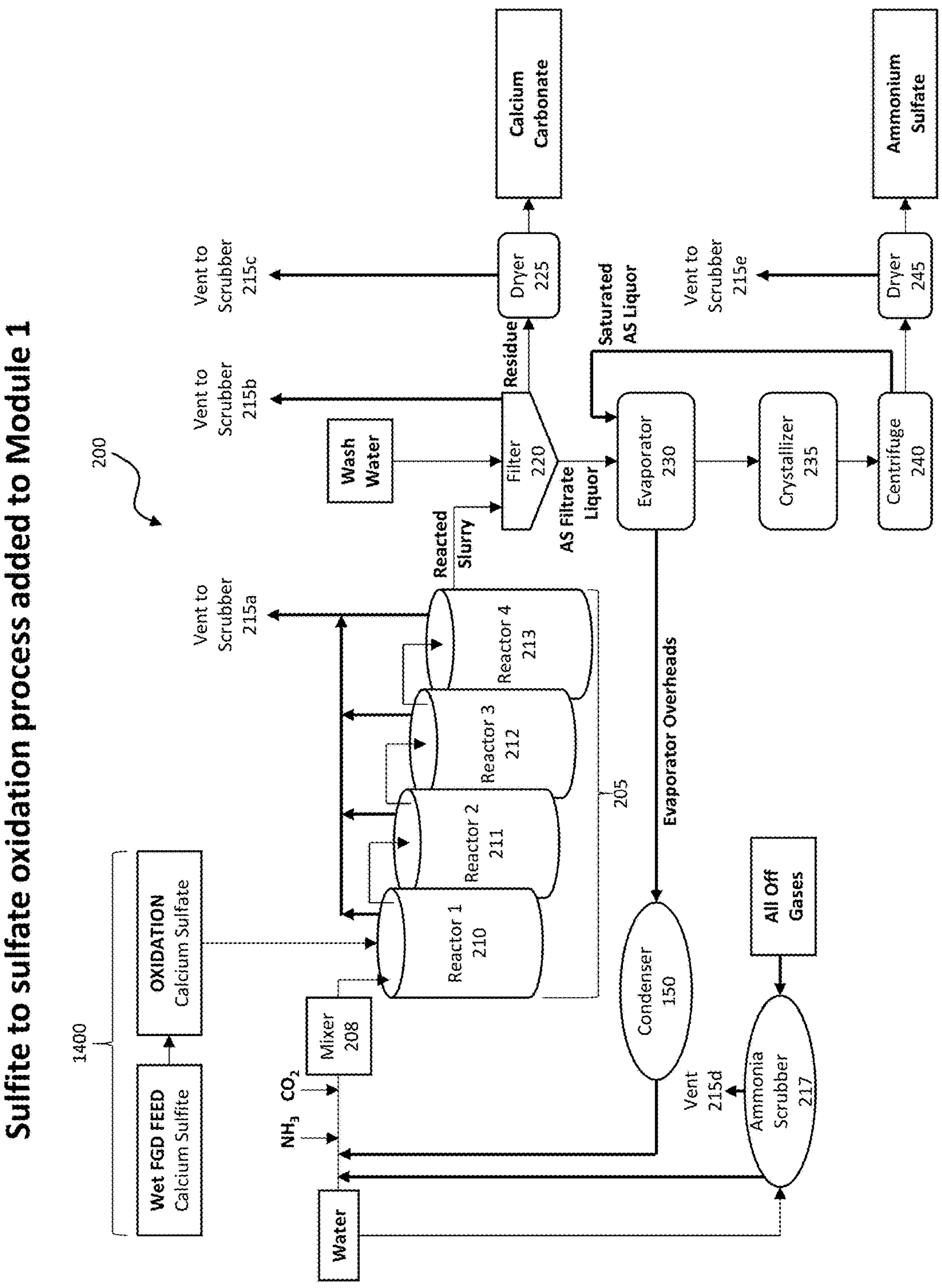
FIG. 14 depicts an embodiment of a calcium sulfite oxidation process added to FIG. 2 to treat the FGD gypsum feedstock prior to feeding into the FGD gypsum conversion process.

There are a number of oxidation methods that may be coupled to the FGD conversion process depicted in FIG. 2. FIG. 14 depicts a modified production plant 200 (FIG. 2) with the addition of an oxidation step 1400 for calcium sulfite to calcium sulfate conversion prior to feeding into the FGD gypsum conversion process.

Forced Air Oxidation: Conventional sparger oxidation bubble towers, which are expensive to build, can measure up to 60 feet in height and require 200% excess air to achieve complete conversion of calcium sulfite to calcium sulfate. A newer and less expensive approach uses air turbine oxidizer systems. These could be sited remotely and greatly reduce the conventional air oxidation retrofit. This process is also accomplished in an acidic environment. The calcium sulfite is extremely soluble in an acid medium and the sulfite ion in solution oxidizes very quickly in an agitated solution to a sulfate ion. Once the calcium sulfate forms, it precipitates to a gypsum slurry very rapidly. Other approaches use mechanical agitation for froth flotation with added air oxidation.

Air Oxidation over Time: Calcium sulfite will eventually convert to calcium sulfate when exposed to air and in the presence of water or in a slurry. The reaction is very slow and does not meet normal process requirements. However, inventories that have been stored outdoors for a long period of time may have mostly converted to calcium sulfate and can be used directly in the FGD gypsum conversion processes described herein. The mere fact that calcium sulfite is recognized as a mineral suggests that the sulfite to sulfate conversion kinetics are extremely slow.

Hydrogen Peroxide Oxidation: Sulfur dioxide, and/or its aqueous byproduct sulfite, may be oxidized to sulfate with hydrogen peroxide. The reaction occurs over a wide pH range but is faster at lower pHs. This is conducted in an aqueous medium and involves the oxidation of dissolved sulfite ion with peroxide to convert to the more insoluble sulfate. Calcium peroxide may be used in place of hydrogen peroxide.

Oxidation with Oxygen: The oxidation of calcium sulfite to calcium sulfate may be accelerated by using oxygen in place of air. The reaction may be performed at a low pH such as 4-5 to facilitate the reaction. In another embodiment, a low concentration of a metal ion is added as a catalyst aid in the reaction. Examples of suitable catalysts include 5 to 10 ppm ferric ion, manganese (II), or cobalt (II). The oxygen oxidation and catalyst process to convert sulfite to sulfate described in this disclosure may be performed in either a batch or in a continuous process. The primary reactions using a manganese catalyst are shown in equations (7) and (8) below.

$$2CaSO_3+O_2+Mn^{++}\text{ (catalyst)}\rightarrow 2CaSO_4+Mn^{++}\text{ (catalyst)} \quad (7)$$

$$CaSO_4.2H_2O\text{ (insoluble)}+(NH_4)_2CO_3\text{ (soluble)}\rightarrow (NH_4)_2SO_4\text{ (soluble)}+CaCO_3\text{ (insoluble)}+2H_2O \quad (8)$$

Figure 51:
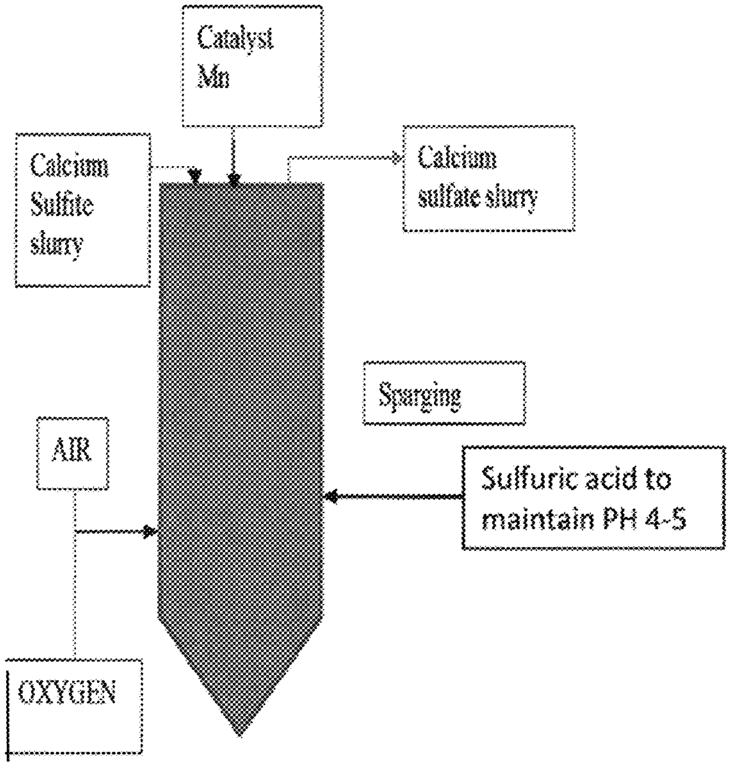
FIG. 51 depicts the process for converting sulfite to sulfate.

FIG. 51 depicts an embodiment of a process for converting calcium sulfite to calcium sulfate.

FIG. 14 depicts an embodiment of a process to convert calcium sulfite to calcium sulfate and then converting it to ammonium sulfate and calcium carbonate with ammonium carbonate.

The systems and methods disclosed herein were first developed by testing batch reactions under different conditions to oxidize sulfite to sulfate and arrive at initial operating conditions for a continuous demonstration. Initial test at pHs of 8-9 using an iron catalyst were not successful. Tests were run using 50% oxygen and 10% oxygen. However, a small reaction was observed at 50% oxygen at pH of 8. This indicates that lower pHs are more desirable.

Systems and methods are disclosed herein for continuous oxidation of calcium sulfite to calcium sulfate using an oxidizing gas stream of 50% or more of oxygen mixed with air to sparge through the sulfite slurry feedstock to form calcium sulfate. The pH of the sulfite slurry may be lowered from about 6.8 to between about 4-5 which may be maintained throughout the reaction. Concentrated sulfuric acid such as 20 wt % may be used to maintain the pH and keep all anions as sulfates. In some embodiments after dosing the sludge mix with oxygen, sulfuric acid may be added to maintain the low pH necessary for the reaction to take place. Below pH 4, $SO_2$ is evolved; above pH 5, the reaction is slowed down. A catalyst of manganous ion with a concentration of 1-10 millimolar (mmol) may be used to accelerate the reaction. Other catalysts such as iron and cobalt (II) may also be used. The reaction may carried out at ambient temperature, as higher temperatures reduce the oxygen solubility in water.

Figure 54:
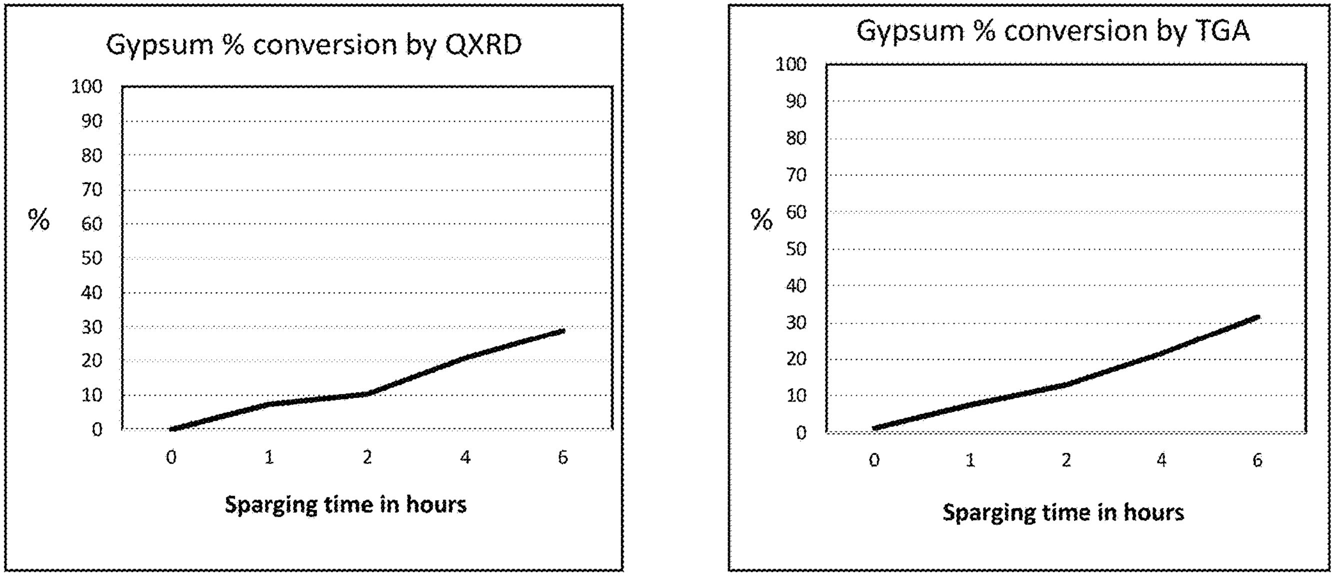
FIG. 54 depicts the kinetic data for the sulfite to sulfate reaction with just air and the Mn catalyst.

In an example of this embodiment, the reaction was >95% complete after about 4 hours of sparging with 50% oxygen and 3.2 mmol of Mn ion. When 10% oxygen and 3.2 mmol Mn was used, the reaction was less effective and resulted in only 32% conversion after 6 hours. With air in place of oxygen, the conversion was only 20-30% after six hours. Two different techniques were used to measure the conversion: 1) X-ray diffraction (QXRD), and 2) Thermogravimetric analysis (TGA). FIGS. 52, 53 and 54 show the conversion % as a function of time under 50% oxygen, 10% oxygen, and air conditions, respectively.

Phosphogypsum Conversion Systems and Methods Summary

Figure 57:
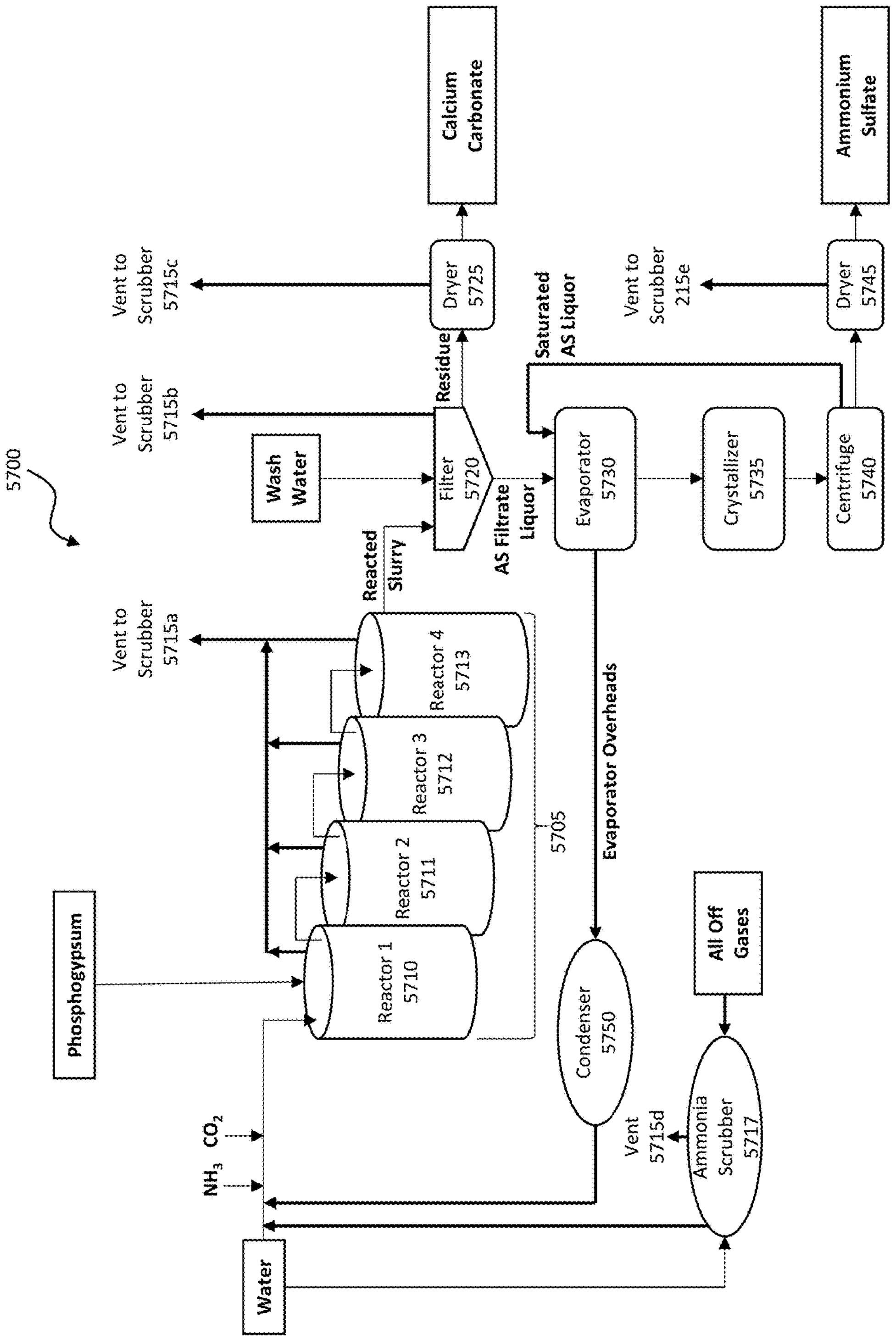
FIG. 57 depicts a production process for phosphogypsum conversion.
Figure 61:
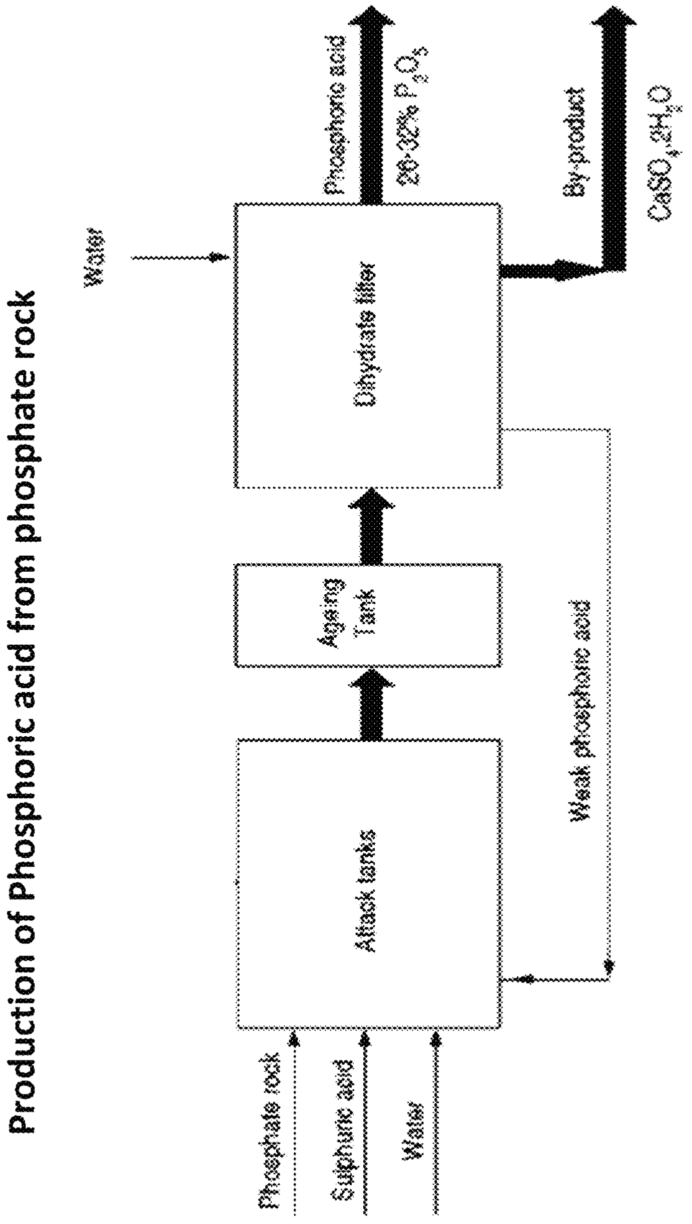
FIG. 61 shows a standard method for producing phosphoric acid from phosphate rock and producing phosphogypsum as a byproduct.

Phosphogypsum can be processed to produce ammonium sulfate crystals, precipitated calcium carbonate, REE misch metals, thorium and uranium, and ammonium nitrate solution. Phosphogypsum is a byproduct of the production of phosphoric acid from phosphate rock using sulfuric acid (FIG. 61). Process flowsheets developed for an example phosphogypsum process are shown in FIGS. 57 and 58. The process may be a batch process or a continuous process.

Disclosed herein are systems and methods for reacting phosphogypsum (PG), in either batch or continuous mode, with an ammonium carbonate reagent to produce commercial products, wherein the commercial products comprise ammonium sulfate and calcium carbonate. The PG may have impurities as shown in FIG. 3. The systems and methods described herein are highly beneficial to the coal industry in that they produce higher value products from coal waste. The primary reaction is shown in equation (9) below.

$$CaSO_4.2H_2O\text{ (insoluble)}+(NH_4)_2CO_3\text{ (soluble)}\rightarrow (NH_4)_2SO_4\text{ (soluble)}+CaCO_3\text{ (insoluble)}+2H_2O \quad (9)$$

The mixture of ammonium sulfate and calcium carbonate is referred to as the first reacted slurry. FIG. 57 depicts an embodiment of a production plant 5700 for implementing a PG conversion process resulting in at least two commercial products. In the depicted embodiment, PG (calcium sulfate) feedstock is fed, either in batch or continuous mode, into one or more reactors 5705 (comprising reactors 5710, 5711, 5712, and 5713) with ammonium carbonate reagent, which may be synthesized from ammonia and carbon dioxide gases or supplied as a powder. In some embodiments, the PG gypsum feedstock may be fed to the system using a quantitative powder feeder or a gravimetric feeder optionally coupled to a screw feeder (not shown). In some embodiments, the PG gypsum feedstock is in powder form. In embodiments where the PG gypsum feedstock is moist, it may require drying prior to feeding to avoid blockages in the feeder. In some embodiments, the PG gypsum feedstock may be dried to 7% by weight or less moisture content.

The number of reactors 5705 may vary depending on throughput required, the size and type of reactors, and the reaction time needed. In some embodiments, there may be between three and five reactors. As an example, for a two-hour reaction with four reactors having total volume V, the scaled total volume needed would be 4/3 V for three reactors and 2V for two reactors. The same rule applies when increasing the number of reactors. In some embodiments, the size of the reactors 5710, 5711, 5712, and 5713 may be reduced using weirs.

The one or more reactors 5710, 5711, 5712, and 5713 may be connected in overflow mode (material overflows from the top of a reactor to the next reactor) or underflow mode (material flows from the bottom of a reactor to the next reactor), or material may be transferred using one or more pumps between the one or more reactors. In some embodiments, the one or more reactors 5710, 5711, 5712, and 5713 may be continuously stirred tank reactors (CSTRs), stirred tank reactors and/or plug-flow reactors. In some embodiments, the first reactor 5710 may be a small, high intensity reactor to thoroughly mix the PG gypsum feedstock and reagent, followed by two to three (larger, in some embodiments) reactors 5711, 5712, and/or 5713 to hold the mixture long enough for the reaction to reach completion (i.e. 99+% conversion of PG gypsum feedstock) resulting in a reacted slurry. In the depicted embodiment, the reactor cascade 5705 vents ammonia gas from the ammonium carbonate reagent through vent 5715*a* to the scrubber 5717. Either water or between 0.01 to 0.1M sulfuric acid may be used in the scrubber 5717. The ammonia from the vents 5715*a-e* dissolves in water to yield ammonium hydroxide or, in the case of sulfuric acid, the ammonia reacts to form ammonium sulfate. The ammonium hydroxide or ammonium sulfate from the scrubber 5717 may optionally be recycled back into the reagent feed line into reactor 5710, in some embodiments.

After the reaction has reached completion, the first reacted slurry is pumped, underflows, or overflows from the reactor cascade 5705 into a filter 5720 resulting in calcium carbonate residue and ammonium sulfate filtrate. Wash water is pumped through filter 5720 in the depicted embodiment. Ammonia off-gases from the filter 5720 vent through vent 5715*c* to scrubber 5717. In some embodiments, filter 5720 may be a drum filter or other similar continuous filter. The calcium carbonate residue from filter 5720 proceeds to dryer 5725 to produce calcium carbonate product. In the depicted embodiment, dryer 5725 vents through vent 5715*c* ammonia to scrubber 5717. In some embodiments, the calcium carbonate product may be further processed. Further processing options are discussed in the Examples.

In the depicted embodiment, ammonium sulfate filtrate proceeds from filter 5720 to evaporator 5730 where water is evaporated from the ammonium sulfate liquor to form an ammonium sulfate liquor, and then to crystallizer 5735 where ammonium sulfate crystals are produced in the ammonium sulfate liquor. Centrifuge 5740 separates the ammonium sulfate crystals from the ammonium sulfate liquor resulting in separated ammonium sulfate crystals and saturated ammonium sulfate liquor. Dryer 5745 dries the separated ammonium sulfate crystals resulting in ammonium sulfate product. The dryer 5745 vents through vent 5715*e* to scrubber 5717. In some embodiments, saturated ammonium sulfate liquor may be pumped from the centrifuge 5740 back into the evaporator 5730. Overheads or vapors coming off the top of the evaporator 5730, containing excess ammonium carbonate reagent, may optionally proceed through a condenser 5750 (evaporator condensate) to be recycled back into the reactor cascade 5705 to react with the PG gypsum feedstock thus reducing reagent demand and reducing waste streams. In the depicted embodiment, water is pumped into the reactor cascade 5705 and into the ammonia scrubber 5717. In the depicted embodiment, all off-gases, including water vapor and ammonia in some embodiments, vent through vents 5715*a*, 5715*b*, 5715*c*, 5715*d*, 5715*e* to ammonia scrubber 5717.

In some embodiments, the ammonium sulfate may be vacuum evaporated to form a salt. The salt may then be allowed to crystallize out, and the crystallized product is then filtered using a solid/liquid separation device. The conditions in the crystallizer 5735 may be controlled to produce larger crystals which are more desirable in some markets. The ammonium sulfate product may be greater than or equal to 99% pure. The ammonium sulfate crystallization and the centrifuge separation processes may be continuous or batch processes.

Filter 5720 and centrifuge 5735 are both solid/liquid separators and may be substituted by other solid/liquid separators in other embodiments. For example, a belt filter may be used in place of filter 5720 and a rotating drum filter may be used in place of the centrifuge 5735. In some embodiments, a spray dryer may be used in place of the evaporator 5730 and crystallizer 5735. The spray dryer evaporates the water and forms small crystals all in one step. Continuous filtration systems other than those depicted in FIG. 57 may be utilized in the process. The equipment used in the process may be sized to fit the desired input/output. Material transfer between processes and/or equipment may be carried out with the use of pumps, etc.

Reagents

In the embodiment depicted in FIG. 57, ammonium carbonate reagent is synthesized using ammonia ($NH_3$) and carbon dioxide ($CO_2$) gases in flowing water. In some embodiments, the $NH_3$ and $CO_2$ gas are injected in the stoichiometric ratio of 2:1 respectively. The gases may be introduced sequentially using gas nozzles into a flowing water stream in either a batch process or a continuous process. The gases are best fed sequentially with the $NH_3$ first followed by the $CO_2$ because $NH_3$ is more soluble in water than $CO_2$ and $CO_2$ is more soluble in ammonium hydroxide than in plain water. This order of gas introduction into the water has been found to reduce the chances of an ammonia gas release. In alternative embodiments, the order of gas introduction into the water may be reversed. Sequential feed of the $NH_3$ and $CO_2$ gases reduces chance of clogging in the gas nozzle; however, the $NH_3$ and $CO_2$ gases may be premixed, in some embodiments. The $NH_3$ and $CO_2$ gases may be mixed with process water using a mixer such as an in-line mixer or a reactor tank with mixer resulting in an ammonium carbonate reagent solution. In some embodiments, the gases may be fed directly into the mixer.

The pH may optionally be monitored to ensure carbonate is formed (formed between pH 8.7-9.0), rather than bicarbonate, which is formed at lower pHs. Conductivity and/or the specific gravity may be monitored using an electric conductivity meter and a hydrometer, respectively, to determine the concentration of ammonium carbonate reagent formed. Both conductivity and specific gravity increase as the concentration of the ammonium carbonate formed in solution increases. For example, for a 15% concentration of ammonium carbonate in solution, the conductivity is 80-90 mS/cm (milli-siemens/centimeter).

The resulting ammonium carbonate reagent may be fed directly into reactor cascade 5705. In some embodiments, the ammonium carbonate reagent is added in excess (more than stoichiometric) to ensure the reaction goes to completion (i.e. until all the PG feedstock is reacted). In some embodiments, 140% stoichiometric addition of the ammonium carbonate reagent results in the reaction going to completion. If the reaction is not complete, then the calcium carbonate product is contaminated with phosphogypsum feedstock.

Calcium Carbonate Whitening

FIG. 58 shows a process for producing a highly pure calcium carbonate product. The calcium carbonate may be purified by dissolution in a solvent 5802, such as a nitric acid solution in a dissolver 250. This dissolves the calcium but leaves most of the impurities (REEs, radioactive elements, and other impurities) undissolved, as shown in equation (10).

$$CaCO_3\ (s)+\text{impurities}\ (s)+2HNO_3 \rightarrow Ca(NO_3)_2\ (l)+\text{impurities}\ (s)+CO_2\ (g)+H_2O\ (g) \quad (10)$$

The carbon dioxide produced in this reaction may be vented to an ammonium hydroxide scrubber 5810 to produce ammonium carbonate, as shown in equation (11):

$$CO_2\ (g)+2NH_4OH\ (l) \rightarrow (NH_4)_2CO_3\ (l)+H_2O\ (l) \quad (11)$$

Figure 47:
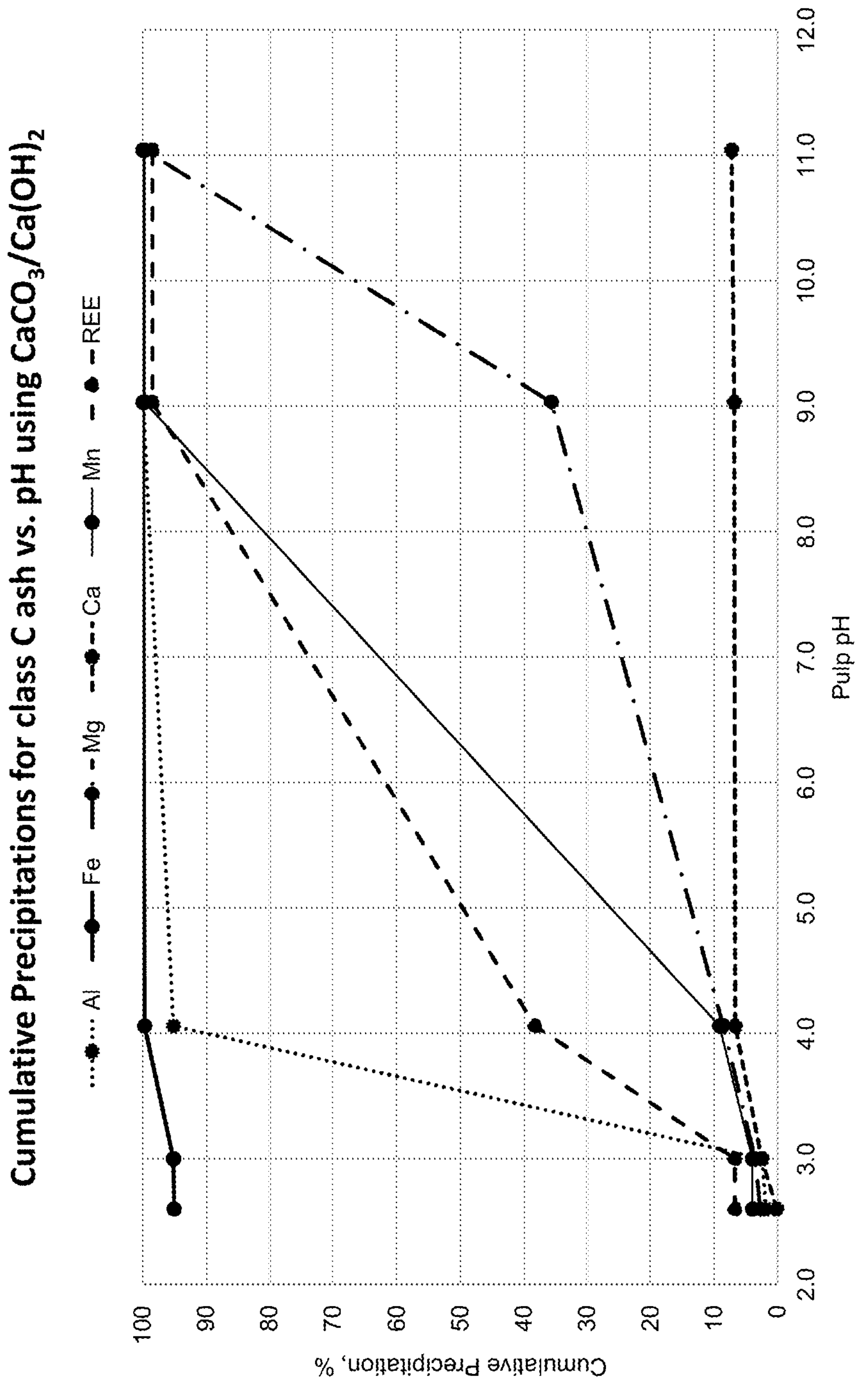
FIG. 47 is a chart depicting cumulative precipitations versus pH for the lime flowsheet (calcium carbonate and calcium hydroxide) for class C ash feedstock.

Highly acidic pHs may dissolve most of the impurities except silicates and carbon. The insoluble silicates, carbon, aluminum silicates, mullite, and other impurities may be filtered 5814 before the slurry proceeds to a third reactor 5818. Although FIG. 58 depicts a single reactor, in some embodiments, one, two, or three reactors may be used. Additionally, each reactor may perform one or more pH adjustments. A base 5816, such as calcium hydroxide, sodium hydroxide, potassium hydroxide, ammonium hydroxide, and other bases known in the art may be used to increase the pH. The pH can then be increased stepwise in reactor 260 to, for example, pH 4 to precipitate dissolved aluminum, iron, thorium and uranium as shown in FIGS. 47 and 48. Next, the pH may be raised to 9 using a base to precipitate dissolved manganese, lanthanum, praseodymium, cerium, neodymium, and yttrium as shown in FIGS. 47 and 48. Then, the pH may be increased to 11 to precipitate REEs, Mg, and any other dissolved elements except calcium as shown in FIGS. 47 and 48. Each of these pH adjustments may be performed in a single reactor or in a plurality of reactors.

The insoluble impurities at the different pHs may be filtered 5820. Although FIG. 58 shows only one filter, some embodiments may have more than one filter. In some aspects, the number of filters 5820 may be equal to the number of reactors 5818, and the slurry from each reactor may be filtered before proceeding to the next reactor. In some examples, there may be one, two, or three filters to filter the slurries from one, two, or three reactors, respectively.

The filtrate from each of the filters 5820 may proceed to a dryer 5822. Although FIG. 58 depicts only one dryer, in some embodiments there may be more than one dryer. In some aspects, the number of dryers may be equal to the number of filters. In some examples, there may be one, two, or three dryers to filter the filtrates from one, two, or three filters.

After all pH adjustments have been performed and the reacted slurry filtered, a calcium nitrate liquor remains. The calcium nitrate liquor may then be precipitated in a reactor 5826 by adding a soluble carbonate 5828, such as ammonium carbonate, carbon dioxide, sodium carbonate, or potassium carbonate. The result is a high purity precipitated calcium carbonate (PCC) and, when ammonium carbonate is used, a solution of ammonium nitrate, which may be marketed as a fertilizer. The reaction of ammonium carbonate and calcium nitrate is shown in equation (12):

$$Ca(NO_3)_2\ (l)+(NH_4)_2CO_3\ (l)\rightarrow CaCO_3\ (s)+2NH_4NO_3\ (l) \quad (12)$$

To maintain the process as a net carbon capture, the carbon dioxide evolved during the dissolution of the calcium carbonate is absorbed in an ammonium hydroxide scrubber and then used as the reagent to precipitate the PCC product, as shown in equation (13):

$$CO_2\ (g)+2NH_4OH\ (l)\rightarrow(NH_4)_2CO_3\ (l)+H_2O\ (l) \quad (13)$$

The slurry from reactor 5826 then proceeds to a filter 5830, where the precipitated calcium carbonate is separated from the ammonium nitrate. The calcium carbonate proceeds to a dryer 5832 to remove any remaining liquid impurities 5834. The filtrate containing ammonium nitrate proceeds to an evaporator 5836, resulting in a highly pure ammonium nitrate solution that may be marketed as a fertilizer 5838.

The final step may include adding ammonium carbonate to form an insoluble calcium carbonate and an ammonium nitrate solution (reaction 12). The calcium carbonate may be filtered 280, washed, and then dried 285 to produce a high-quality precipitated calcium carbonate product. The ammonium nitrate solution may be concentrated by evaporator 290 and marketed as a fertilizer.

Ash Conversion Systems and Methods

Described herein are systems and methods for generating valuable products from coal ash with near-zero waste. The systems and methods disclosed herein are unique in that they are the first demonstrated systems and methods that can convert coal ash feedstock (and other metal-bearing feedstocks) into marketable products of high value with near-zero waste.

The ash conversion process may begin with a leach process. A leach process, in some embodiments, may involve contacting, passing, and/or percolating an acid through a feedstock. In some embodiments, the leach process may be performed in one or more stages using one or more different acids or different concentrations of the same acids. In an exemplary embodiment, the leach process is performed in two-stages using different concentrations of hydrochloric acid.

In some embodiments, elements and/or compounds in the leachate resulting from the leach process in the ash conversion process may then be separated by selective precipitation at one or more different pHs. pH adjustments may be made to the leachate using a base such as calcium hydroxide (lime) or sodium hydroxide (caustic), or both in separate steps. Potassium and ammonium hydroxides are other possible bases that may be utilized for pH adjustment of the leachate. After each precipitation, the precipitate is separated by filtration and the filtrate proceeds to the next pH adjustment and precipitation. In some embodiments, one or more hydroxides of iron, aluminum, misch metals (rare earth elements (REEs) and transition metals), magnesium, and calcium may be separated sequentially. In some embodiments, the separations may achieve high purities greater than 90%. Depending on the base(s) used in pH adjustments to the leachate, the final liquor at the end of the ash conversion process may comprise high-purity sodium chloride, resulting in near-zero waste streams. The pH adjustments described herein may be equally applied to the FGD conversion process described above.

Figure 18:
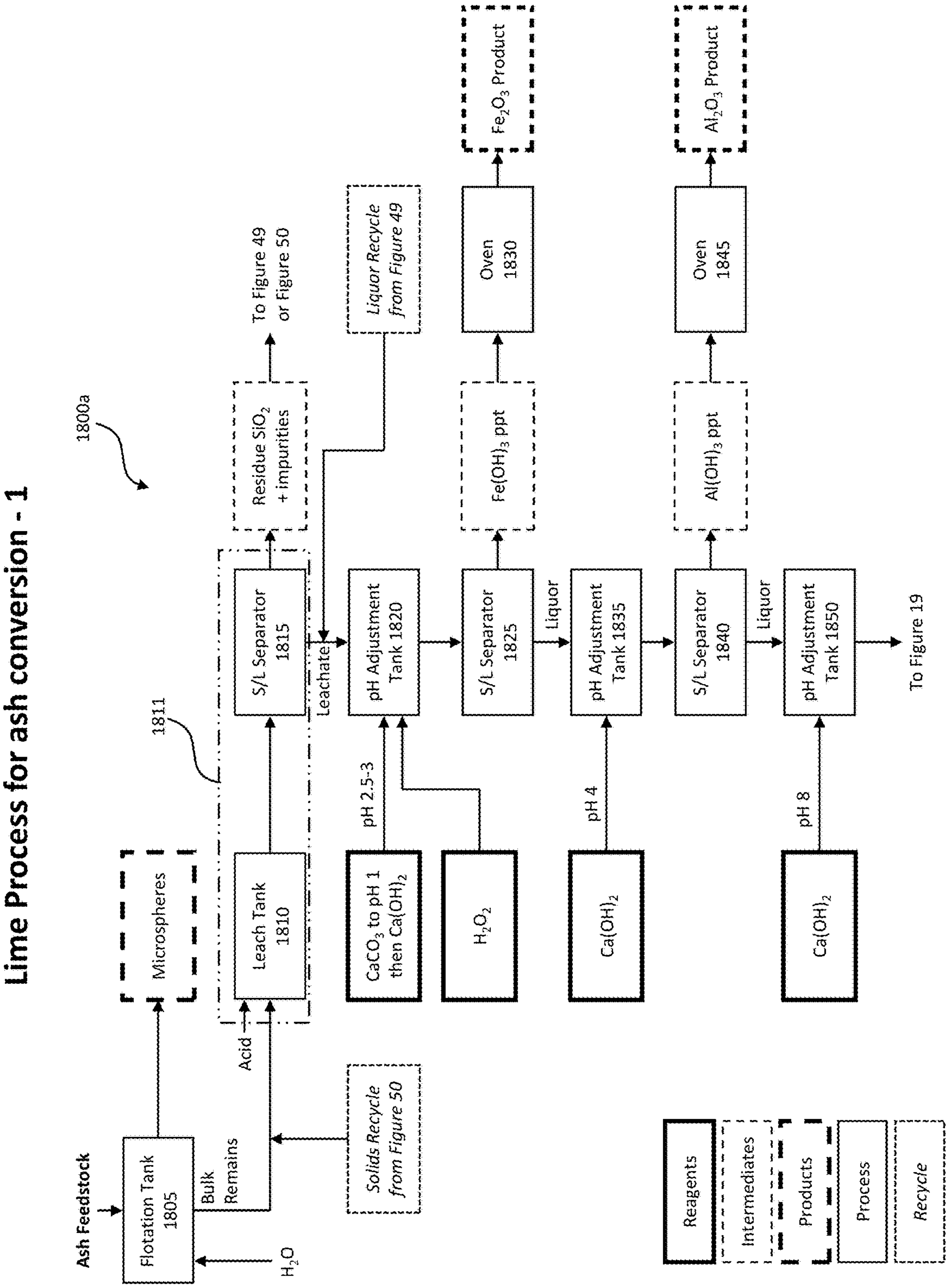
FIG. 18 depicts a lime embodiment of an ash conversion system and process.
Figure 19:
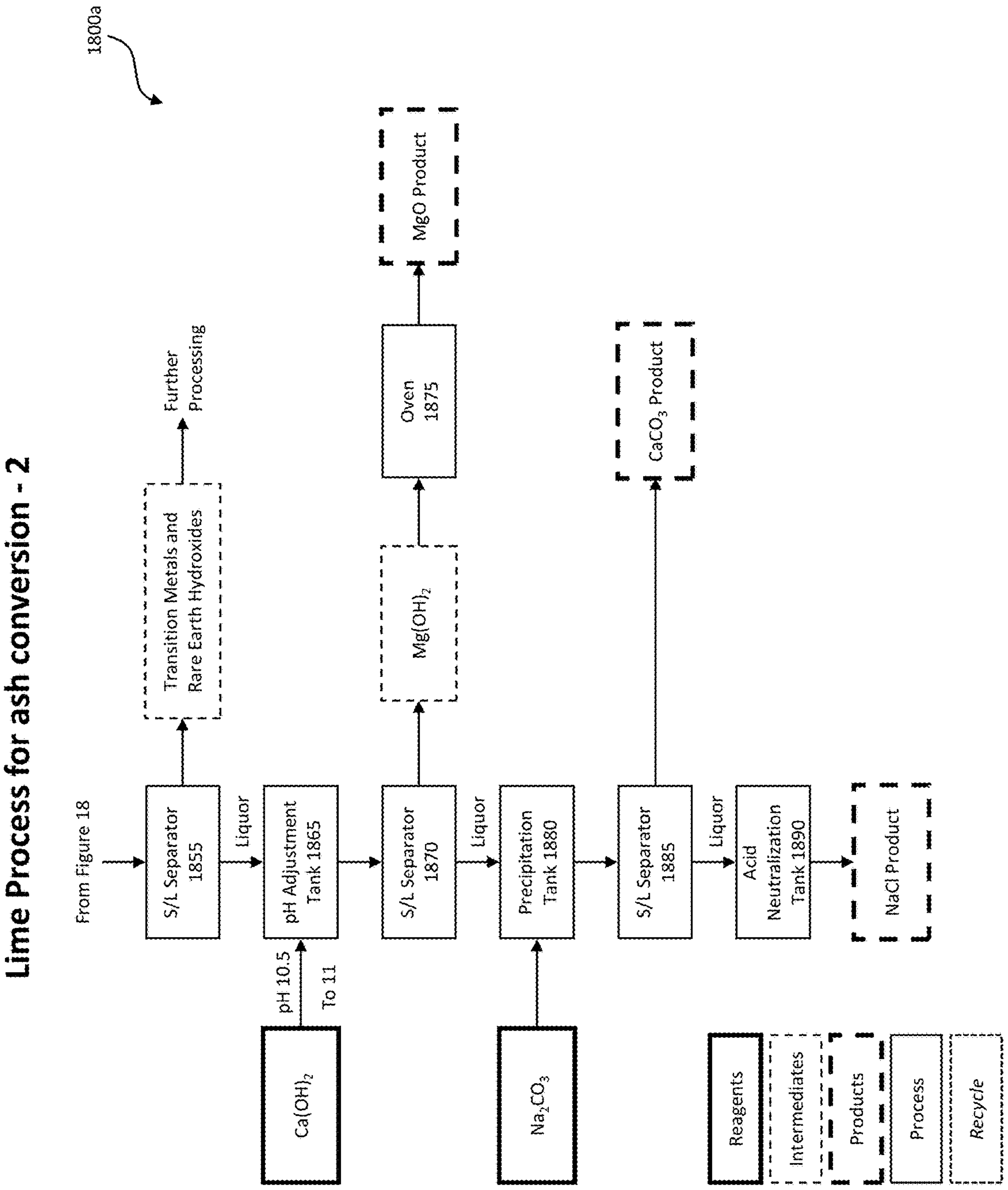
FIG. 19 is a continuation of the FIG. 18 flowsheet.
Figure 20:
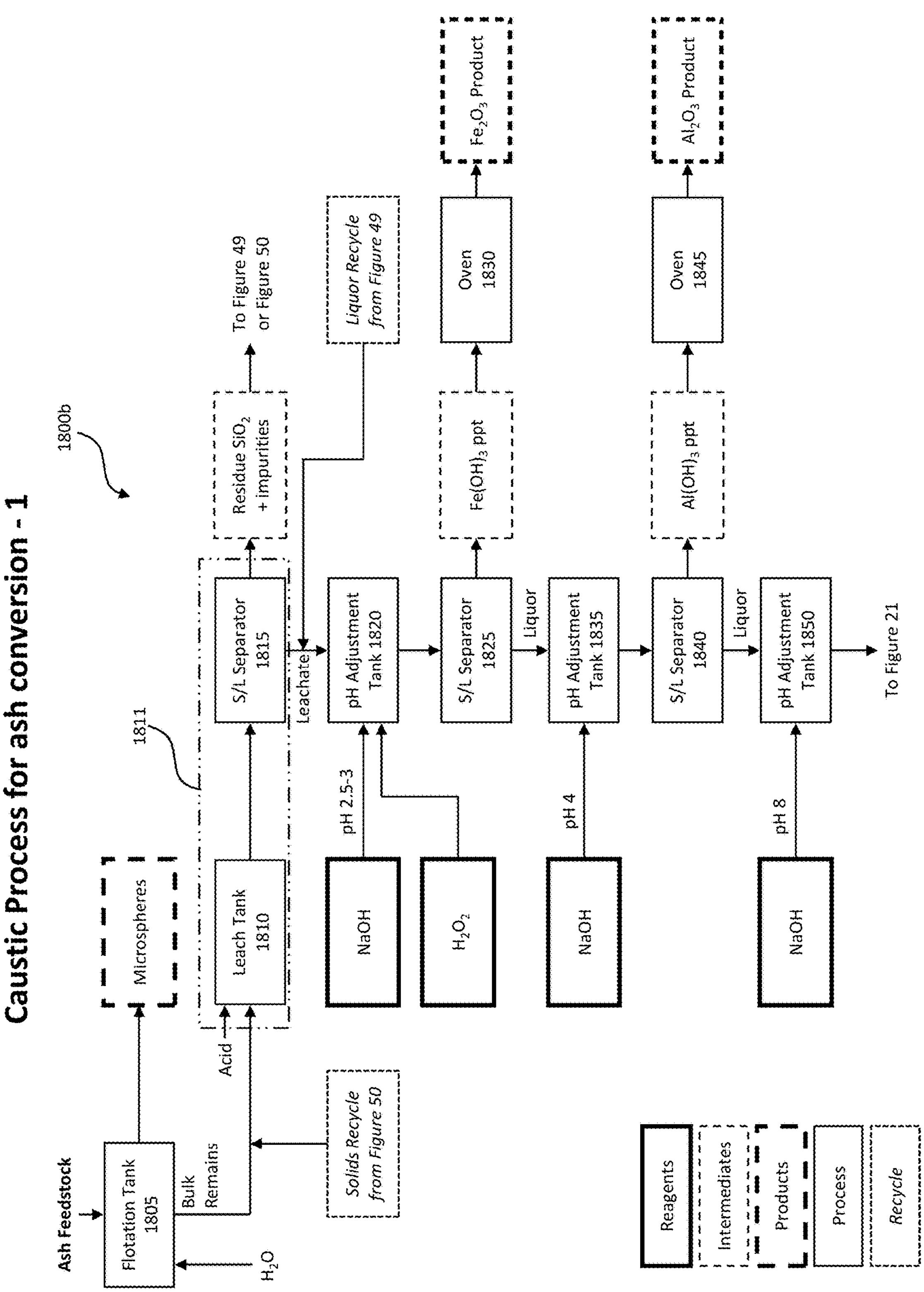
FIG. 20 depicts a caustic embodiment of an ash conversion system and process.
Figure 21:
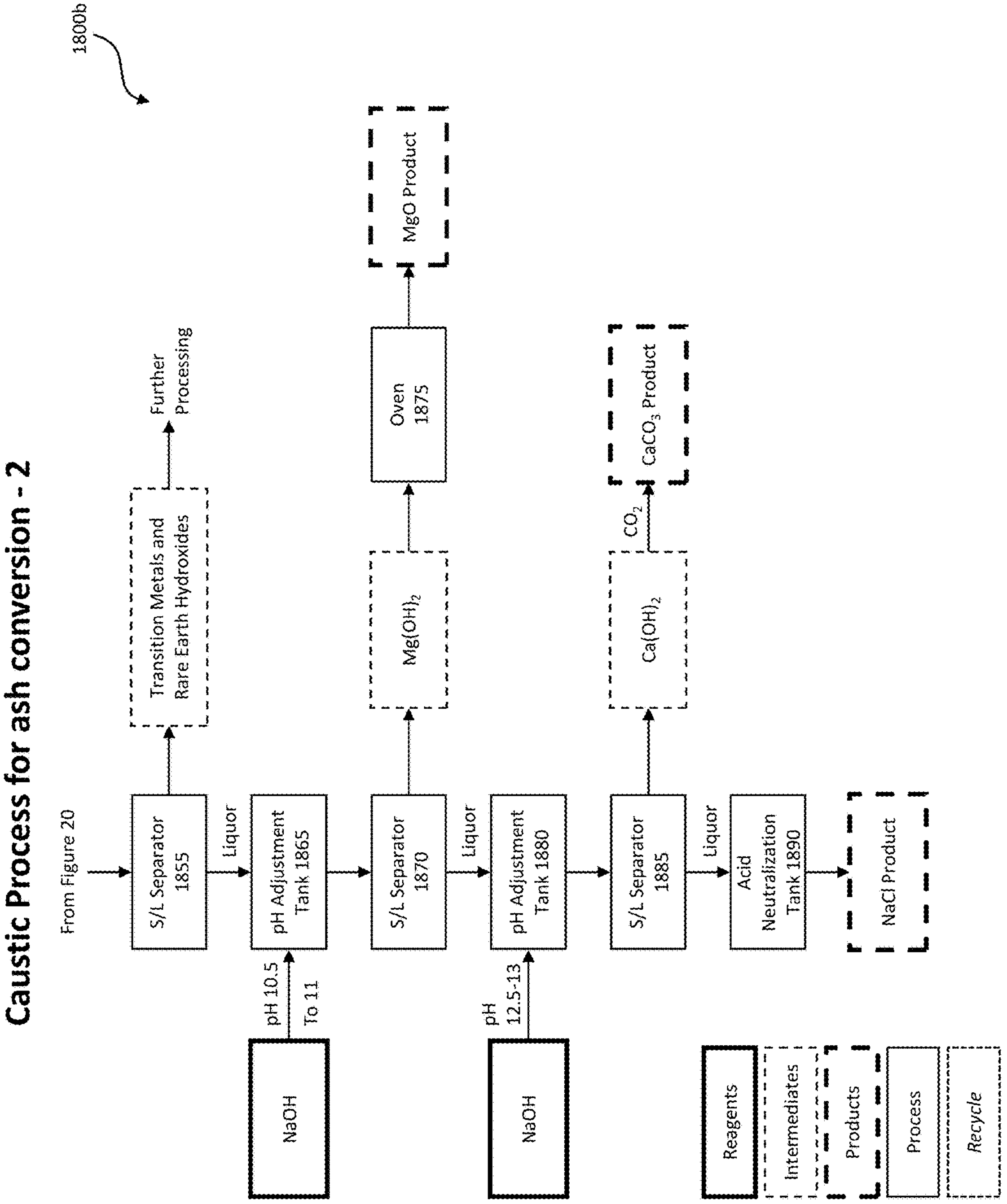
FIG. 21 is a continuation of the FIG. 20 flowsheet.
Figure 31:
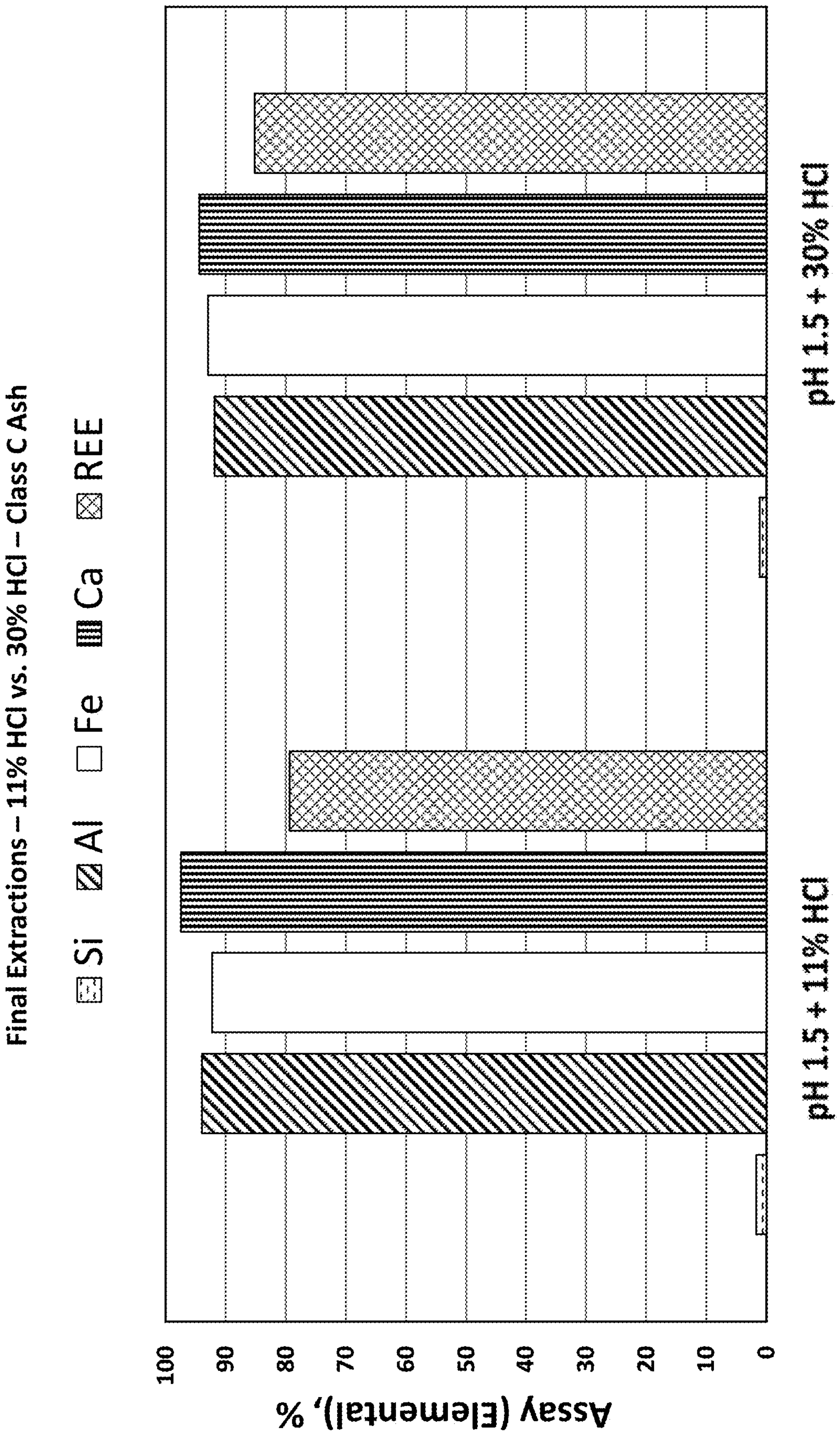
FIG. 31 graphically depicts 11% versus 30% hydrochloric acid leachates for class C ash feedstock.
Figure 32:
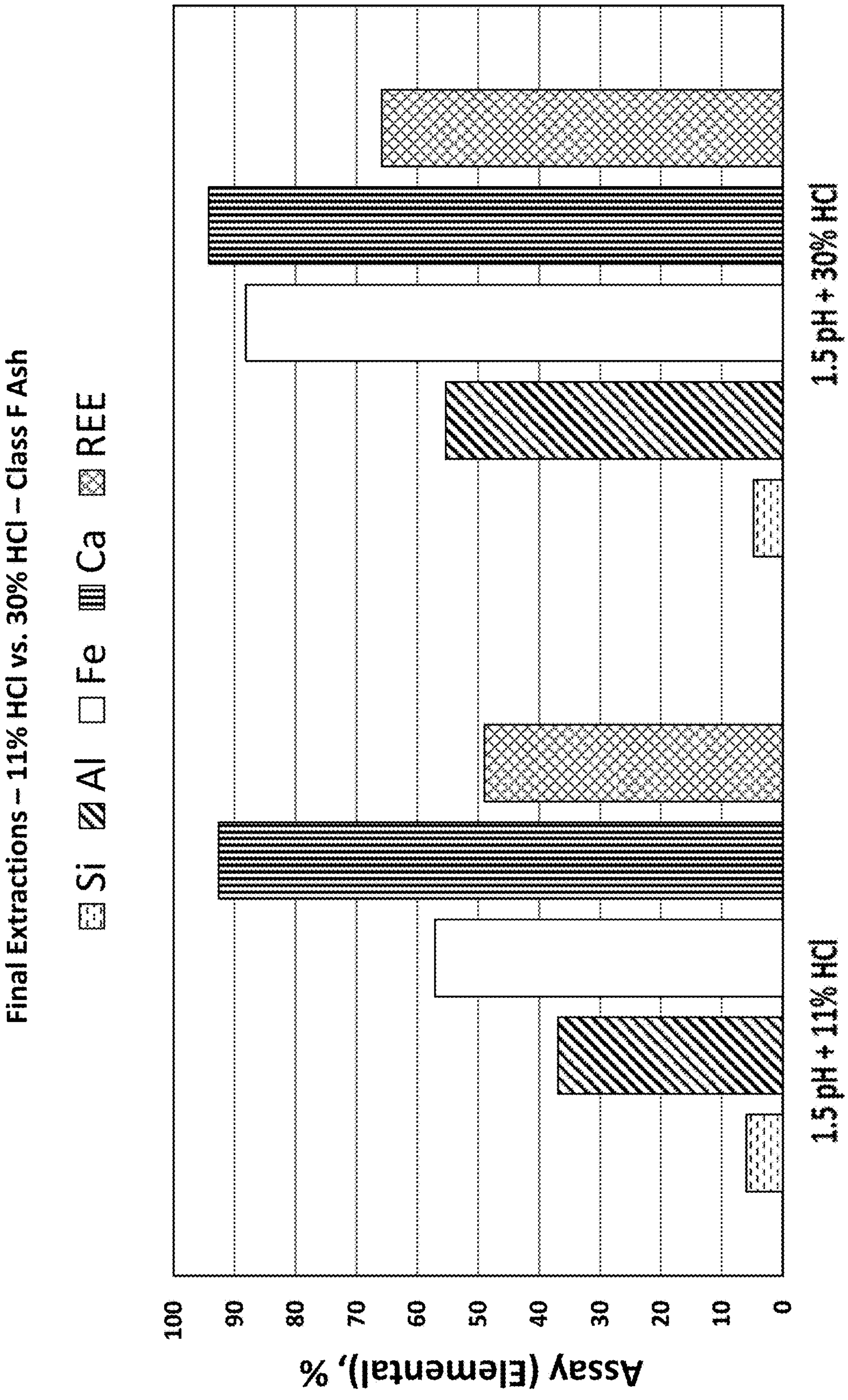
FIG. 32 graphically depicts 11% versus 30% hydrochloric acid leachates for class F ash feedstock.
Figure 33:
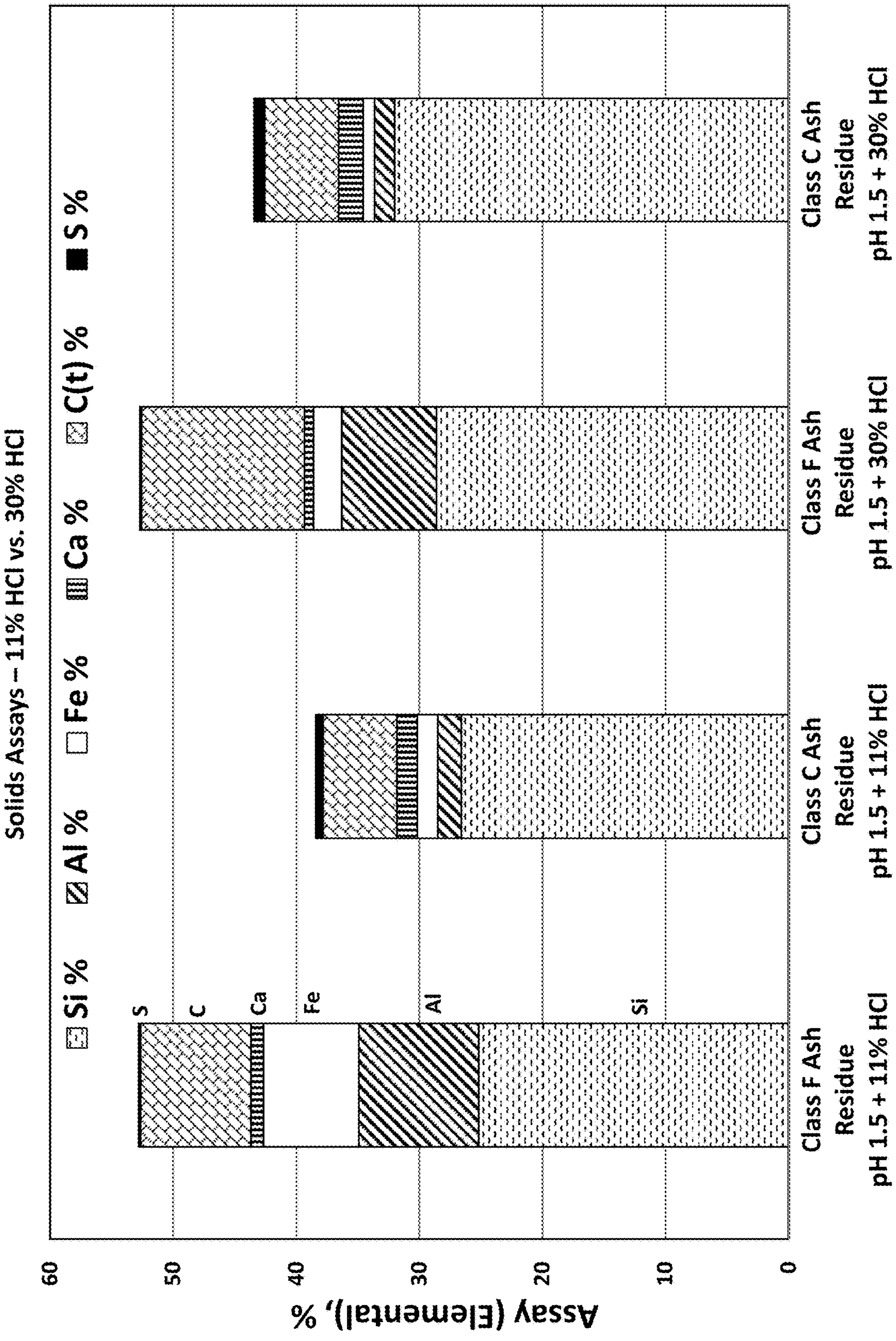
FIG. 33 graphically depicts elemental composition of 11% versus 30% hydrochloric acid residues for class C ash and class F ash feedstocks from FIG. 28 and FIG. 29 leaches.

FIGS. 18 through 21 depict embodiments of an ash conversion system and method for producing valuable products from an ash feedstock with near-zero waste. FIGS. 18 and 19 depict a lime embodiment of the ash conversion system and method and FIGS. 20 and 21 depict a caustic embodiment of the ash conversion system and method. In some embodiments, the ash feedstock may be powdered. In some embodiments, the ash feedstock may be slurried.

Lime Embodiment

FIGS. 18 and 19 depict a lime embodiment 1800*a* of the ash conversion system and method for producing valuable products from an ash feedstock with near-zero waste. In the depicted embodiment, ash feedstock is first floated with water in a flotation tank 1805 to remove microspheres (also called cenospheres), which can be marketed as a product. In some embodiments, microspheres may make up 1-2 wt % of the ash feedstock. The microspheres may be composed primarily of aluminosilicates. The microspheres are hard and hollow, lightweight, waterproof, innoxious, and insulative. This makes them highly useful in a variety of products, notably fillers. The microspheres are also used as fillers in cement to produce low-density concrete.

Figure 50:
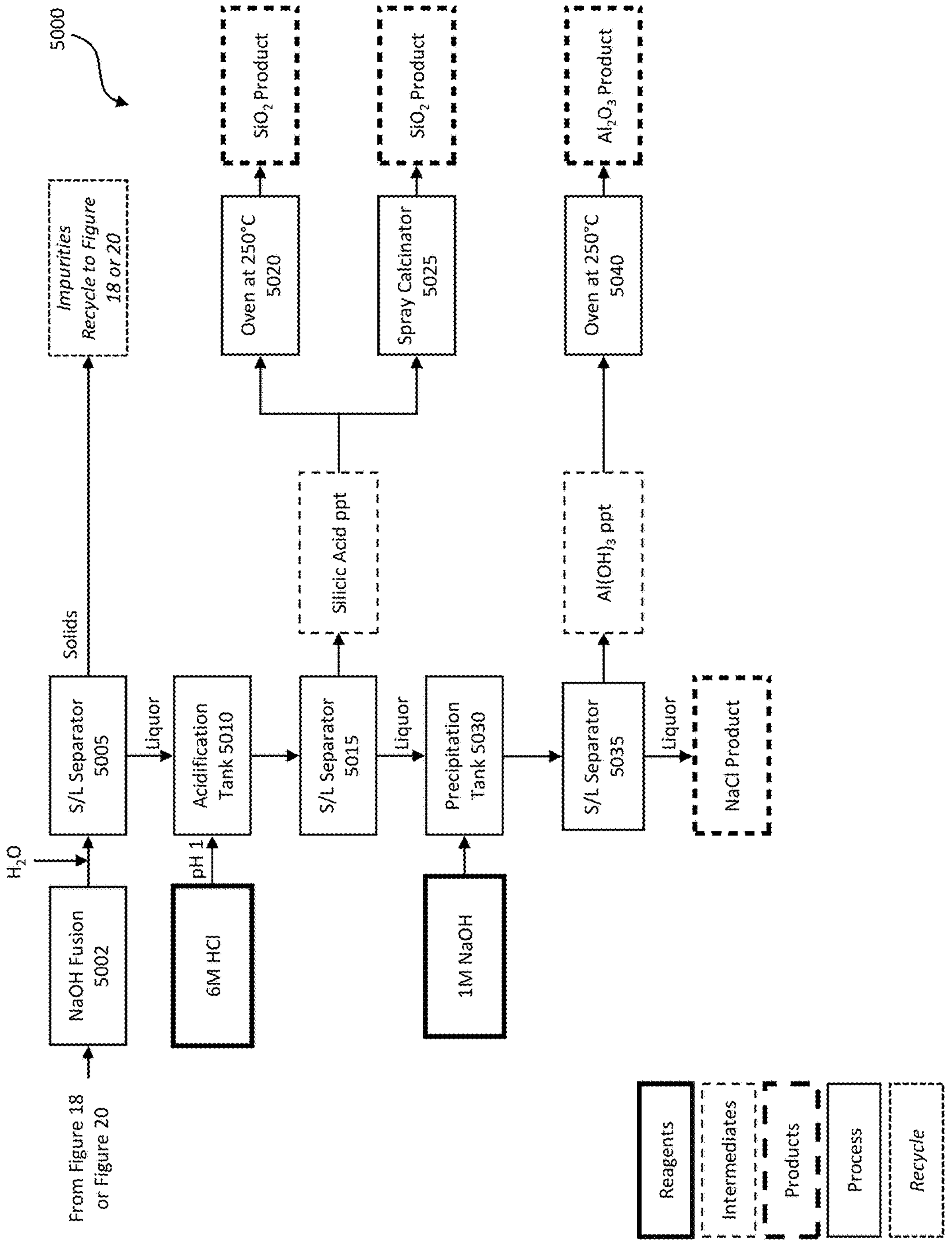
FIG. 50 depicts another optional process embodiment for refining a silica product by using caustic fusion.

The remainder of the ash feedstock, with optional solids recycle from a silica fusion process depicted in FIG. 50, proceeds to leach tank 1810 in leach process 1811. Leaching may be completed in one or two stages using one or more different acids or different concentrations of the same acids resulting in leached ash feedstock. In some embodiments, leaching may be performed in two-stages with hydrochloric acid (HCl) of differing concentrations. The leach process 1811 is disclosed in more detail using examples and experimental data under the Examples heading and in FIG. 35.

Still referring to FIG. 18, the leached ash feedstock is separated in solid/liquid separator 1815 resulting in solids, comprising silica and other impurities in some embodiments, and liquor. The solids may proceed to either FIG. 49 or FIG. 50 for further processing. The liquor from solid/liquid separator 1815, along with optional liquor recycle from FIG. 49 proceeds to a pH adjustment tank 1820 where pH is adjusted to precipitate particular components. In the depicted embodiment, the pH is first adjusted from less than 1 to pH 1 using calcium carbonate ($CaCO_3$) then to between pH 2.5 to 3 using calcium hydroxide ($Ca(OH)_2$ or lime). The calcium carbonate may be sourced from the FGD conversion process described above and shown in FIG. 2. Hydrogen peroxide ($H_2O_2$) may also be added to the pH adjustment tank 1820 to convert ferrous iron to ferric iron. The pH adjusted solution from pH adjustment tank 1820 proceeds to solid/liquid separator 1825 resulting in solids comprising predominantly iron hydroxide ($Fe(OH)_3$) precipitate and liquor. The $Fe(OH)_3$ may be marketed as-is or calcined in an oven 1830 (at 300° C., in some embodiments) with air circulation to ferric oxide (alpha-$Fe_2O_3$). The liquor from solid/liquid separator 1825 proceeds to a second pH adjustment tank 1835 where the pH is adjusted to pH 4 using $Ca(OH)_2$, in the depicted embodiment. The pH adjusted solution from pH adjustment tank 1835 proceeds to solid/liquid separator 1840 resulting in solids comprising predominantly aluminum hydroxide ($Al(OH)_3$) and liquor. The $Al(OH)_3$ can be marketed as-is or calcined in an oven 1845 (at 250° C., in some embodiments) to alumina ($Al_2O_3$). The liquor from solid/liquid separator 1840 proceeds to a third pH adjustment tank 1850 where the pH is adjusted to pH 8 using $Ca(OH)_2$, in the depicted embodiment. The pH adjusted solution from pH adjustment tank 1850 proceeds to FIG. 19.

FIG. 19 is a continuation of FIG. 18. The pH adjusted solution from the third pH adjustment tank 1850 proceeds to solid/liquid separator 1855 resulting in solids comprising predominantly rare earth hydroxides and some transition metals. The transition metals and rare earth hydroxides may be sold as-is or may proceed to further separation/processing disclosed in more detail under the Products heading. The liquor from solid/liquid separator 1855 proceeds to a fourth pH adjustment tank 1865 where the pH is adjusted to pH 10.5 to 11 using $Ca(OH)_2$, in the depicted embodiment. The pH adjusted solution from pH adjustment tank 1865 proceeds to solid/liquid separator 1870 resulting in solids comprising predominantly magnesium hydroxide ($Mg(OH)_2$) and liquor. The $Mg(OH)_2$ may be marketed as-is or may be calcined in an oven 1875 (at 250° C., in some embodiments) to magnesium oxide (MgO). The liquor from solid/liquid separator 1870, which contains calcium ions, proceeds to precipitation tank 1880 where a stoichiometric amount of sodium carbonate ($Na_2CO_3$) is added to precipitate calcium carbonate. The solution from the precipitation tank 1880 proceeds to solid/liquid separator 1885 resulting in solid calcium carbonate ($CaCO_3$) and a liquor. The total calcium carbonate produced is the sum of the calcium in the ash feed plus the lime reagent ($Ca(OH)_2$) used for pH adjustment. The liquor from solid/liquid separator 1885 proceeds to an acid neutralization tank 1890 where the hydroxides used in the solid/liquid separation steps (1815, 1825, 1840 FIGS. 18 and 1855, 1870, 1885 FIG. 19) are neutralized to pH 7 with HCl. The final product is sodium chloride (NaCl) and may be marketed as a solution (brine) or the NaCl salt may be crystallized out of the solution using a crystallizer or spray dryer (not depicted).

Caustic Embodiment

The caustic embodiment 100*b* (FIGS. 20 and 21) of the ash conversion process may comprise essentially the same steps and equipment as the lime embodiment 100*a* (FIGS. 18 and 19) of the ash conversion process with the primary difference being the reagent used in the pH adjustment steps. In the caustic embodiment, caustic (sodium hydroxide, or NaOH) is used in place of lime ($Ca(OH)_2$) in the pH adjustment steps. In some embodiments, the NaOH concentration may be 20 wt %.

FIGS. 20 and 21 depict a caustic embodiment 1800*b* of the ash conversion system and method for producing valuable products from an ash feedstock with near-zero waste. In the depicted embodiment, ash feedstock may be floated with water in flotation tank 1805 to remove microspheres, which may be marketed as a product as mentioned above. In some embodiments, microspheres make up 1-2% of the ash feedstock. The remainder of the ash feedstock, with optional solids recycle from a silica fusion process depicted in FIG. 50, may proceed to leach tank 1810 in leach process 1811. Leaching may be completed in one or two stages using one or more different acids or different concentrations of the same acids resulting in leached ash feedstock. In some embodiments, leaching is performed in two-stages with hydrochloric acid (HCl) of differing concentrations. The leach process 1811 is disclosed in more detail using examples and experimental data under the Examples heading and in FIG. 35.

Still referring to FIG. 20, the leached ash feedstock may be separated in solid/liquid separator 1815 resulting in solids, comprising silica and other impurities in some embodiments, and liquor. The solid residues from the leaching process may proceed to either FIG. 49 or FIG. 50 for further processing. The liquor from solid/liquid separator 1815, along with optional liquor recycle from FIG. 49 may proceed to a pH adjustment tank 1820 where pH is adjusted to precipitate particular components. In the depicted embodiment, the pH is adjusted to 2.5-3 using NaOH. Hydrogen peroxide ($H_2O_2$) may also be added to the pH adjustment tank 1820 to convert ferrous iron to ferric iron. The pH adjusted solution from pH adjustment tank 1820 may proceed to solid/liquid separator 1825 resulting in solids comprising predominantly iron hydroxide ($Fe(OH)_3$) precipitate and liquor. The $Fe(OH)_3$ may be marketed as-is or calcined in an oven 1830 (at 300° C., in some embodiments) with air circulation to iron oxide (alpha-$Fe_2O_3$). The liquor from solid/liquid separator 1825 may proceed to a second pH adjustment tank 1835 where the pH is adjusted to pH 4 using NaOH, in the depicted embodiment. The pH adjusted solution from pH adjustment tank 1835 may proceed to solid/liquid separator 1840 resulting in solids comprising predominantly aluminum hydroxide ($Al(OH)_3$) and liquor. The $Al(OH)_3$ can be marketed as-is or calcined in an oven 1845 (at 250° C., in some embodiments) to alumina ($Al_2O_3$). The liquor from solid/liquid separator 1840 may proceed to a third pH adjustment tank 1850 where the pH is adjusted to pH 8 using NaOH, in the depicted embodiment. The pH adjusted solution from pH adjustment tank 1850 may proceed to FIG. 21.

FIG. 21 is a continuation of FIG. 20. The pH adjusted solution from the third pH adjustment tank 1850 may proceed to solid/liquid separator 1855 resulting in solids comprising predominantly rare earth hydroxides and some transition metals. The transition metals and rare earth hydroxides may be sold as-is or may proceed to further separation/processing disclosed in more detail under the Products heading. The liquor from solid/liquid separator 1855 may proceed to a fourth pH adjustment tank 1865 where the pH is adjusted to pH 10.5 to 11 using NaOH, in the depicted embodiment. The pH adjusted solution from pH adjustment tank 1865 proceeds to solid/liquid separator 1870 resulting in solids comprising predominantly magnesium hydroxide ($Mg(OH)_2$) and liquor. The $Mg(OH)_2$ may be marketed as-is or may be calcined in an oven 1875 (at 250° C., in some embodiments) to magnesium oxide (MgO). The liquor from solid/liquid separator 1870 may proceed to a fifth pH adjustment tank 1880 where the pH is adjusted to between 12.5-13 using NaOH, in the depicted embodiment. The pH adjusted solution from pH adjustment tank 1880 proceeds to solid/liquid separator 1885 resulting in solid calcium hydroxide ($Ca(OH)_2$) and liquor. In some embodiments, sodium carbonate may be added to the liquor from 1885 to precipitate traces of barium and strontium before neutralization in tank 1890. The $Ca(OH)_2$ may be converted to calcium carbonate ($CaCO_3$) with the addition of $CO_2$. The liquor from solid/liquid separator 1885 may proceed to an acid neutralization tank 1890 where the hydroxides used in the solid/liquid separation steps (1815, 1825, 1840 FIGS. 20 and 1855, 1870, 1885 FIG. 21) are neutralized to pH 7 with HCl. The final product is sodium chloride (NaCl) and may be marketed as a solution (brine) or the NaCl salt may be crystallized out of the solution using a crystallizer or spray dryer (not depicted). In some embodiments of the caustic flowsheet, the final calcium precipitation is not performed, and the final product is a sodium chloride/calcium chloride blend.

Process Equipment Options

As used herein, "filter" and "solid/liquid separator" or "separator" are used interchangeably. The solid/liquid separators depicted in FIGS. 18 through 21 may be any one or more of centrifuges, disc, pan, belt, or drum filters, or other solid/liquid separators known in the art. To help coagulation of the precipitate and ease filtration, techniques such as heating or seeding with recycled product (10-30 wt %) could be used. Calciner temperatures may be between 250° C. and 300° C. Material transfer between processes/equipment may be carried out with the use of pumps, etc.

As used herein, "reactor" is used interchangeably with "leach tank", "pH adjustment tank", "acid neutralization tank", "dissolver", and any other term for an apparatus within which a chemical reaction takes place. A reactor may be a tank reactor, a batch reactor, a continuously stirred tank reactor, a plug-flow reactor (sometimes also referred to as an in-line reactor), or any other reactor known in the art.

Feedstocks

The ash conversion systems and methods disclosed herein are capable of being applied to waste streams other than coal ash such as red mud waste from the bauxite (comprising primarily $Fe_2O_3$, $Al_2O_3$, and $SiO_2$, and minor amounts of CaO, $Na_2O$, TiO, $K_2O$ and MgO) in the synthesis of aluminum, slag from the steel furnaces (comprising CaO, $SiO_2$, $Al_2O_3$, FeO, and MgO), municipal incinerator solid waste, acid mine drainage, mine tailings, and other metal bearing waste streams, because of their similar compositions. Each waste stream may require a different acid composition to achieve the best dissolution as was described in the various acids' formulations (FIGS. 25 to 29) that were tested for coal ash. Some variations in type and composition of feedstock may require additional or fewer processing steps. In some embodiments, feedstock may require grinding to reduce particle size prior to processing in the ash conversion process. The feedstock may be in powder form wherein powder is a bulk solid composed of many very fine particles. In some embodiments, the feedstock may need to be dispersed in slurry prior to processing in the ash conversion process. In still other embodiments, the feedstock may be a slurry of metal-bearing solids suspended in liquid.

Depending on the composition of the ash feedstock, residues may not have carbon impurities or may comprise other impurities. The silica residue may be calcined at 600° C. or higher to burn off all the carbon resulting in an off-white silica product with potentially improved market value over silica containing carbon impurities. These final residues can be further purified by an additional leaching in 30 wt % HCl for 24 hours. The leachate may be combined with the other leachates and recycled through the ash conversion process, in some embodiments.

Products

The products are generally 1) silica, 2) ferric oxide, 3) aluminum oxide, 4) a mixture of REE and transition elements that are concentrated between 20 to 100-fold from the original coal ash, 5) magnesium oxide, 6) calcium carbonate, and 7) sodium chloride. The oxides originally precipitate as hydroxides and may optionally be marketed as such. In some embodiments, the hydroxides may be converted to carbonates using reactants such as carbon dioxide. In some embodiments, manganese may additionally be precipitated at a pH of 9.

The leach residue from solid/liquid separator 1815 (FIGS. 18 and 20) may predominantly include amorphous and crystalline silica, technical grade, which has commercial applications. Commercial applications for silica include additives in tires, elastomers, and plastics; in the construction industry as an anti-caking agent; for sand casting for manufacture of metallic components; and for use in glass-making and ceramics. The value of silica generally improves with higher purity, smaller particle size, and larger surface areas. With some ash feedstocks, the silica also contains some aluminum silicate such as fibrous mullite or high aspect ratio mullite. This mullite could have its own intrinsic high value for uses in high temperature applications, such as in ceramic-in-ceramic fiber reinforcements for ceramic engines and turbine components. The characteristic formation of fibrous mullite in fly ash (FIG. 60) is the only potentially large volume source for this valuable form of mullite. Post process of the silica/mullite residue from ash processing can be separated by dissolving the silica [which can be reprecipitated into to a very pure silica form] and the amorphous aluminosilicate in caustic and leaving behind fibrous mullite needles.

Ferric oxide is used primarily as a pigment in paints, glazes, coatings, colored concrete, mulches, mordant, coating for magnetic recording tapes, the manufacturing of polishing compounds and as an abrasive for glass, precious metals, and diamonds. An oxidizing atmosphere must be used in the oven to convert the iron hydroxide to a ferric oxide pigment with strong color strength.

Aluminum hydroxide is often used as a feedstock for the manufacture of other aluminum compounds and in the manufacture of abrasives, waterproofing, water treatment, and as a filter medium. Additional uses include the manufacture of aluminosilicate glass, a high melting point glass used in cooking utensils and in the production of fire clay, pottery, and printing ink. Converting the hydroxide to aluminum oxide at high temperature produces oxides used in high value applications such as paint, and as a filler in plastics and cosmetics.

Magnesium hydroxide is used in the wastewater treatment process; as a flame- or fire-retardant filler; as a fuel additive to treat heavy fuel oils; as well as in the ceramic glazing process. Magnesium oxide is used as an anticaking agent in foods, in ceramics to improve toughness, and in optics. Magnesium carbonate is used in fireproofing, a smoke suppressant in plastics, and a reinforcing agent in rubber.

The calcium carbonate produced is of high purity and very small particle size and so has a plethora of uses in many diverse industries including: the oil and gas industry as drilling fluid make-up to increase the fluid density, as an additive to control fluid loss to formation, and the oilfield cementing industry as a loss circulation material; the building materials and construction industry for roofing shingles, tiles, cement, brick, and concrete block manufacture; and commercial applications such as industrial filler in the paper, paint, plastics, and rubber industries. Analysis of the precipitated calcium carbonate showed a lead value of 0.54 ppm, which makes it a candidate for medical and food applications. Lead precipitates between pH 5-8 as shown in FIG. 38. In some embodiments, the final drying step strongly influences the particle size distribution of the precipitated calcium carbonate. Under normal drying conditions, such as a rotatory dryer, the product forms large agglomerates, even though the actual particle size when forming the precipitated calcium carbonate is in the nanoparticle range (FIG. 59). Because agglomerates are formed in conventional drying processes, post processing may be necessary to break up the agglomerates by using a deagglomerator, such as a ball mill In some embodiments, rather than drying and deagglomerating the calcium carbonate, a slurry of the calcium carbonate product may be spray dried or dried using a Swirl Fluidizer. Both of these techniques yield a dried product of small particle size in a single step without the need for a deagglomeration step.

Sodium chloride solution is used in a myriad of industrial applications. It is used in the chlor-alkali process, the process to produce chlorine and sodium hydroxide (see Examples for more detail). It is also widely used as a de-icing and anti-icing agent in winter climate road applications and as a dust suppressant in many mining operations. Crystallization of sodium chloride solution will produce dry sodium chloride crystals, commonly referred to as salt. Sodium chloride crystals are used across oil and gas exploration activities as an additive to drilling fluids as well as cementing operations, in the pulp and paper industry as a bleaching product for wood pulp, in the water softening industry, swimming pool chemical industry as pool salt and in a great number of other industrial applications.

Precipitation

Figure 36:
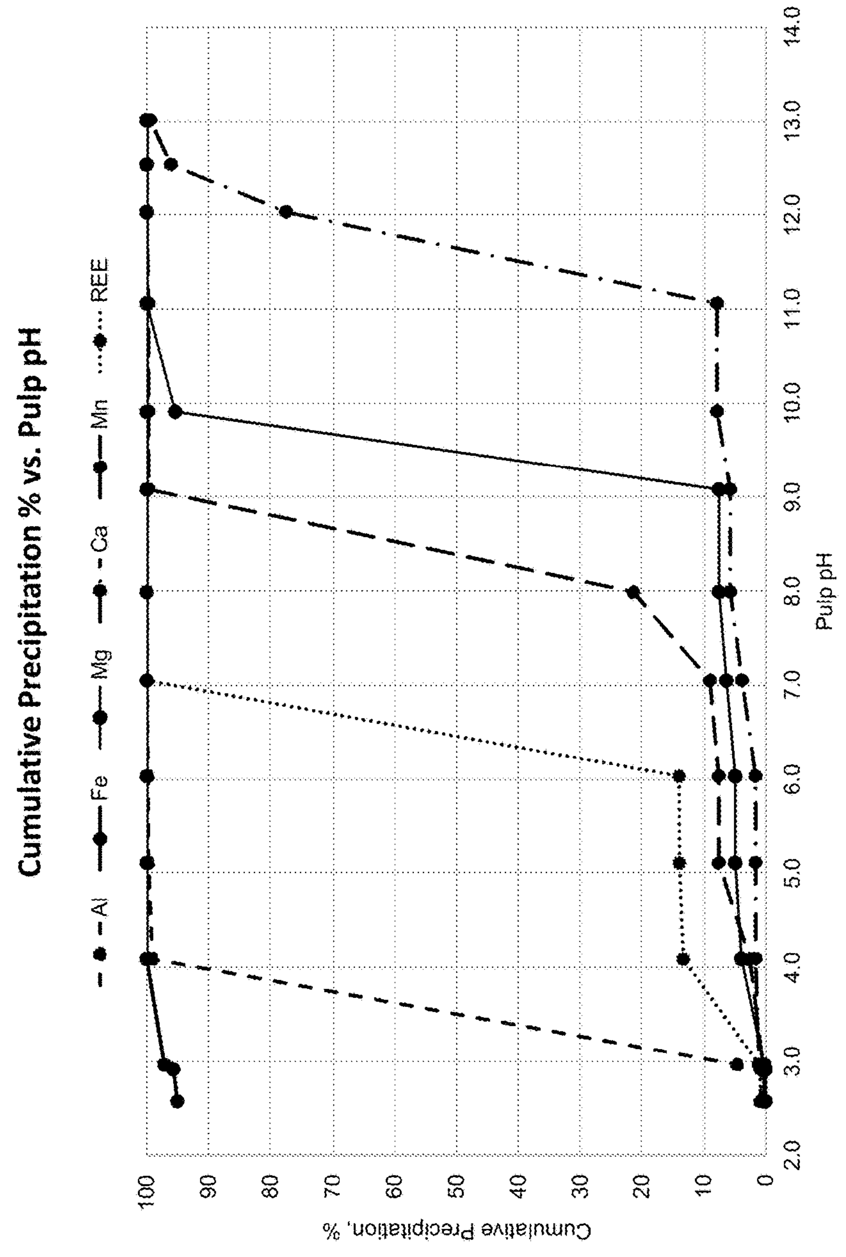
FIG. 36 is a chart depicting the excellent separation and cumulative elemental precipitation percent versus pulp pH for class C ash feedstock using caustic.
Figure 37:
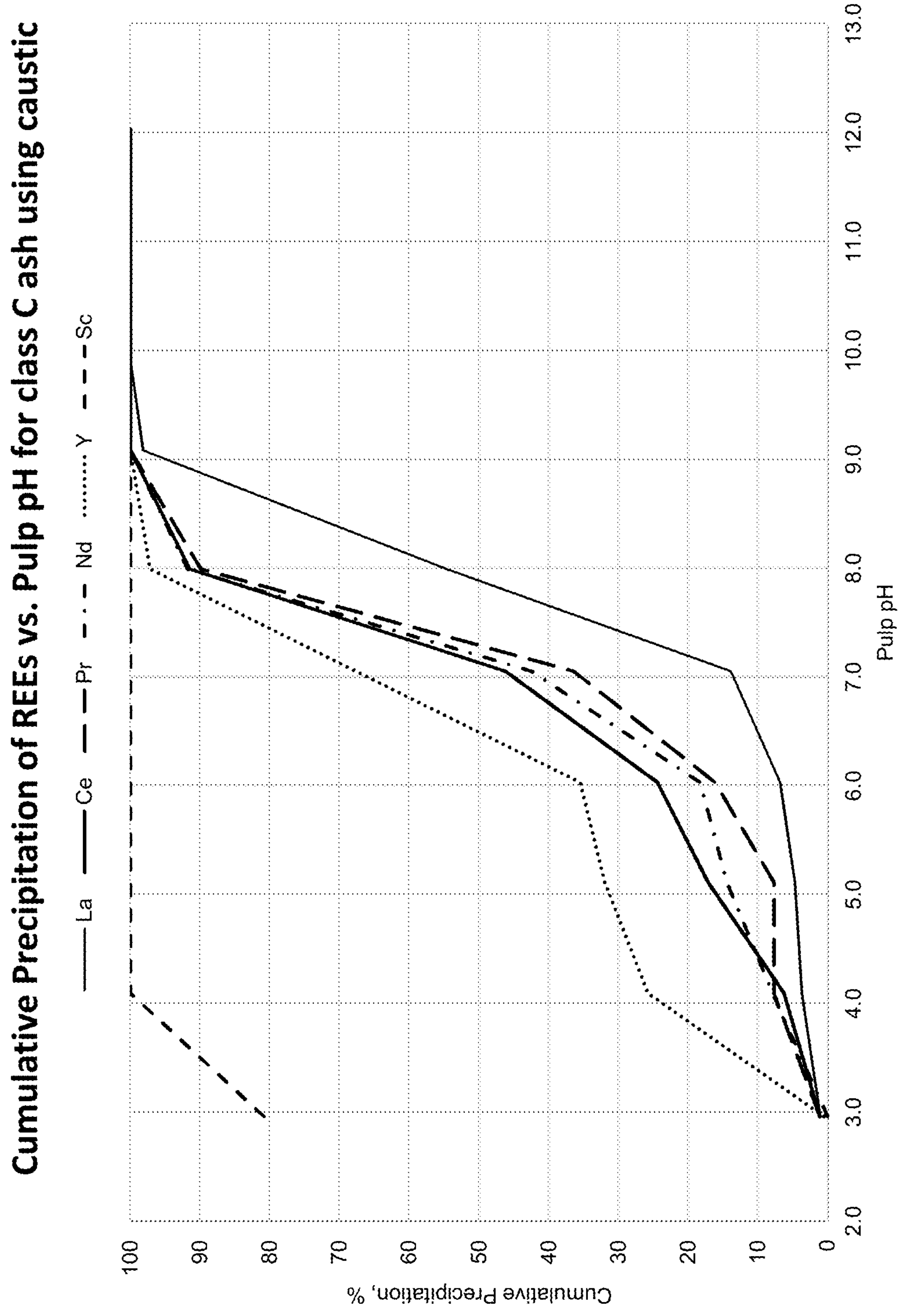
FIG. 37 is a chart depicting the cumulative precipitation of rare earth elements (REE) versus pulp pH for class C ash feedstock using caustic with the bulk of the REEs precipitating between pH 4 and 8.

FIG. 36 shows a chart depicting cumulative precipitation percent versus pulp pH for class C ash. Iron is best separated at pH 2.5 to 3 to minimize the amount of aluminum impurities. Aluminum is then precipitated at pH 4. The precipitation of some of the rare earths is shown in FIG. 37. As can be seen in FIG. 37, scandium precipitates with iron while most of the other REEs precipitate between pH 5 and pH 9. At pH 9, manganese may also be precipitated. Magnesium can be separated at pH 10.5-11 and calcium at pH 13. FIG. 38 is a table depicting the percent composition of precipitate hydroxides at different pHs resulting from precipitation testing.

In some embodiments, after each pH condition, the liquor may be filtered to separate a product and the filtrate is then subjected to the next pH condition. The precipitates for iron and aluminum may be difficult to filter with simple vacuum, but that may be facilitated by high speed centrifugation. Another approach may be to seed the precipitation with 10-30% recycled product to produce more easily filterable solids (precipitate).

Figure 39:
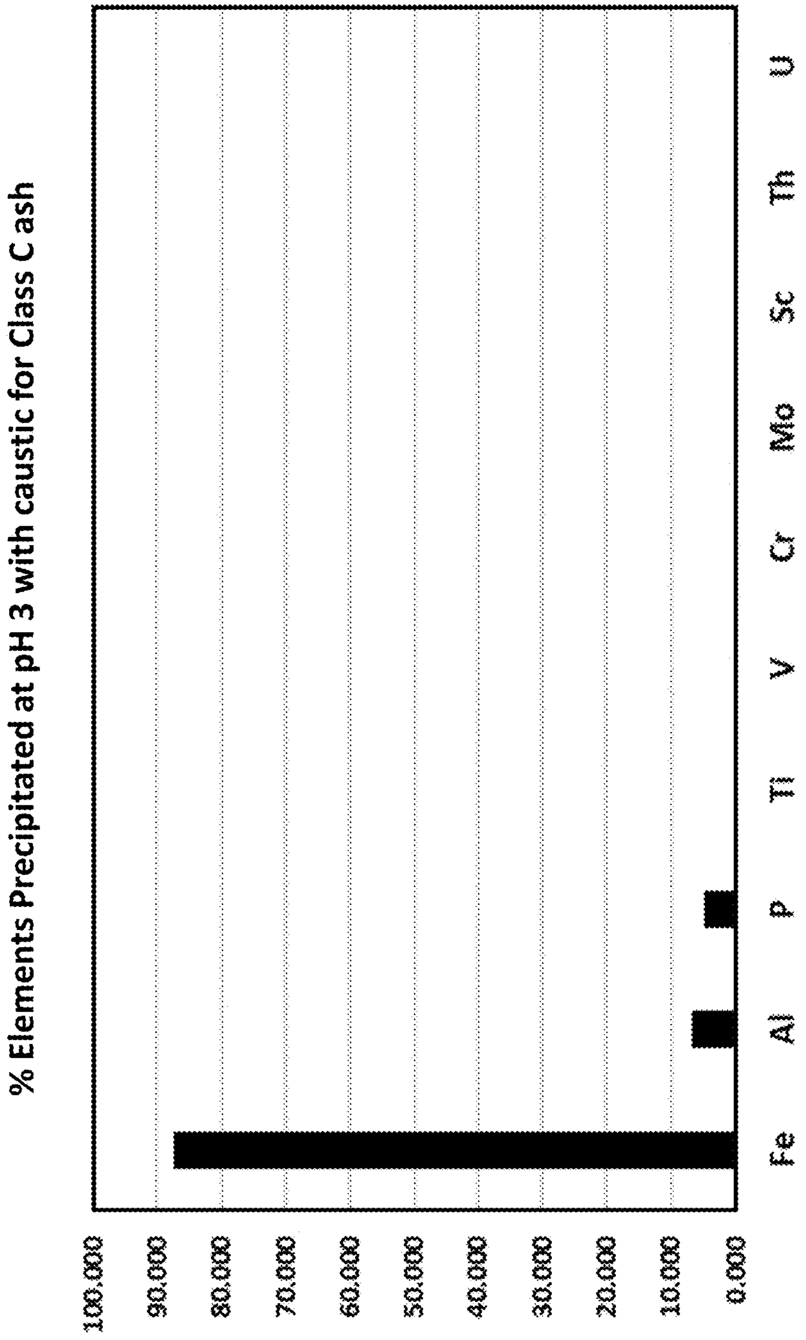
FIG. 39 is a chart depicting percent elements precipitated at pH 3 for class C ash feedstock with caustic.
Figure 40:
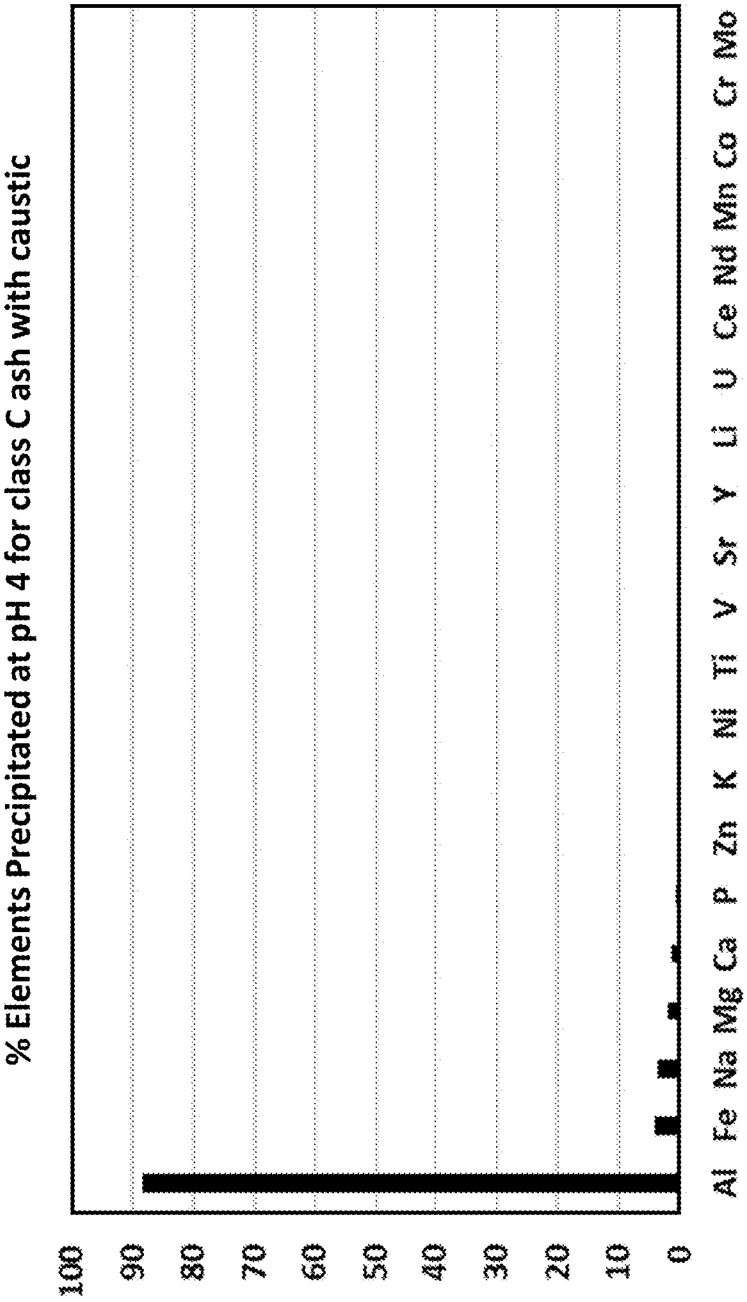
FIG. 40 is a chart depicting percent elements precipitated at pH 4 for class C ash feedstock with caustic.
Figure 41:
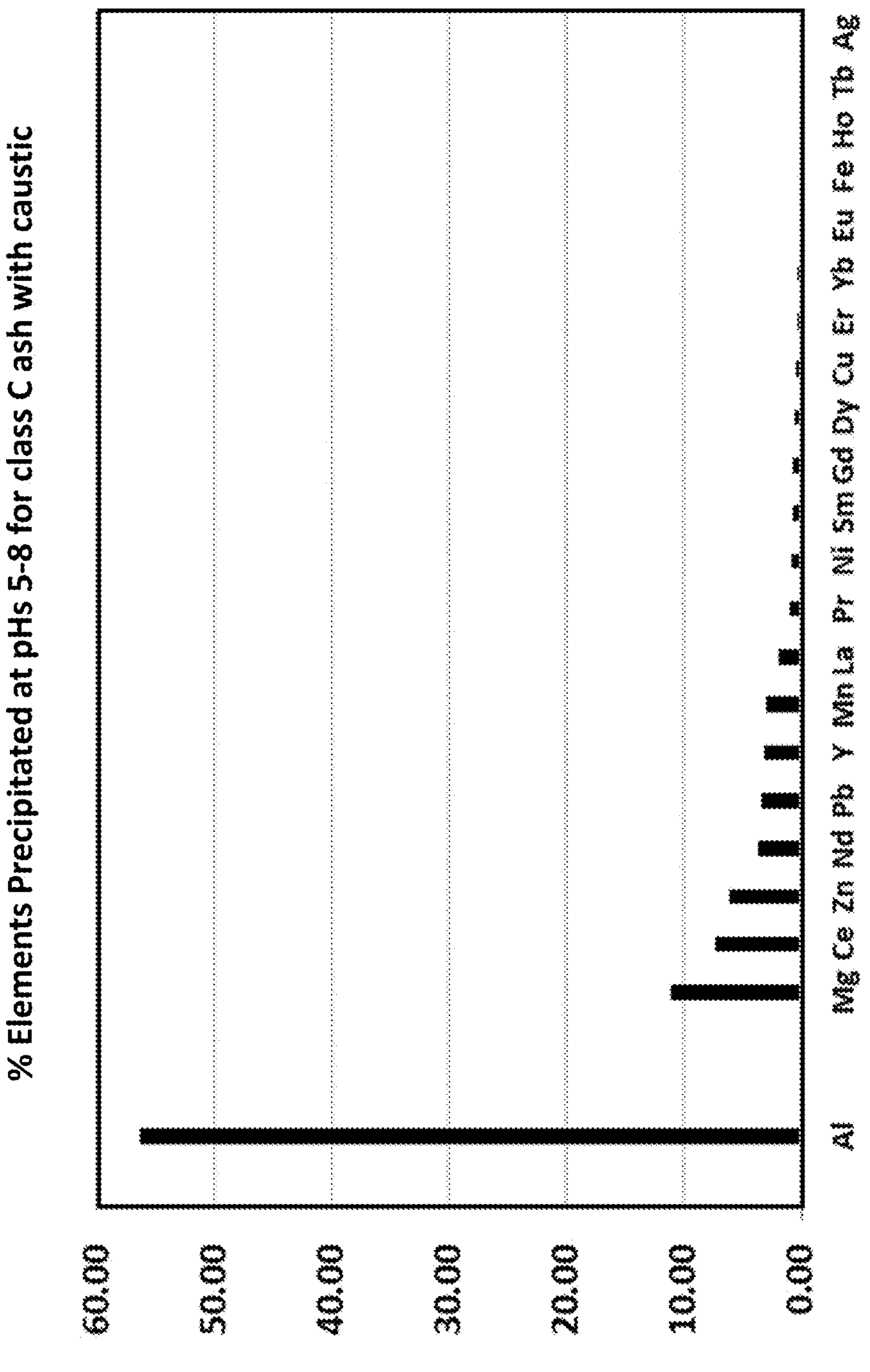
FIG. 41 is a chart depicting percent elements precipitated at pH 5-8 for class C ash feedstock with caustic.
Figure 42:
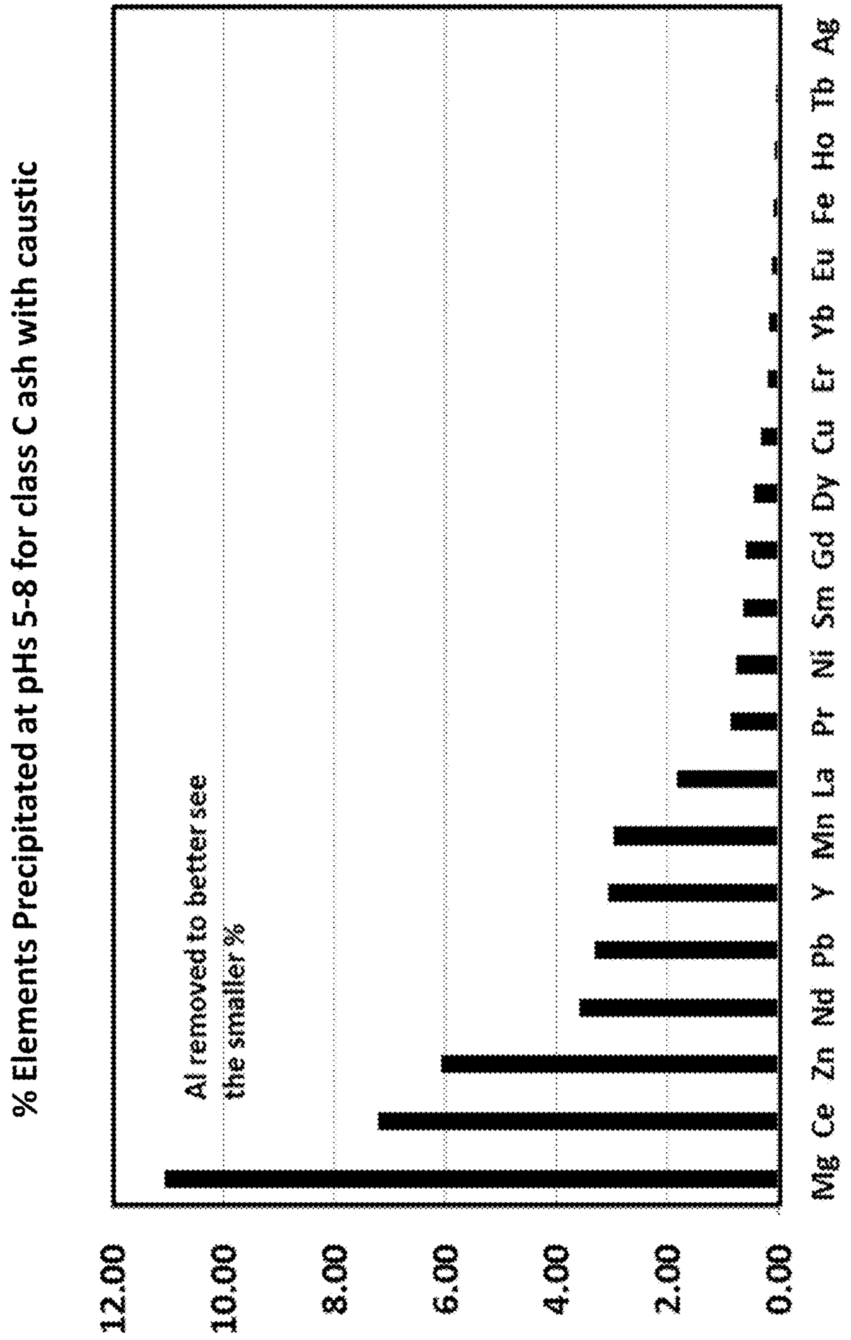
FIG. 42 is a chart depicting percent elements precipitated at pH 5-8 for class C ash feedstock with caustic and with aluminum removed to show the smaller percentage more clearly.
Figure 43:
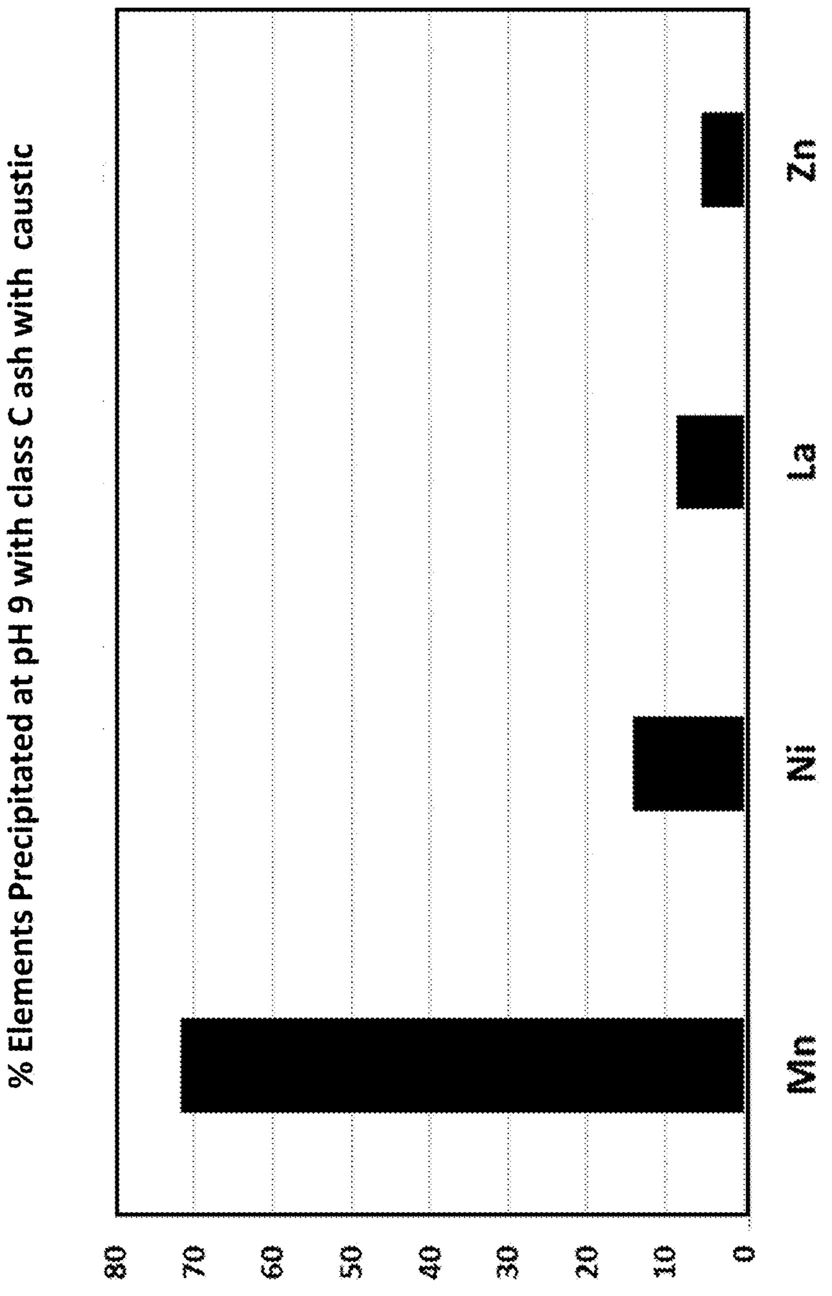
FIG. 43 is a chart depicting percent elements precipitated at pH 9 for class C ash feedstock with caustic.
Figure 44:
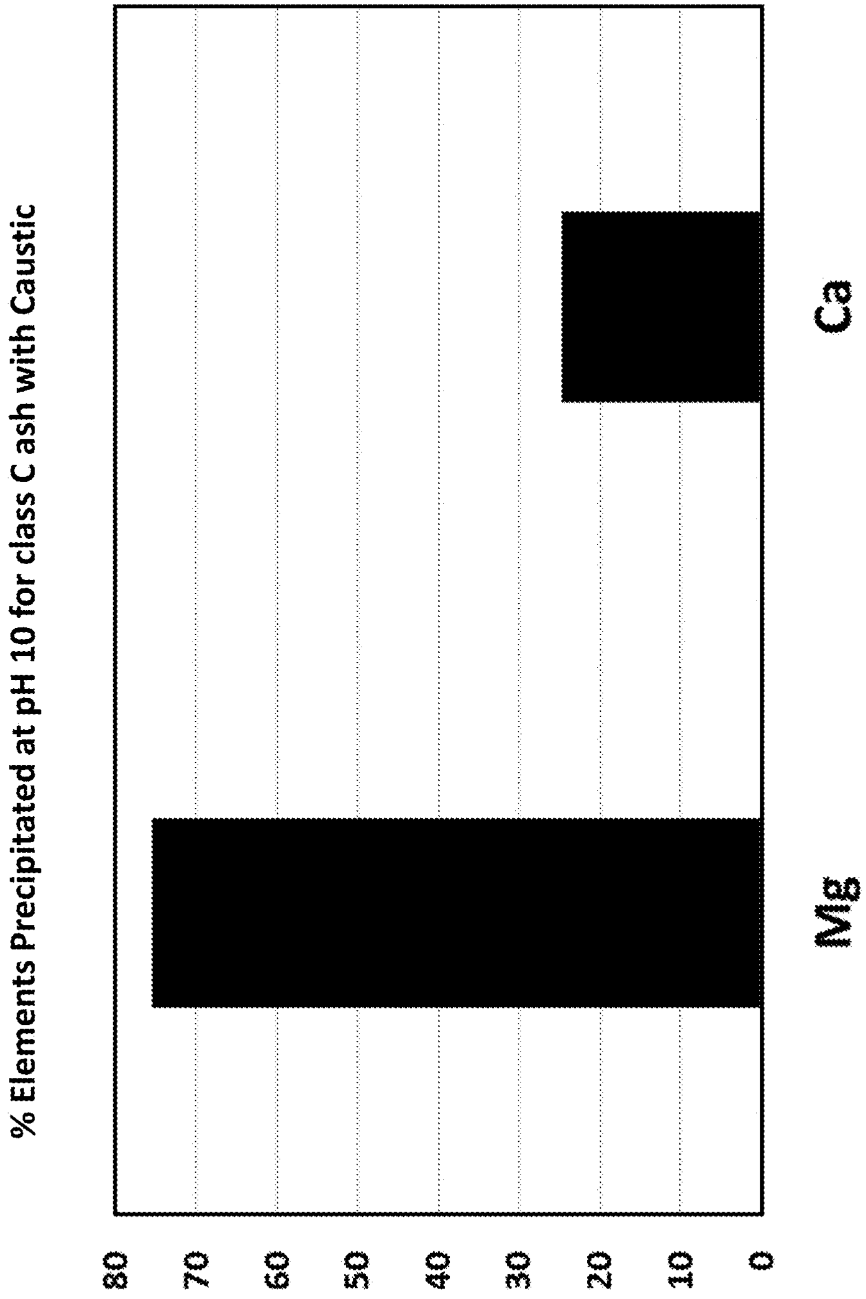
FIG. 44 is a chart depicting percent elements precipitated at pH 10 for class C ash feedstock with caustic.
Figure 45:
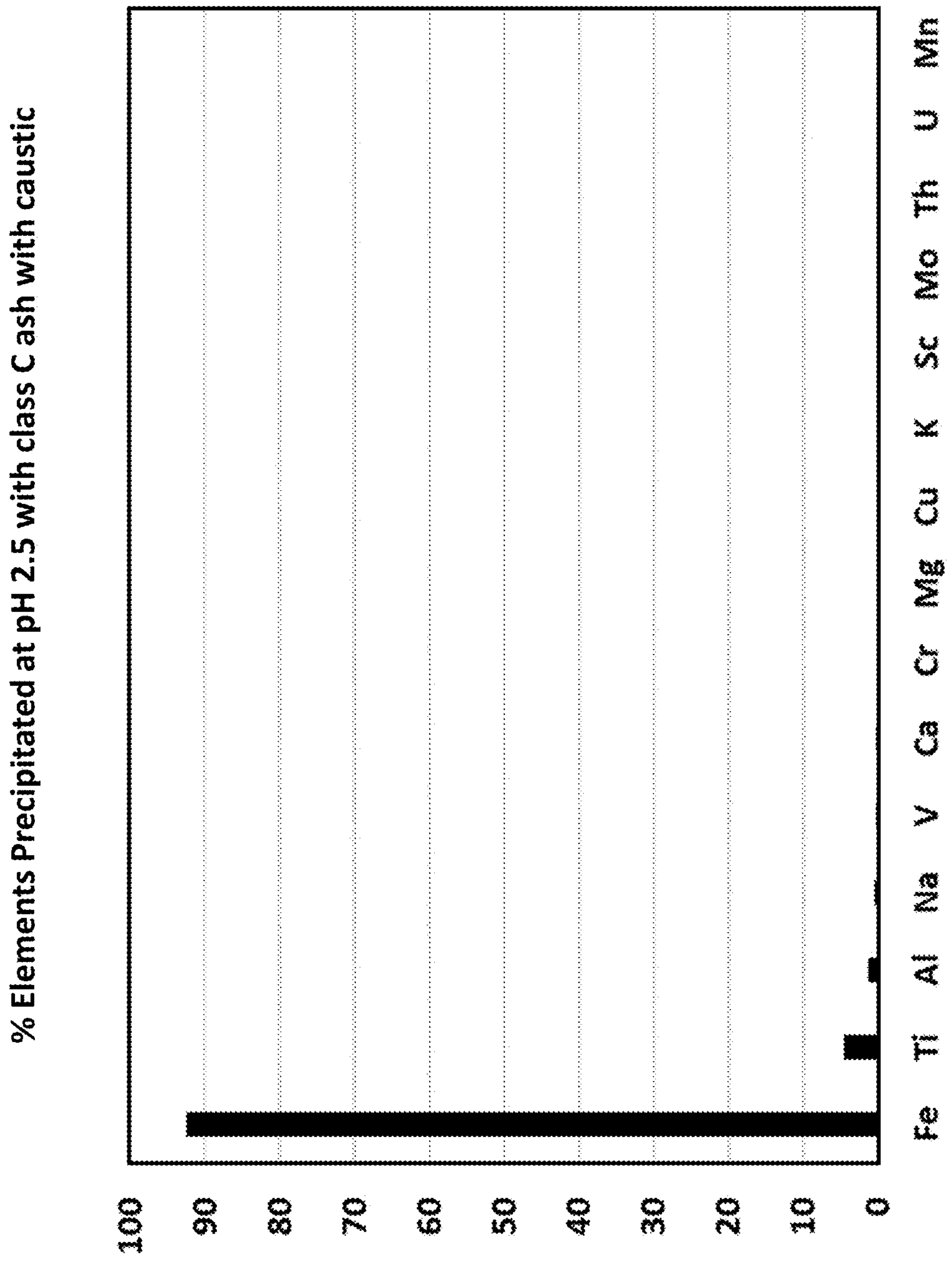
FIG. 45 is a chart depicting percent elements precipitated at pH 2.5 for class C ash feedstock with caustic.

FIGS. 39 through 45 depict the percent elements precipitated at each pH cut for class C ash feedstock. FIG. 39 depicts percent elements precipitated at pH 3. FIG. 40 depicts percent elements precipitated at pH 4. FIG. 41 depicts percent elements precipitated at pH 5-8. FIG. 42 depicts percent elements precipitated at pH 5-8 with aluminum removed to show the smaller percentages more clearly. FIG. 43 depicts percent elements precipitated at pH 9. FIG. 44 depicts percent element precipitated at pH 10. FIG. 45 depicts percent elements precipitated at pH 2.5. The iron purity shown precipitated at pH 3 can be improved to 92.5 wt % by carrying out the precipitation at pH 2.5.

The percent element precipitated at pH 13 is >99% calcium. The remaining liquor is not a waste stream but a sodium chloride solution containing traces of strontium and barium. These can be precipitated with sodium carbonate to isolate high value products. The concentrations are 151 ppm strontium and 2 ppm barium. Since the solution is at pH 13, the excess hydroxide must be neutralized with HCl to pH 7 for the final product. The final product waste composition of the sodium chloride is shown in FIG. 46.

The final liquor is a clean sodium chloride solution containing traces of strontium and barium when using sodium hydroxide as the base. It may be further purified by adding sodium carbonate to precipitate strontium and barium carbonates. At the end of this process, a sodium chloride solution remains that can be marketed as a brine or dried to the salt. It should be noted that barium sulfate is mostly insoluble in the lixiviant, so most of it remains in the residue.

This final sodium chloride product is an important aspect of this disclosure, which processes ash with minimal waste. This is a surprising result compared to previous attempts to separate products from CCP. For every 1 ton of ash feedstock this disclosure generates 0.8 tons of NaCl. There is a market for this product as a solution or as a dried solid.

An alternative process embodiment is the use of calcium carbonate ($CaCO_3$) and calcium hydroxide ($Ca(OH)_2$) as the reagent for precipitation. Calcium carbonate may be used at the lower pHs up to pH 1. After that, $Ca(OH)_2$ may be used. FIG. 47 shows the precipitation as a function of pH for this reagent. FIG. 48 shows the elemental composition of all the precipitated products from $Ca(OH)_2$ precipitation testing.

Product Enhancements

Silica

Figure 49:
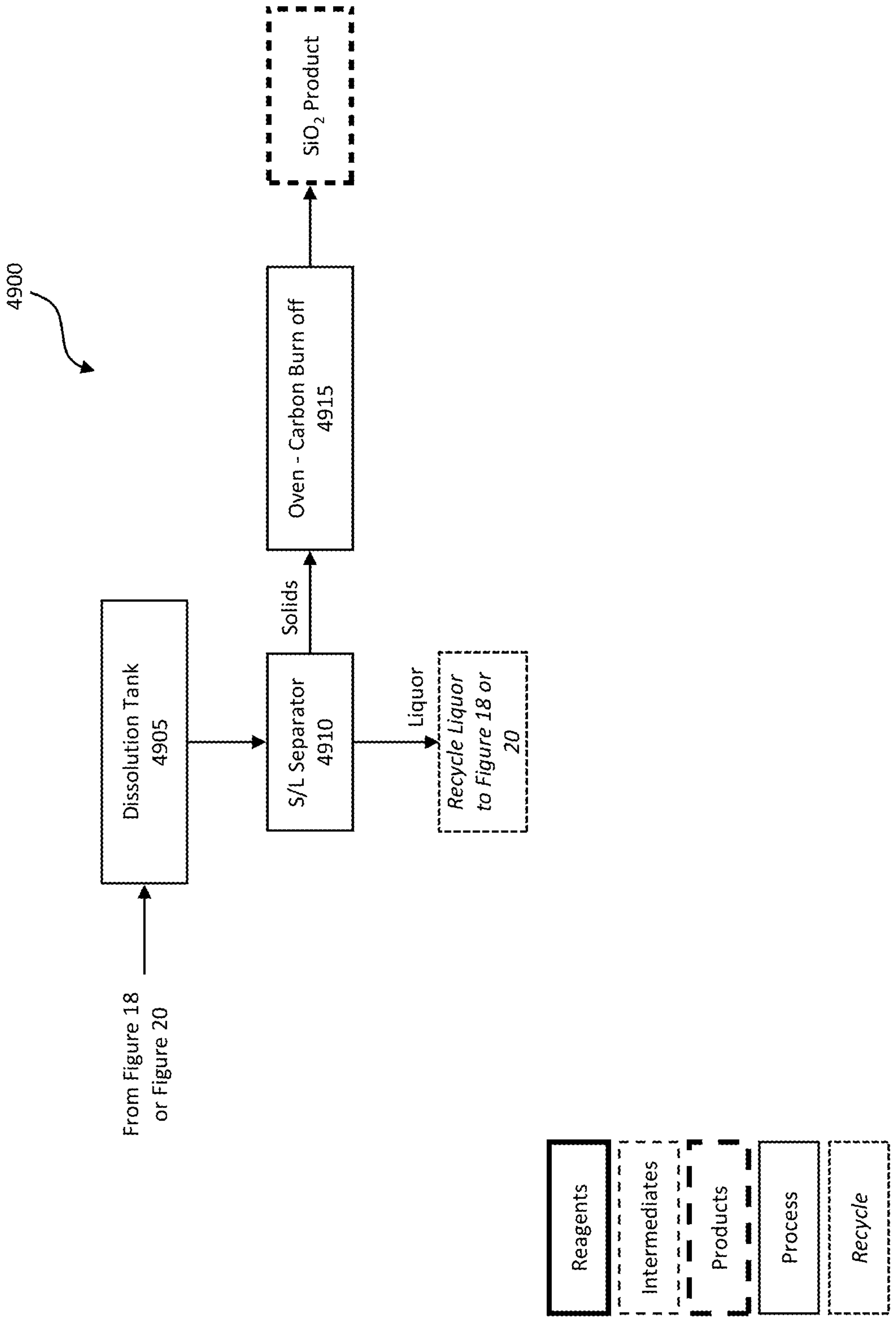
FIG. 49 depicts an optional process embodiment for refining a silica product by burning off carbon.

In some embodiments, the residue after the leach process 1811 (FIGS. 18 and 20) is silica which may comprise up to 20% impurities comprising primarily aluminum and carbon and occasionally barium in the test examples. In some embodiments, impurities may be removed by at least one of calcining, caustic fusion and filtration. Carbon impurities, for instance, may be removed by calcining at 600° C. or higher (FIG. 49).

In preliminary testing, two methods of caustic fusion were found to be successful: the first was a 300° C. fusion with caustic (FIG. 50) while the other was a dissolution in 8M NaOH at 90° C. The first method dissolved 68% of the residue while the second yielded 62%. However, the 8M NaOH dissolved less aluminum than the caustic fusion process. The dissolution of the silica residue can be greatly increased using higher temperatures closer to 1000° C. up to 1200° C. Caustic may be sodium or potassium hydroxide.

The reactions are shown below in equations (14) and (15):

$$2NaOH+SiO_2 \rightarrow Na_2SiO_3+H_2O \quad (14)$$

$$Al_2SiO_5+4NaOH \rightarrow 2NaAlO_2+Na_2SiO_3+2H_2O \quad (15)$$

The sodium silicate formed from the fusion may be dissolved in water and the mixture filtered to remove any insoluble impurities. In some embodiments, the solids may be recycled back to the flotation tank 1805 or to the leach tank 1810 (FIGS. 18 and 20).

In some embodiments, the filtrate may be treated with HCl to drop the pH to at least 1 and precipitate silicic acid ($H_4SiO_4$). In some embodiments, the silicic acid may be filtered and then calcined, or spray dried then calcined, to convert it a high purity (greater than 99%), high value amorphous silica powder. In some embodiments, the silica powder has a BET-N2 surface area of greater than 160 $m^2/g$, which has numerous applications as an additive in tires, elastomers, plastics, and rubber products. The thermal decomposition of silicic acid to silicon dioxide and water is shown in equation (16):

$$H_4SiO_4 \rightarrow SiO_2 + 2H_2O \quad (16)$$

In preliminary testing, a purity of 95.4% was obtained with the fusion product. In some embodiments, the filtrate may be an acidic solution of sodium chloride containing some elements such as aluminum and may be recycled back to the beginning of the process (FIGS. 18 and 20, pH adjustment tank 1820).

Another option is to add sodium hydroxide to bring the solution's pH to 4 and precipitate aluminum hydroxide. The hydroxide may then be calcined to the oxide product. The remaining liquor is sodium chloride product as in the caustic and lime flowsheets the (FIGS. 19 and 21).

Process Embodiments for Silica Processing

FIGS. 49 and 50 depict two options for further processing of a silica product as optional continuations of FIGS. 18 and 20. FIG. 49 depicts an acid dissolution process 4900 and FIG. 50 depicts a sodium hydroxide fusion process 5000. In FIG. 49, residue silica and silicates from solid/liquid separation 1815 (FIGS. 18 and 20) proceed to dissolution tank 4905. In some embodiments, 30% hydrochloric acid (HCl) is applied for 24 hours in dissolution tank 4905. Following acid dissolution in dissolution tank 4905, the liquor proceeds to solid/liquid separator 4910 resulting in solids and a liquor. In embodiments where the solids comprise carbon, the solids proceed to an oven 4915 for carbon burnoff. In some embodiments, the solids may be heated in an oven 4915 for 6 hours at a minimum of 600° C. resulting in a purified silica ($SiO_2$) product. The liquor from solid/liquid separator 4910 may be recycled to the pH adjustment tank 1820 (FIGS. 18 and 20).

In FIG. 50, residue silica and silicates from solid/liquid separation 1815 (FIGS. 18 and 20) proceed to sodium hydroxide (NaOH) fusion 5002 (at 300° C. in some embodiments). Potassium hydroxide may be used instead of NaOH, in some embodiments. Water may be added to the fused material to produce a liquor, which proceeds to solid/liquid separation 5005. Solids may optionally proceed to the leach tank 1810 (FIGS. 18 and 20) to recycle impurities, where impurities are dependent on the composition of the feedstock. The filtrate proceeds to acidification tank 5010 where acid, 6M HCl in the depicted embodiment, is added to reduce the pH of the filtrate to 1. The pH adjusted liquor proceeds to solid/liquid separation 5015. The solids are primarily silicic acid ($H_4SiO_4$) precipitates which may proceed to at least one of oven 5020, at 250° C. in the depicted embodiment, and spray calcination 5025 resulting in a high purity (greater than 99 wt %) amorphous $SiO_2$ product. The $SiO_2$ product may be powdered in some embodiments. Spray drying may preserve the small particle size and prevent agglomeration. In some embodiments, the particles may have submicron diameters. The liquor proceeds to precipitation tank 5030. In the depicted embodiment, 1M NaOH is added to the precipitation tank 5030 to raise pH of the liquor above 7. The liquor proceeds to solid/liquid separation 5035. The solids are primarily aluminum hydroxide ($Al(OH)_3$) which may be marketed as-is or calcined in oven 5040, at 250° C. in the depicted embodiment, resulting in an alumina ($Al_2O_3$) product. The final liquor is sodium chloride (NaCl) which can be marketed as a product. This process can also be used to recover aluminum and silica from any number of aluminosilicate ores feedstocks or industrial waste streams.

Material transfer between processes/equipment may be carried out with the use of pumps, etc.

Iron and Aluminum

Iron hydroxide may be precipitated together with scandium and other heavy elements. Aluminum hydroxide is precipitated next with some iron impurity and other minor elements. In some embodiments, the iron hydroxide and the aluminum hydroxide are both around 90% pure but are contaminated with a small amount of the other product. These products may be further purified by first dissolving them in excess NaOH at 90° C. The aluminum hydroxide dissolves to form a soluble aluminate which can then be separated from the iron hydroxide. After the solid-liquid separation, the aluminum can be reprecipitated by adding acid to get back to the insoluble hydroxide.

Manganese

In some embodiments, minor levels of manganese (0.02-0.03 wt %) may be separately precipitated in either the caustic or the lime processes of FIGS. 18 through 21 at a pH of 9. The major impurity is magnesium.

Barium and Strontium

In some embodiments of the process depicted in FIGS. 20 and 21, after the calcium is precipitated as calcium hydroxide, sodium carbonate can be added to separate barium and strontium carbonates before the final liquor is neutralized to yield sodium chloride.

REEs and Transition Metals

In some embodiments, rare earth elements (REEs) and transition metals may be separated from each other using ion exchange, solvent extraction, adsorption, or a combination thereof. In some embodiments, the process may concentrate REEs and transition metals into a rare-earth mischmetal from 20 to 100-fold. As used herein, "rare-earth mischmetal" refers to a mixed metal alloy of rare-earth elements. In some embodiments, rare-earth mischmetal may comprise at least one of cerium, lanthanum, and neodymium. In some examples, a rare-earth mischmetal composition includes approximately 55% cerium, 25% lanthanum, and 15-18% neodymium with other rare earth metals following. The mischmetals may be marketed as-is to vendors specializing in separating these products, or they may be treated in a separate process.

Chlor-Alkali

A synergy exists between the process depicted in FIGS. 18 through 20 and a chlor-alkali plant. The sodium chloride product from FIGS. 19 and/or 21 may be used as feed to a chlor-alkali plant, and a discounted supply of hydrochloric acid may be used in one or more leaching steps.

Embodiment A

Some embodiments use the well-established technology of a chlor-alkali plant to convert sodium chloride rich final product from FIGS. 19 and/or 21 to sodium hydroxide, hydrogen, and chlorine. Hydrogen and chlorine are then combined to produce HCl gas, which is then dissolved in water to produce hydrochloric acid. By recycling the sodium chloride final process stream to replenish the starting reagent materials, hydrochloric acid and sodium hydroxide, a significant savings may be achieved at the cost of capital investment in a chlor-alkali plant. In some embodiments, hydrochloric acid is used as the leaching agent in FIGS. 18 and/or 20 and sodium hydroxide can be used directly in the caustic flowsheet embodiment 1800*b* (FIGS. 20 and 21) or converted to sodium carbonate by bubbling $CO_2$ (exhaust gas from a fossil fuel power plant, in some embodiments) into sodium hydroxide to be used as a reagent to precipitate a $CaCO_3$ product in the lime flowsheet embodiment 1800*a* (FIGS. 18 and 19). In some embodiments, the $CaCO_3$ product is high purity (>99 wt %).

Embodiment B

Some embodiments may use a side stream from a fossil fuel plant gaseous discharge containing carbon dioxide ($CO_2$) to use directly in the process, thereby saving a significant reagent cost in purchased $CO_2$ gas and at the same time achieving an environmental benefit by capturing a greenhouse gas into commercial products (carbonates).

One of the reactions used to capture the $CO_2$ is absorbing it in sodium hydroxide from the chlor-alkali plant to form sodium carbonate, which may be used as a process reagent in some embodiments. The acid-base reaction is rapid; in some embodiments, the reaction may be monitored by tracking the pH from the higher sodium hydroxide value to the lower sodium carbonate value. This conversion can be done in a batch mode or a continuous mode through pipes with one or more $CO_2$ entry points to react with the caustic to quantitatively produce sodium carbonate and save the cost of another purchased reagent. In other embodiments, the $CO_2$ may be absorbed into ammonium hydroxide produced from dissolving ammonia in water. The lower cost of the ammonia, and the smaller amount required for the reaction, may result in a significant cost savings versus using sodium hydroxide or potassium hydroxide. This produces the same high-quality precipitated calcium carbonate and ammonium chloride or potassium chloride by-products, which are also fertilizers. If nitric acid or phosphoric acids are used early in the process, then the products are ammonium nitrate and potassium nitrate, or ammonium phosphate and potassium phosphate, respectively. Each of these products is a better fertilizer than ammonium chloride or potassium chloride; however, ammonium nitrate and potassium nitrate are more hazardous, as they are strong oxidants.

In some embodiments, $CO_2$ may be provided from other processes, plants, or sources. In some embodiments, naturally occurring or stored $CO_2$ may be pumped from underground formations. Any source of carbon dioxide could be beneficially used for carbon sequestration from a slip stream off of a coal power plant exhaust.

Process Control

In some embodiments, one or more processors may be used to control and manage one more aspects of the systems and methods disclosed herein.

Disclosed herein are systems and methods for processing a metal-bearing waste streams. In some embodiments, the feedstock is a powder that comprises metal-bearing components and sulfur components. The feedstock may be loaded into a first reactor to begin processing. In some embodiments, a processor is configured to operate a processing sequence comprising at least one of a dissolution process and a precipitation process wherein the dissolution process and/or precipitation process take place in one or more reactors. The processor may be configured to perform one or more of the following steps: using a first dissolution process, wherein the first dissolution process comprises using a leach process performed by at least one of contacting, passing, and percolating an acid through the powder feedstock and collecting a leachate formed in a second reactor; responsive to collecting the leachate, use a sequential selective precipitation process at a predetermined pH to sequentially precipitate components, wherein a first predetermined pH is used to precipitate a first component from the leachate; responsive to precipitating the first component, separate by filtration the first component, and collect the first filtrate in at least one of the second reactor and a third reactor; responsive to collecting the first filtrate, use a base component to adjust the first filtrate to a second predetermined pH; using the sequential precipitation process at the second predetermined pH, precipitate a second component, separate by filtration the second component and generate a second filtrate; and using the sequential precipitation process to separate additional components based on the predetermined pHs of the component of interest. The steps may be performed in orders other than the order presented herein and additional or fewer steps may be performed. In some embodiments, the processor is configured to use to use a predetermined pH to separate components from the leachate based on predetermined logic.

Non-Transitory Computer Readable Medium

The systems and methods described above can use dedicated processor systems, micro controllers, programmable logic devices, or microprocessors that perform some or all of the communication operations. Some of the operations described above may be implemented in software and other operations may be implemented in hardware.

The systems and methods described above can use dedicated processor systems, micro controllers, programmable logic devices, or microprocessors that perform some or all of the communication operations. Some of the operations described above may be implemented in software and other operations may be implemented in hardware.

The various operations of methods described above may be performed by any suitable means capable of performing the operations, such as various hardware and/or software component(s), circuits, and/or module(s).

The various illustrative logical blocks, modules, and circuits described in connection with the present disclosure may be implemented or performed with a hardware processor, a digital signal processor (DSP), an application specific integrated circuit (ASIC), a field programmable gate array signal (FPGA) or other programmable logic device (PLD), discrete gate or transistor logic, discrete hardware components, or combinations thereof designed to perform the functions described herein. A hardware processor may be a microprocessor, commercially available processor, controller, microcontroller, or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in software, firmware, or any combination thereof executing on a hardware processor. If implemented in software, the functions may be stored as one or more executable instructions or code on a non-transitory computer-readable storage medium. A computer-readable storage media may be any available media that can be accessed by a processor. By way of example, and not limitation, such computer-readable storage media can comprise RAM, ROM, EEPROM, CD-ROM or other optical disk storage, magnetic disk storage or other magnetic storage devices, or any other medium that can be used to store executable instructions or other program code or data structures and that can be accessed by a processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

Certain aspects of the present disclosure may comprise a computer program product for performing the operations presented herein. For example, such a computer program product may comprise a computer readable storage medium having instructions stored (and/or encoded) thereon, the instructions being executable by one or more processors to perform the operations described herein.

Software or instructions may be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a terminal and/or base station can obtain the various methods upon coupling or providing the storage means to the device.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

To facilitate the understanding of the embodiments described herein, a number of terms are defined below. The terms defined herein have meanings as commonly understood by a person of ordinary skill in the relevant art. Terms such as "a," "an," and "the" are not intended to refer to only a singular entity, but rather include the general class of which a specific example may be used for illustration. The terminology herein is used to describe specific embodiments, but their usage does not delimit the disclosure, except as set forth in the claims.

Batch Process: A batch process operates in separate discrete operations that are connected in a stepwise fashion with the materials processed being fed in batches.

Catalyst: A catalyst is an agent that can either accelerate or decelerate a chemical reaction without reacting with the reactants or products.

Continuous Process: A continuous process is designed to operate without interruptions. The materials being processed, either bulk dry or fluids, are continuously in motion undergoing chemical reactions or subject to mechanical or heat treatment.

Rare Earth Elements (REEs): REEs are any of a group of chemically similar metallic elements comprising the lanthanide series and (usually) scandium and yttrium.

Transition Elements: Transition elements are any of the set of metallic elements occupying a central block (Groups IVB-VIII, IB, and IIB, or 4-12) in the periodic table, e.g., manganese, chromium, and copper.

Technologically Enhanced Naturally Occurring Radioactive Materials (TENORM): Technologically Enhanced Naturally Occurring Radioactive Material (TENORM) is defined as, "Naturally occurring radioactive materials that have been concentrated or exposed to the accessible environment as a result of human activities such as manufacturing, mineral extraction, or water processing." "Technologically enhanced" means that the radiological, physical, and chemical properties of the radioactive material have been concentrated or further altered by having been processed, or beneficiated, or disturbed in a way that increases the potential for human and/or environmental exposures. Naturally Occurring Radioactive Material (NORM) is defined as, "Materials which may contain any of the primordial radionuclides or radioactive elements as they occur in nature, such as radium, uranium, thorium, potassium, and their radioactive decay products, such as radium and radon, that are undisturbed as a result of human activities."

As used herein, a system with "near-zero waste" means that the vast majority of the output streams of the system are marketable products. This may be accomplished by using a plurality of recycle streams to ensure that all input streams are eventually consumed. In some examples of the present disclosure, the system may have zero waste; stated another way, in some examples of the present disclosure, all of the output streams of the system are marketable products.

EXAMPLES

Examples for FGD Conversion Process

The systems and methods for the FGD gypsum conversion process disclosed herein were first developed by testing batch reactions under different conditions to arrive at initial operating conditions for a continuous demonstration. The following data was generated in preliminary testing with a particular feedstock and should not be considered limiting. Other operating conditions are anticipated.

Figure 4:
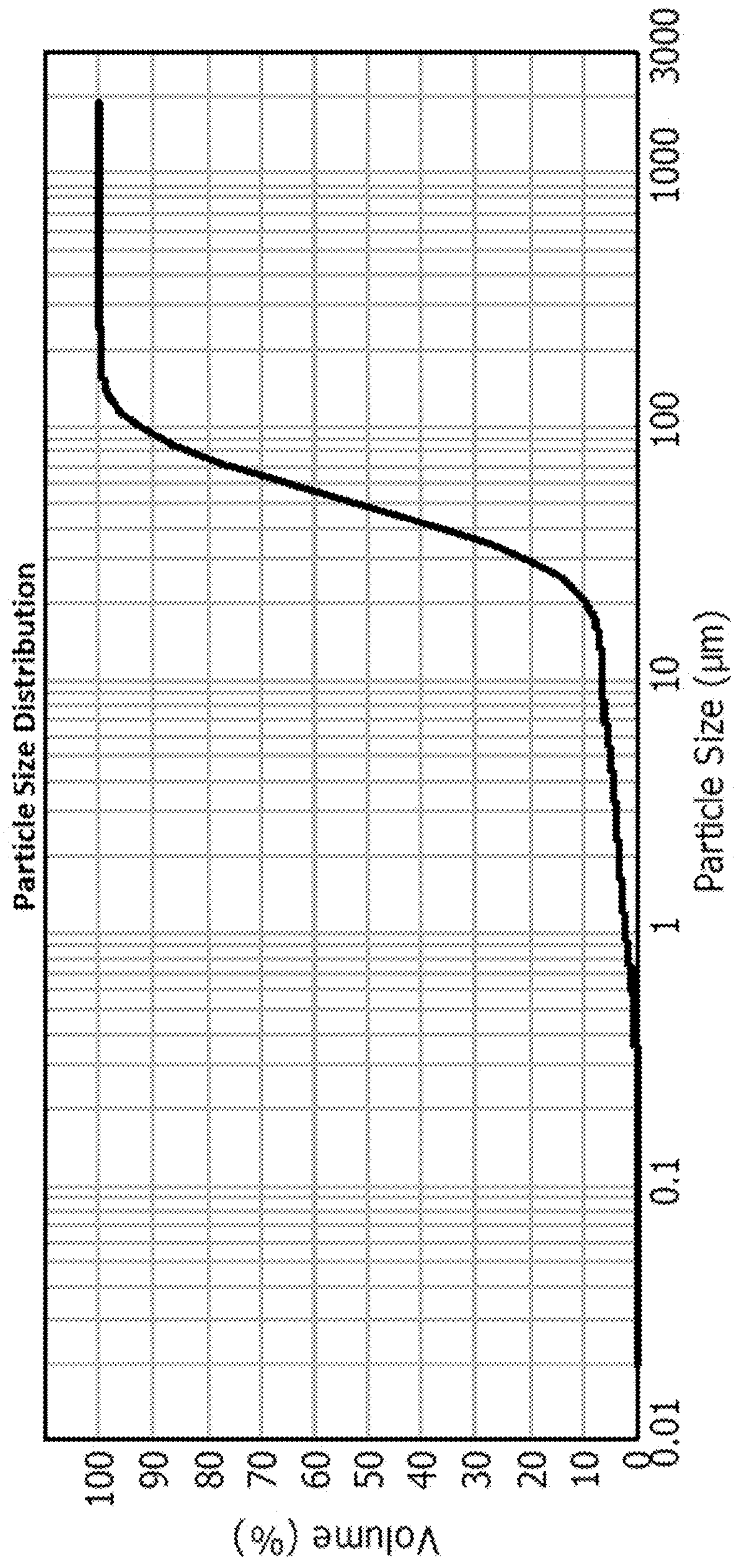
FIG. 4 depicts a particle size distribution analysis for the FGD gypsum feedstock used in testing.

FGD gypsum feedstock from a typical coal power plant was used as the feedstock in preliminary testing. The composition of the FGD gypsum feedstock used in preliminary testing of the FGD conversion process is depicted in FIG. 3 and the particle size analysis of the FGD gypsum feedstock is shown in FIG. 4. Values shown "<X" are below detection limits, where X is the detection limit of the equipment used in the analysis.

Batch Process

Figure 5:
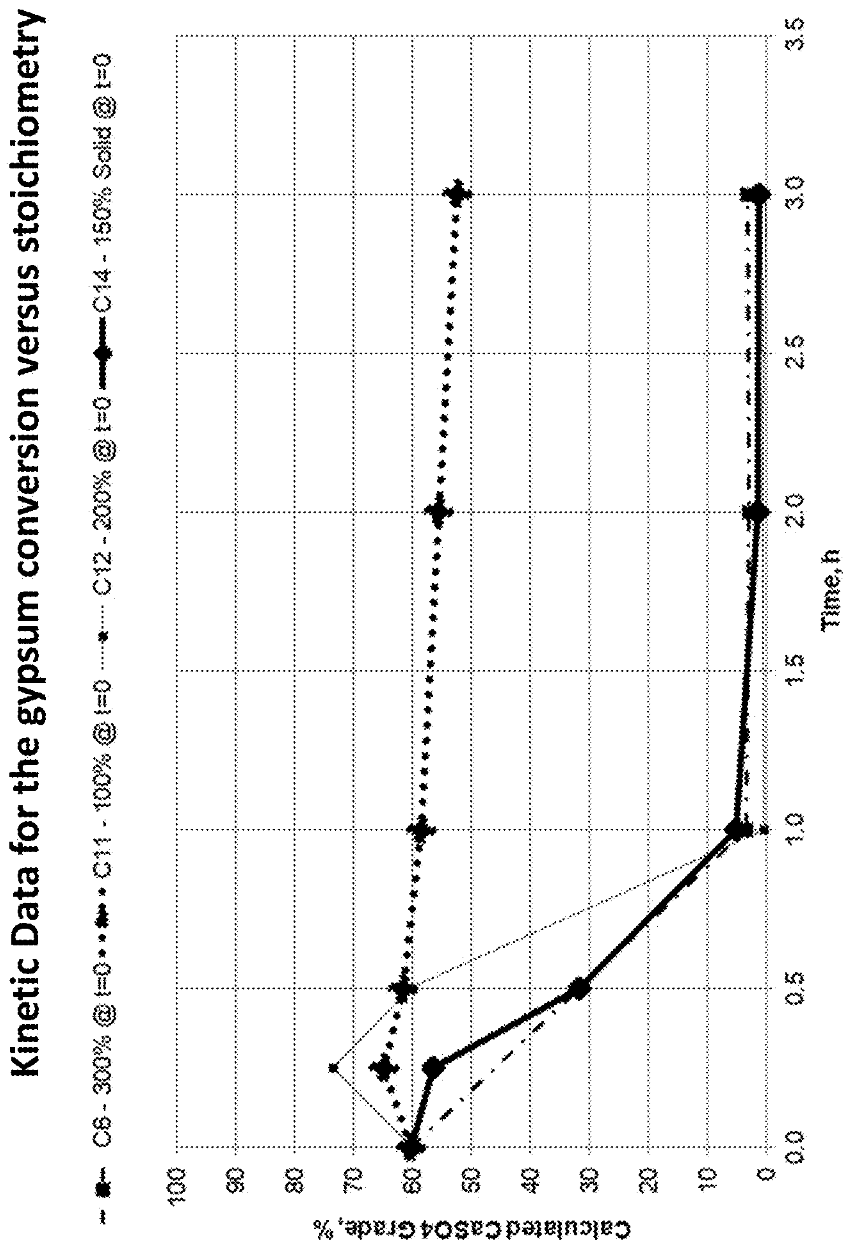
FIG. 5 depicts kinetic data for varying reagent stoichiometric additions in testing of the FGD gypsum conversion process.

In preliminary batch testing, FGD gypsum feedstock samples were slurried in water at 19% by weight solids and reacted with 15 wt % ammonium carbonate reagent solution at ambient temperature and pressure. Higher solids samples can also be used with equivalent increases in the ammonium carbonate reagent. Higher temperatures are not desirable because the ammonium carbonate reagent is less stable at higher temperatures. Kinetic data for varying reagent additions used in preliminary testing of the FGD conversion process, depicted in the chart in FIG. 5, shows that at 140%-150% stoichiometric additions of reagents to reactants the reaction between FGD gypsum feedstock and ammonium carbonate worked well and after one to three hours, at atmospheric pressure and ambient temperature, produced ammonium sulfate >99.9% in the liquor and 93-95% calcium carbonate product. Lower stoichiometric additions take much longer to react and the reaction may not go to completion. When evaporated to dryness, the purity of the ammonium sulfate was >99.7%. Assays for the crystallized ammonium sulfate product produced in preliminary testing of the FGD conversion process are depicted in FIG. 6. The assay results were 99.7% or 99.9% depending on the assay method. Values shown "<X" are below detection limits, where X is the detection limit.

Test conditions and results of preliminary testing of the FGD conversion process are depicted in FIG. 7. Calculated final product values generated in preliminary testing of the FGD conversion process are depicted in FIG. 8 and shows very high purity ammonium sulfate. Based on these tests, the optimum stoichiometry for the FGD conversion process was determined to be 140% to 150% and the FGD conversion reaction was complete after one to three hours. From 140% to 100% stoichiometry the reaction slows down as excess reagent is decreased and completion takes impractically long times for a commercial application. Stoichiometry lower than 100% resulted in less than 99% conversion of FGD gypsum feedstock, while higher than 150% stoichiometric resulted in wasted reagent. Variations in the composition of the feedstock may produce different results.

Continuous Process

As discussed herein, the FGD conversion process may be operated in a continuous mode. Continuous mode was demonstrated in a pilot production plant 900, depicted in FIG. 9, operated at an FGD gypsum feedstock feed rate of 1 kg/hr. Ammonium carbonate reagent was mixed by mixer 902 with water in vessel 905 to produce a 15 wt % ammonium carbonate solution that was pumped by pump 907 into the first reactor 910, operating in an overflow mode to three other reactors 911, 912, and 913, to provide sufficient reaction time for the conversion to go to completion. In some embodiments, material may be transferred between the reactors 910, 911, 912, and 913 using underflow, overflow, or a pump. The FGD gypsum feedstock was fed as a powder from bin 920 using a screw feeder 925 to the first reactor in the reactor cascade 922, comprising reactors 910, 911, 912, and 913, where it was mixed with the ammonium carbonate solution. The slurry is then kept in suspension by mixers 931, 932, and 933 in each reactor 911, 912, and 913 to allow sufficient time for the reaction to take place. The slurry overflowed from reactor 913 into a continuous filter 940 (alternating between two pan filters) to remove the solid calcium carbonate product (which was then washed) and the resulting filtrate, ammonium sulfate liquor, was collected in tank 945. The wash liquid was collected in tank 946.

Figure 9:
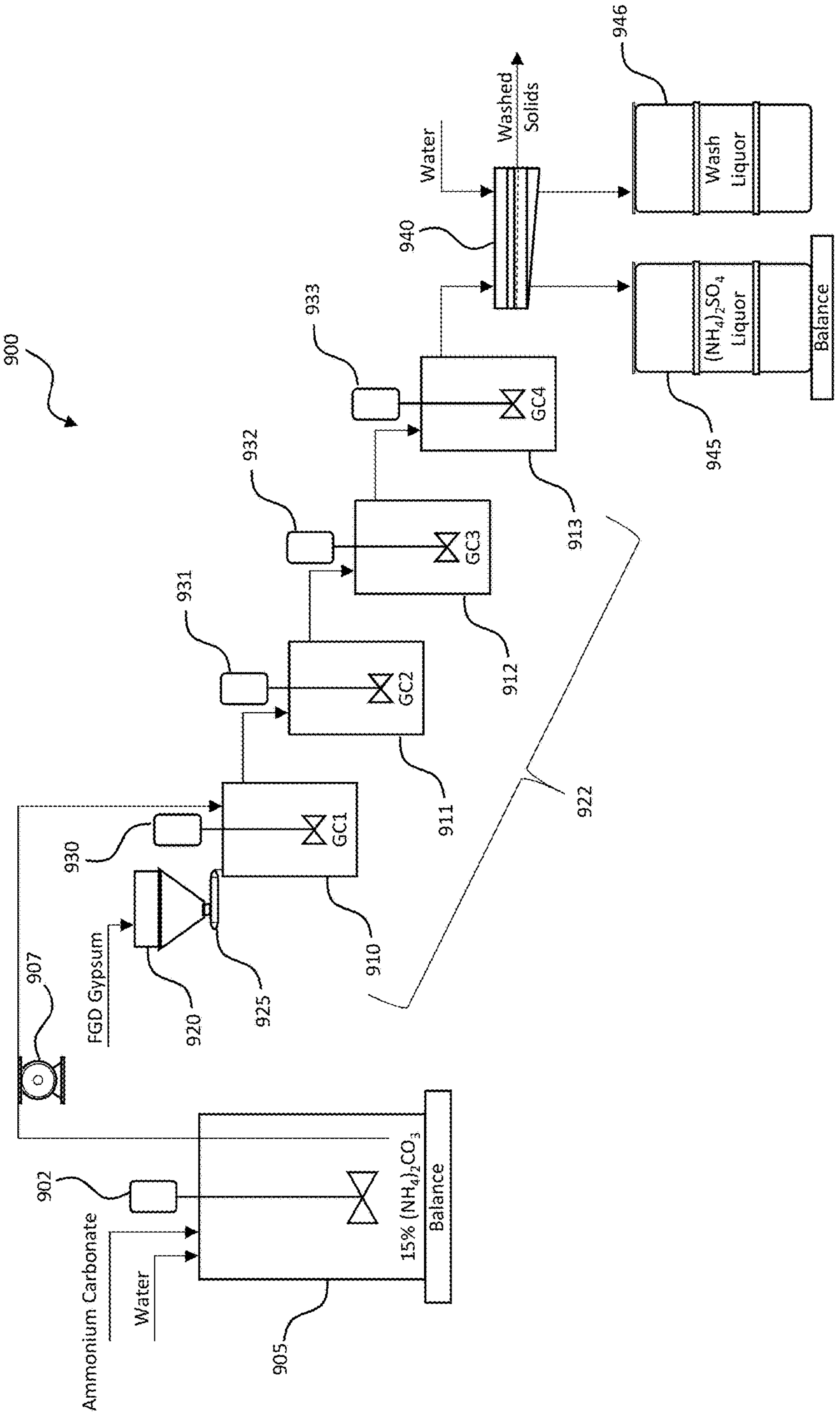
FIG. 9 depicts a schematic of a pilot production plant operating in continuous mode.

The pilot production plant 900 depicted in FIG. 9 was operated at a constant 20° C.±3° C. and a pH ranging between 7.5 and 8.5 for 110 hours (over the course of five days) at the following conditions:

- Condition 1A: 150% of the stoichiometric quantity of reactants, Day 1-2
- Condition 2: 125% of the stoichiometric quantity of reactants, Day 2
- Condition 1A: 150% of the stoichiometric quantity of reactants, Day 3
- Condition 1B: 150% of the stoichiometric quantity of reactants+catalyst, Day 3
- Condition 3: 140% of the stoichiometric quantity of reactants, Day 4
- Condition 4: 150% of the stoichiometric quantity of reactants and at double the feed rates (2 kg/hr), Day 4

Figure 10:
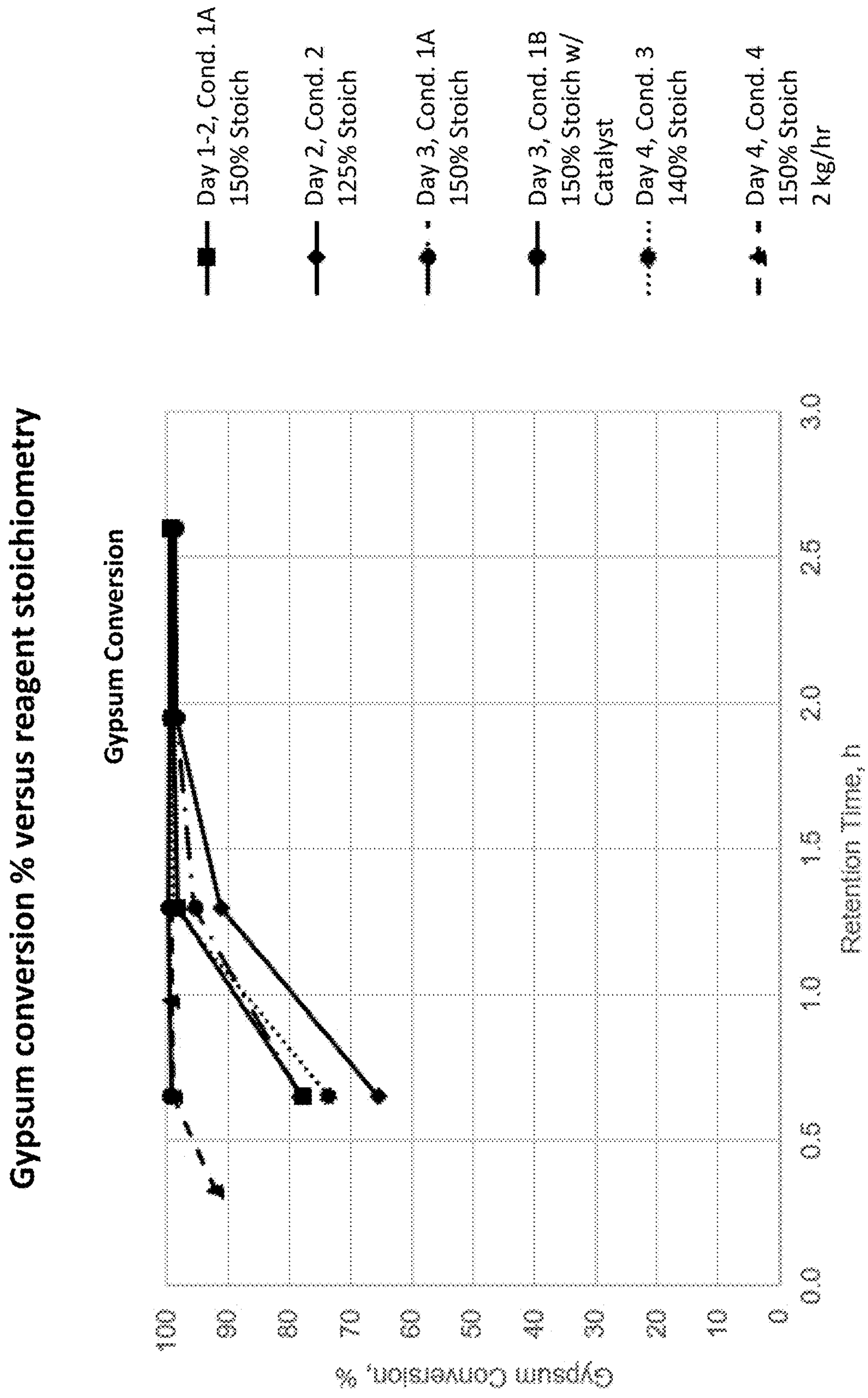
FIG. 10 depicts calculated gypsum conversion rates with different stoichiometric conditions in the pilot production plant depicted in FIG. 9.

FIG. 10 depicts calculated gypsum conversion with changing conditions in the pilot production plant 900 (FIG. 9). These tests showed that:

- 140%-150% stoichiometric addition of reagent with respect to the quantity of reactants was sufficient for quantitative conversion.
- The catalyst addition reduced the reaction time.
- Doubling the feed rates of FGD gypsum feedstock reduced the reaction time.

Figure 11:
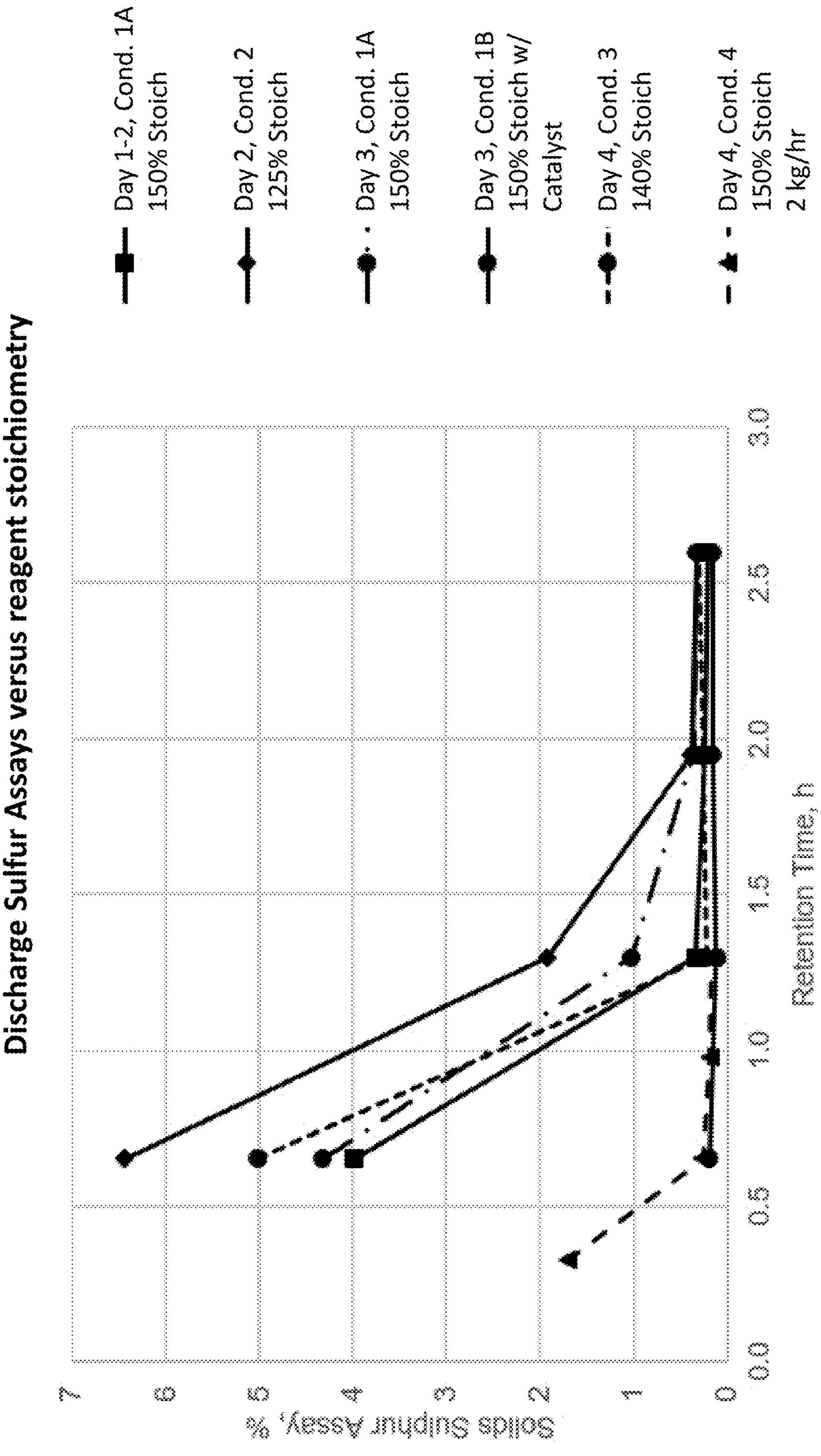
FIG. 11 depicts discharge sulfur assays from the pilot production plant depicted in FIG. 9 showing the reaction times as a function of stoichiometry.

FIG. 11 depicts discharge sulfur assays from the pilot production plant 900 (FIG. 9). Referencing FIG. 9, the majority of the conversion took place within the first two reactors 910, 911 (<1.5 hours for Conditions 1A and 3; and <0.75 hours for Conditions 1B and 4). The third and fourth reactors 912, 913 provided extra time to complete the reaction for the remaining gypsum.

Figure 12:
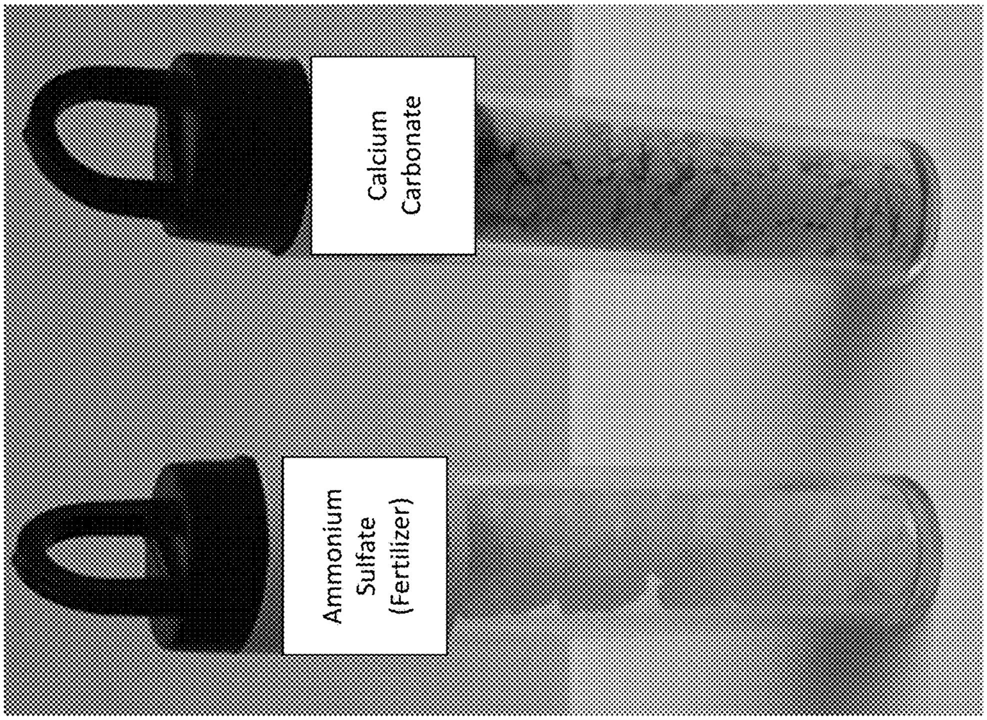
FIG. 12 depicts exemplary ammonium sulfate and calcium carbonate products produced by the pilot production plant depicted in FIG. 9.

The purity of the ammonium sulfate product produced in preliminary testing of the FGD conversion process was 99.9 wt % (FIG. 8). The purity of the calcium carbonate produced in preliminary testing of the FGD conversion process was 93-95 wt % (FIG. 8) with an average D50 particle size of 44 μm. While the calcium carbonate product was of good purity, the small amounts of impurities tinted the product a grey to tan color. The impurities causing the color were carbon and iron which are dependent on the impurities in the FGD gypsum feedstock. FIG. 12 depicts ammonium sulfate and calcium carbonate products generated by the pilot production plant 900 (FIG. 9). FIG. 13 depicts the composition of the ammonium sulfate crystal product produced in the pilot production plant 900 (FIG. 9). Variations in FGD gypsum feedstock may produce different results.

Chloride Removal

An example chloride removal process used in testing is described below. The following process could be scaled according to processing requirements. Testing was carried out at 75° C. with two water leaches.

1. First 1000 g of hot 75° C. deionized water was added in a reactor. Next, 250 g of FGD gypsum feedstock sample was added. The mixture resulted in a slurry. The reactor was equipped with a lid and impellor.
2. The slurry was agitated for half an hour.
3. After half hour slurry time, the leached FGD gypsum feedstock solids were filtered and the filtrate was collected. Filtration properties were then recorded.
4. 1000 g of hot 75° C. water was added to the reactor along with the solids from step 3. The mixture was agitated for half an hour.
5. After the half hour agitation time, leached solids from step 4 were filtered and the filtrate was collected. Filtration properties were recorded.
6. 25 mL of filtrate 1 (step 3) were combined with 25 mL of filtrate 2 (step 5) and submitted for assay.

7. The leached FGD gypsum feedstock was dried at 95° C. or lower until the weight did not change.
8. Samples were submitted for assay by inductively coupled plasma-mass spectrometry (ICP-MS) and chloride analysis.

The results obtained on an FGD gypsum feedstock sample that contained around 0.5% by weight chloride, showed that >99 wt % of the chloride can be leached out using the chloride removal process. The concentration of chloride in the wash water was 1033 ppm. The cations associated with the chloride were calcium at 894 ppm and magnesium at 166 ppm. The chloride level in the washed FGD gypsum feedstock was reduced to around 100 ppm.

Phosphogypsum Conversion

To demonstrate this overall process, laboratory tests at the 0.5-1 kg scale were conducted to determine the optimal pH values for the separations. The laboratory tests were followed by a larger scale test at the 50-60 kg scale based on the results from the laboratory tests.

Experimental results showed that gypsum conversion in a batch process produced the same results as the continuous process. Therefore, both the small-scale and the large-scale tests may be performed in a batch mode or in a continuous mode.

The phosphogypsum samples used were assayed for elemental composition including such specific tests as needed.

A non-limiting example laboratory test processed 0.5-1 kg of phosphogypsum through the phosphogypsum conversion process to confirm the reaction works as well as it does with FGD. Since the PG is acidic, prior to processing, the PG slurry was neutralized to pH 7 with $Ca(OH)_2$ or $NH_4OH$ to react with the acidic phosphate and prevent acidic decomposition of the ammonium carbonate reactant. The neutralized feed was reacted with ammonium carbonate to produce ammonium sulfate crystals and technical grade calcium carbonate, as shown in equation 13. The impurities in the calcium carbonate precipitate may be identified and ensure that the ammonium sulfate is free from deleterious contaminants.

Next, the calcium carbonate may then be purified. The first step in that process is to determine the optimal pH for reaction (11) so that the calcium is dissolved but minimizes the dissolution of the impurities. Different final pHs may be selected to optimally separate the impurities. The pH may then be increased stepwise using calcium hydroxide or another caustic or base to sequentially precipitate dissolved impurities. If fluoride is present in the sample, calcium fluoride will precipitate at higher pHs. The various precipitates may then be filtered out and analyzed to determine the concentrations of the separated impurities.

Once the optimal operating conditions are confirmed, a larger scale test (50-60 kg) may be performed in order to create sufficient volumes of each product to enable technical evaluation, support initial performance testing of each product, confirm reagent requirements, and develop input to support regulatory discussions about the commercial production of these products from the PG feedstock.

Precipitation Testing

In precipitation testing, the liquors that resulted from leach testing were separated into value-added, marketable products. The separation was accomplished by adjusting the pH of the acidic solution using sodium hydroxide in precipitation testing. Calcium hydroxide, sodium carbonate, potassium hydroxide, or ammonium hydroxide may also be used to neutralize the acid. Sharp separations of numerous metals can be obtained by careful adjustment of the pH values. The general reaction is as follows:

$$MCl+NaOH \rightarrow MOH\ (insoluble)+NaCl \qquad (13)$$

wherein M is a metal or non-metal cation.

One adjustment that may be made prior to the first precipitation is to add hydrogen peroxide to oxidize ferrous ion to ferric ion. As shown in FIGS. 18-21 the sequence of precipitates is: Fe, Al, REEs and transition metals, Mg, and Ca when the feedstock includes ash.

The precipitation test procedure described below is for exemplary purposes only and should not be considered limiting:

1. 3000 mL of a leachate feed solution was added to a reactor (all in a fumehood).
2. A sufficient quantity (enough to increase the pH to the desired value) of concentrated and dilute neutralizing reagent (NaOH or $CaCO_3$/$Ca(OH)_2$) was prepared.
3. The reactor was equipped with a lid and the pulp was agitated with a mixer and an impeller. pH, temperature, and ORP probes were used.
4. No heat input was required. Neutralizing base reagent was slowly added a few grams at a time. More dilute reagent was used closer to the target pH. Time zero occurred when the target pH was first achieved. The target pH was held for one hour, with additional reagent additions as required.
5. All reagent additions and temperature changes were recorded.
6. After the required test time elapsed, the net pulp weight was recorded, the pulp was filtered and the filtrate was collected, filtration properties (time, color, paper type, etc.) were recorded, and the weight, specific gravity, pH and ORP were recorded.
7. A displacement water wash was conducted three times with 100 mL of water.
8. The combined wash liquors were collected, the filtration properties were recorded (time, color, paper type, etc.), and the weight, specific gravity, pH, and ORP were determined.
9. The solids were dried at 95° C. or lower until the weight of solids was constant.
10. Samples were submitted for assay as per requirements.

Precipitation testing identified target pHs (also referred to herein as pH cuts) at which one or more elements precipitated out of the leachate into the residue. The results of this testing are shown in FIG. 36.

Leach Process

Class F ash feedstock from Northern Appalachian coal and class C ash feedstock from Powder River Basin Coal were used in testing of the ash conversion process to ensure wide applicability. Class C ash feedstock contains more calcium and less silica while class F ash feedstock contains less calcium and more silica and is more difficult to acid leach. FIGS. 22 through 24 depict the compositions (elemental composition as well as mineral compounds by XRD) of the class F and class C ash feedstocks used in preliminary testing of the ash conversion process.

Several different acid lixiviant combinations were tested in initial leach scout testing to determine the best acid lixiviants to obtain the largest extraction of all the elemental components in the ash feedstock, except for silica which is left as a marketable residue. The acid lixiviants used in initial leach scouting tests were nitric acid, hydrochloric acid, sulfuric acid, sulfuric with sodium fluoride and calcium fluoride, 6N aqua regia, and strong caustic. After the initial leach scouting tests, the following leach tests were performed on both class F and class C ash feedstocks: 6N aqua regia (HCl & $HNO_3$) (FIG. 25), 6N $H_2SO_4$+0.006N NaF (FIG. 26), 6N $H_2SO_4$+0.05% $CaF_2$ (FIG. 27), 2-stage HCl pH 1.5 then 11% HCl (FIG. 28), and 2-stage HCl pH 1.5 then 30% HCl (FIG. 29). All leach tests were performed at 90° C., a solids ratio of 14%, and five sampling times, 0.5, 1, 2, 4, and 6 hours. The results depicted in FIGS. 25 through 27 are for 6 hour sample times and FIGS. 28 through 29 are for four hour each stage sample times. 90° C. was the maximum temperature without boiling the solution and, theoretically, should have resulted in maximum dissolution. All leachates and residues from leach testing were analyzed compositionally and mineralogically.

Figure 35:
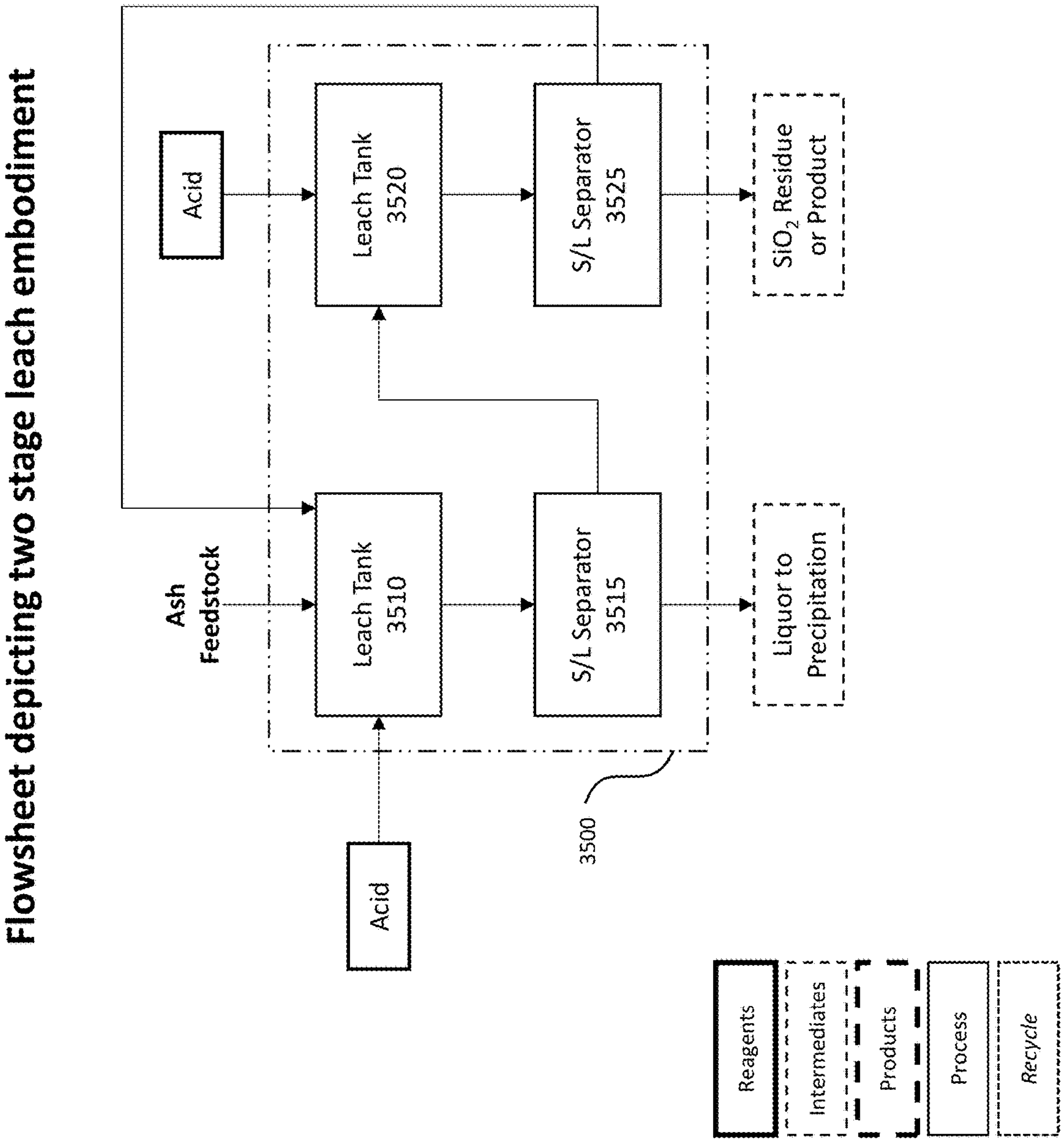
FIG. 35 is a flowsheet depicting a two-stage leach embodiment.

FIG. 35 depicts a two-stage leach process 3500. This process may replace the single stage leach process 1811 depicted in FIGS. 18 and 20. In the two-stage leach process 3500, ash feedstock enters a first leach tank 3510 where it is leached with acid resulting in a first leachate. The first leachate proceeds to solid/liquid separator 3515 resulting in a liquor which proceeds to precipitation steps and a residue. The residue proceeds to a second leach tank 3520 resulting in a second leachate. The second leachate proceeds to solid/liquid separator 3525 resulting in a silica residue or product and a liquor. The liquor from solid/liquid separator 3525 is routed back to the first leach tank 3510. In some embodiments, the acid used in the first leach tank 3510 may be HCl to lower the pH to 1.5. In some embodiments, the acid in the second leach tank may be 11 wt %-30 wt % HCl.

X-ray Diffraction (XRD) patterns together with elemental analysis showed the final residues from the preliminary leach tests were primarily amorphous silica with minor amounts of crystalline silica, silicates (mullite), barite, phosphates, and titanates. The final residues from preliminary leach tests were grey in color due to a carbon impurity.

Leach Testing

The leach test procedure described below is for exemplary purposes only and should not be considered limiting.

1. An initial lixiviant solution was prepared and added to a reactor. Slowly, the ash feedstock solids were added (200 g) to the solution a few grams at a time. The target concentration was 14% solids.
2. The reactor was equipped with a lid and condenser, and the pulp was agitated with a mixer and impellor.
3. The pulp was heated to target temperature (90° C.) with heating mantle or other heating method. Time zero occurred when the target temperature was achieved.
4. Pulp samples of about 40 mL were collected at different time intervals to determine the effect of time on leaching. Net weight was recorded, the pulp was filtered, the filtrate was collected, and key data was recorded. The solids were returned to the reactor and the filtrate kept for assay.
5. After the required test time, the net pulp weight was recorded, the pulp was filtered and the filtrate was collected. The filtration properties (time, color, paper type, etc.) were then recorded, and the weight, specific gravity, pH, and oxidation reduction potential (ORP) were determined.
6. The residue was re-pulped with a target amount of wash water (200 mL).
7. A displacement wash was conducted two to four times with 70 mL water.
8. The combined wash liquors were collected, the filtration properties (time, color, paper type, etc.) were recorded, and the weight, specific gravity, pH, and ORP were determined.
9. The solids were dried at 95° C. or lower until weight of solids remained constant.
10. Samples were submitted for assay.

Leach test results were labeled as poor, good, or excellent. Poor results were when less than 65% dissolution was achieved for the target elements, good results were when 65% to 90% dissolution was achieved, and excellent results were when 90% to 100% dissolution is achieved.

FIG. 25 is a table depicting leach test results of class F and class C ash feedstocks using 3:1 6N hydrochloric acid (HCl) to 6N nitric acid ($HNO_3$) for 6 hours. FIG. 25 indicates good leaching results but the reaction was very vigorous and NOx fumes were liberated. The 6N aqua regia was found to be effective for the more difficult to dissolve class F ash feedstock; however, the aqua regia added nitrate to the final sodium chloride product of the ash conversion process which is not ideal because it resulted in a sodium chloride/sodium nitrate mixture which is more difficult to market than sodium chloride.

FIG. 26 is a table depicting leach test results of class F and class C ash feedstocks using 6N sulfuric acid ($H_2SO_4$) and 0.006N sodium fluoride (NaF). This reaction forms insoluble sulfates with calcium so it remains with the insoluble silica. Class F ash feedstock dissolution was poor.

FIG. 27 is a table depicting leach test results of class F and class C ash feedstocks using 6N sulfuric acid ($H_2SO_4$) and 0.05% calcium fluoride ($CaF_2$). This testing had similar results to FIG. 26 (6N sulfuric acid and 0.006N sodium fluoride).

FIG. 28 is a table depicting leach test results of class F and class C ash feedstocks using HCl to pH 1.5 in a first stage then 11% HCl in a second stage. The dissolution of the class C ash feedstock was excellent, but class F ash feedstock did not perform as well. Most of the calcium dissolves in the first stage at pH 1.5. There is improved dissolution at the higher acid concentration for the other major elements. Dissolution continued to improve with time.

FIG. 29 is a table depicting leach test results of class F and class C ash feedstocks using HCl to pH 1.5 in a first stage then 30% HCl in a second stage. The class F ash feedstock had much better dissolution at 30% HCl in the second stage compared to the 11% HCl in FIG. 11. The class C ash feedstock dissolution, on the other hand, only improved slightly compared to the 11% HCl second stage in FIG. 28. The class F ash feedstock showed that the leaching improved with time.

FIG. 30 is a table depicting leach test results for continuing the second stage (30% HCl) leach of FIG. 29 for class C ash feedstock for 24 hours. The longer leach test time improved dissolution for all elements and results in improved quality of silica residue.

It should be noted that better extractions were obtained by leaching for longer times (up to 24 hours was tested) and can be used to optimize the dissolution. In theory, leaching times in excess of 24 hours are feasible but further increases in dissolution of the elements reduces exponentially over time.

Comparisons of the leach test results between 11 wt % HCl and 30 wt % HCl on both class F and class C ash feedstocks are shown in FIGS. 31 through 34. The results for class F ash feedstock shows that the 30 wt % acid is significantly more effective than the 11 wt % acid. However, the benefit for class C ash feedstock is minor, therefore the 11% is a better selection from a reagent consumption consideration since the acid(s) used in the leaching step need to be neutralized in the next process steps with the addition of lime (FIGS. 18-19) or caustic (FIGS. 20-21), in some embodiments. For a lime production plant 1800*a* (FIGS.

18-19) and a caustic production plant 1800*b* (FIGS. 20-21), in some embodiments, concentrations of about 30 wt % HCl may be used for class F ash feedstocks and around 11 wt % HCl for class C ash feedstocks.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A system comprising:

a phosphogypsum feedstock comprising calcium sulfate and at least two impurities;

a mixer to combine ammonia gas, carbon dioxide, and water, resulting in an ammonium carbonate reagent solution;

one or more first reactors to combine and react the phosphogypsum feedstock with the ammonium carbonate reagent solution, resulting in a first reacted slurry, comprising calcium carbonate, ammonium sulfate, and the at least two impurities;

a first filter to separate the calcium carbonate and the at least two impurities from the first reacted slurry, producing an ammonium sulfate filtrate;

an evaporator to evaporate water from the ammonium sulfate filtrate to produce an ammonium sulfate liquor;

a crystallizer to crystallize and agglomerate the ammonium sulfate liquor, resulting in ammonium sulfate crystals;

a centrifuge to separate the ammonium sulfate crystals from the ammonium sulfate liquor;

a dryer to dry the ammonium sulfate crystals;

a second reactor to combine and dissolve the calcium carbonate and the at least two impurities with a solvent, resulting in a second reacted slurry, the second reacted slurry comprising solutes of the at least two impurities, calcium, and at least one insoluble component;

a second filter to separate the at least one insoluble component from the second liquor, resulting in a second filtrate comprising the solutes of the at least two impurities and the calcium nitrate, wherein the second filtrate has a pH;

a third reactor to combine the second filtrate with a first base to precipitate a first metal from the second filtrate, wherein the first base is added until the pH of the second filtrate increases to a first predetermined pH, and wherein the first metal is at least one of the at least two impurities;

a third filter to separate the first metal from the second filtrate, resulting in a third filtrate comprising the calcium and a solute of the second of the at least two impurities, wherein the third filtrate has a pH;

a fourth reactor to combine the third filtrate with a second base to precipitate a second metal from the third filtrate, wherein the second base is added until the pH of the third filtrate increases to a second determined pH, wherein the second metal is the second of the at least two impurities;

a fourth filter to separate the second metal from the third filtrate, resulting in a fourth filtrate comprising the calcium;

a fifth reactor to combine the fourth filtrate with a soluble carbonate to precipitate calcium carbonate from the fourth filtrate, wherein the soluble carbonate is added until the pH of the fourth filtrate increases to a third predetermined pH; and a fifth filter to separate the calcium carbonate from the fourth filtrate.

2. The system of claim 1 wherein the at least two impurities in the calcium sulfate feedstock includes at least two of iron, aluminum, magnesium, manganese, uranium, thorium, lanthanum, praseodymium, cerium, neodymium, yttrium, strontium, barium, and magnesium.

3. The system of claim 1 wherein the phosphogypsum feedstock further includes at least one of red mud from an aluminum process, slag from steel furnaces, ash, and mine tailings.

4. The system of claim 1 wherein the solvent is an acid.

5. The system of claim 1 wherein the first base includes at least one of sodium hydroxide, calcium hydroxide, potassium hydroxide, and ammonium hydroxide.

6. The system of claim 1 wherein the first predetermined pH is 4.

7. The system of claim 1 wherein the second base includes at least one of sodium hydroxide, calcium hydroxide, potassium hydroxide, and ammonium hydroxide.

8. The system of claim 1 wherein the first metal includes at least one of iron, aluminum, uranium, and thorium.

9. The system of claim 1 wherein the second predetermined pH is 9.

10. The system of claim 1 wherein the second metal includes at least one of manganese, lanthanum, praseodymium, cerium, neodymium, and yttrium.

11. The system of claim 1 wherein the at least one insoluble component includes at least one of silicon, aluminum silicate, mullite, and carbon.

12. The system of claim 1 wherein the third predetermined pH is 13.

13. The system of claim 12 further comprising the precipitation of strontium carbonate and barium carbonate with the addition of the soluble carbonate.

14. The system of claim 1 wherein the soluble carbonate includes at least one of sodium carbonate, carbon dioxide, ammonium carbonate, or potassium carbonate.

15. The system of claim 1 wherein each of the one or more first reactors is a continuously-stirred tank reactor or a plug-flow reactor.

16. The system of claim 1 wherein there is one first reactor.

17. The system of claim 1 wherein there are two first reactors.

18. The system of claim 1 wherein there are three first reactors.

19. The system of claim 1 wherein there are four first reactors.

20. The system of claim 1 wherein the second filtrate further comprises at least one of ammonium chloride and potassium chloride.

21. The system of claim 1 wherein the third filtrate further comprises at least one of aluminum hydroxide, magnesium hydroxide, uranium, and thorium.

22. The system of claim 1 wherein the fourth filtrate further comprises at least one of rare-earth elements, ammonium nitrate, sodium phosphate, potassium phosphate, ammonium phosphate, and sodium chloride.

23. The system of claim 1 wherein the calcium carbonate separated from the fourth filtrate is in the form of nanoparticles.

24. A system comprising:

a phosphogypsum feedstock comprising calcium sulfate and at least three impurities;

a mixer to combine ammonia gas, carbon dioxide, and water, resulting in an ammonium carbonate reagent solution;

one or more first reactors to combine and react the phosphogypsum feedstock with the ammonium carbonate reagent solution, resulting in a first reacted slurry, comprising calcium carbonate, ammonium sulfate, and the at least three impurities;

a first filter to separate the calcium carbonate and the at least three impurities from the first reacted slurry, producing an ammonium sulfate filtrate;

an evaporator to evaporate water from the ammonium sulfate filtrate to produce an ammonium sulfate liquor;

a crystallizer to crystallize and agglomerate the ammonium sulfate liquor, resulting in ammonium sulfate crystals;

a centrifuge to separate the ammonium sulfate crystals from the ammonium sulfate liquor;

a dryer to dry the ammonium sulfate crystals;

a second reactor to combine and dissolve the calcium carbonate and the at least three impurities with a solvent, resulting in a second reacted slurry, the second reacted slurry comprising solutes of the at least two impurities, calcium, and at least one insoluble component;

a second filter to separate the at least one insoluble component from the second liquor, resulting in a second filtrate comprising the solutes of the at least three impurities and the calcium nitrate, wherein the second filtrate has a pH;

a third reactor to combine the second filtrate with a first base to precipitate a first metal from the second filtrate, wherein the first base is added until the pH of the second filtrate increases to a first predetermined pH, and wherein the first metal is at least one of the at least three impurities;

a third filter to separate the first metal from the second filtrate, resulting in a third filtrate comprising the calcium and a solute of the second and third of the at least three impurities, wherein the third filtrate has a pH;

a fourth reactor to combine the third filtrate with a second base to precipitate a second metal from the third filtrate, wherein the second base is added until the pH of the third filtrate increases to a second determined pH, wherein the second metal is the second of the at least three impurities;

a fourth filter to separate the second metal from the third filtrate, resulting in a fourth filtrate comprising the calcium and a solute of the third of the at least three impurities;

a fifth reactor to combine the fourth filtrate with a third base to precipitate a third metal from the fourth filtrate, wherein the third base is added until the pH of the third filtrate increases to a third determined pH, wherein the third metal is the third of the at least three impurities;

a fifth filter to separate the second metal from the fourth filtrate, resulting in a fifth filtrate comprising the calcium;

a sixth reactor to combine the fifth filtrate with a soluble carbonate to precipitate calcium carbonate from the fourth filtrate, wherein the soluble carbonate is added until the pH of the fourth filtrate increases to a fourth predetermined pH;

a sixth filter to separate the calcium carbonate from the fifth filtrate.

25. The system of claim 24 wherein the third predetermined pH is 11.

26. The system of claim 24, wherein the at least three impurities includes at least three of iron, aluminum, magnesium, manganese, uranium, thorium, lanthanum, praseodymium, cerium, neodymium, yttrium, strontium, barium, and magnesium.

27. The system of claim 24, wherein the third metal includes magnesium.

* * * * *

US011479472C1

(12) EX PARTE REEXAMINATION CERTIFICATE (12995th)

United States Patent

Papouchado et al.

(10) Number: US 11,479,472 C1

(45) Certificate Issued: Jul. 24, 2025

(54) SYSTEMS AND METHODS TO RECOVER VALUE-ADDED MATERIALS FROM GYPSUM

(71) Applicant: Elixsys, inc., Bainbridge Island, WA (US)

(72) Inventors: Lucien M. Papouchado, Aiken, SC (US); Barry E. Sheetz, Lemont, PA (US); Leonard Passmore, Clarksville, VA (US); Joseph D. Preston, Bainbridge Island, WA (US)

(73) Assignee: DAVY POWERSPORTS INC., Bainbridge Island, WA (US)

Reexamination Request:
No. 90/019,396, Jan. 31, 2024

Reexamination Certificate for:

| | |
|---|---|
| Patent No.: | **11,479,472** |
| Issued: | **Oct. 25, 2022** |
| Appl. No.: | **17/321,437** |
| Filed: | **May 15, 2021** |

Related U.S. Application Data

(63) Continuation-in-part of application No. 16/749,860, filed on Jan. 22, 2020, now Pat. No. 11,148,956.

(60) Provisional application No. 63/025,548, filed on May 15, 2020, provisional application No. 62/878,542, filed on Jul. 25, 2019, provisional application No. 62/824,523, filed on Mar. 27, 2019, provisional application No. 62/810,066, filed on Feb. 25, 2019, provisional application No. 62/796,541, filed on Jan. 24, 2019, provisional application No. 63/149,045, filed on Feb. 12, 2021.

(51) Int. Cl.

| | |
|---|---|
| ***C01F 11/18*** | (2006.01) |
| ***B01D 9/00*** | (2006.01) |
| ***B01D 21/26*** | (2006.01) |
| ***B01D 36/02*** | (2006.01) |
| ***B01D 36/04*** | (2006.01) |
| ***C01C 1/244*** | (2006.01) |

(52) U.S. Cl.
CPC ............ *C01F 11/18* (2013.01); *B01D 9/0022* (2013.01); *B01D 9/0059* (2013.01); *B01D 21/262* (2013.01); *B01D 36/02* (2013.01); *B01D 36/045* (2013.01); *C01C 1/244* (2013.01); *B01D 2009/0086* (2013.01); *C01P 2006/80* (2013.01)

(58) Field of Classification Search
None
See application file for complete search history.

(56) References Cited

To view the complete listing of prior art documents cited during the proceeding for Reexamination Control Number 90/019,396, please refer to the USPTO's Patent Electronic System.

*Primary Examiner* — Joseph R Kosack

(57) ABSTRACT

Disclosed herein are systems and methods from processing flue gas desulfurization (FGD) gypsum feedstock and ash feedstocks, either separately or together. FGD gypsum conversion comprises reacting FGD gypsum (calcium sulfate) feedstock or phosphogypsum, in either batch or continuous mode, with ammonium carbonate reagent to produce commercial products comprising ammonium sulfate and calcium carbonate. A process to separate the impurities and convert the calcium carbonate to a pure precipitated calcium carbonate is disclosed. These impurities include a concentrate of valuable Rare Earth Elements, and radioactive thorium and uranium. A process to convert calcium sulfite to calcium sulfate using oxygen and a catalyst is also disclosed. Ash conversion comprises a leach process followed by a sequential precipitation process to selectively precipitate products at predetermined pHs resulting in metal hydroxides which may be converted to oxides or carbonates. The processes may be controlled by use of one or more processors.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8, 21, and 24-27 are cancelled.

Claims 2-7, 9-12, 14-20, 22, and 23 are determined to be patentable as amended.

Claim 13, dependent on an amended claim, is determined to be patentable.

New claims 28 and 29 are added and determined to be patentable.

2. The system of claim [1] *6* wherein the at least two impurities in the calcium sulfate feedstock includes at least two of iron, aluminum, magnesium, manganese, uranium, thorium, lanthanum, praseodymium, cerium, neodymium, yttrium, strontium, barium, and magnesium.

3. The system of claim [1] *6* wherein the phosphogypsum feedstock further includes at least one of red mud from an aluminum process, slag from steel furnaces, *coal* ash, and mine tailings.

4. The system of claim [1] *6* wherein the solvent is an acid.

5. The system of claim [1] *6* wherein the first base includes at least one of sodium hydroxide, calcium hydroxide, potassium hydroxide, and ammonium hydroxide.

6. [The system of claim 1] *A system comprising:*

*a phosphogypsum feedstock comprising calcium sulfate and at least two impurities;*

*a mixer to combine ammonia gas, carbon dioxide, and water, resulting in an ammonium carbonate reagent solution;*

*one or more first reactors to combine and react the phosphogypsum feedstock with the ammonium carbonate reagent solution, resulting in a first reacted slurry, comprising calcium carbonate, ammonium sulfate, and the at least two impurities;*

*a first filter to separate the calcium carbonate and the at least two impurities from the first reacted slurry, producing an ammonium sulfate filtrate;*

*an evaporator to evaporate water from the ammonium sulfate filtrate to produce an ammonium sulfate liquor;*

*a crystallizer to crystallize and agglomerate the ammonium sulfate liquor, resulting in ammonium sulfate crystals;*

*a centrifuge to separate the ammonium sulfate crystals from the ammonium sulfate liquor;*

*a dryer to dry the ammonium sulfate crystals;*

*a second reactor to combine and dissolve the calcium carbonate and the at least two impurities with a solvent and a second reagent, resulting in a second reacted slurry, the second reacted slurry comprising solutes of the at least two impurities, calcium, and at least one insoluble component, wherein the second reagent oxidizes ferrous iron to ferric iron, and wherein the second reagent is hydrogen peroxide;*

*a second filter to separate the at least one insoluble component from the second liquor, resulting in a second filtrate comprising the solutes of the at least two impurities and the calcium, wherein the second filtrate has a pH;*

*a third reactor to combine the second filtrate with a first base to precipitate a first metal from the second filtrate, wherein the first base is added until the pH of the second filtrate increases to a first predetermined pH, and wherein the first metal is at least one of the at least two impurities* wherein the first predetermined pH is *4, and wherein the first metal includes at least one of ferric iron, aluminum, magnesium, uranium, thorium, and scandium;*

*a third filter to separate the first metal from the second filtrate, resulting in a third filtrate comprising the calcium and a solute of the second of the at least two impurities, wherein the third filtrate has a pH;*

*a fourth reactor to combine the third filtrate with a second base to precipitate a second metal from the third filtrate, wherein the second base is added until the pH of the third filtrate increases to a second determined pH, wherein the second metal is the second of the at least two impurities;*

*a fourth filter to separate the second metal from the third filtrate, resulting in a fourth filtrate comprising the calcium;*

*a fifth reactor to combine the fourth filtrate with a soluble carbonate to precipitate calcium carbonate from the fourth filtrate, wherein the soluble carbonate is added until the pH of the fourth filtrate increases to a third predetermined pH;*

*a fifth filter to separate the calcium carbonate from the fourth filtrate; and*

*a processor that controls the pH in the one or more first reactors, the second reactor, the third reactor, the fourth reactor, and the fifth reactor, such that the first predetermined pH is 4.*

7. The system of claim [1] *6* wherein the second base includes at least one of sodium hydroxide, calcium hydroxide, potassium hydroxide, and ammonium hydroxide.

9. The system of claim [1] *6* wherein the second predetermined pH is 9.

10. The system of claim [1] *6* wherein the second metal includes at least one of manganese, lanthanum, praseodymium, cerium, neodymium, and yttrium.

11. The system of claim [1] *6* wherein the at least one insoluble component includes at least one of silicon, aluminum silicate, mullite, and carbon.

12. The system of claim [1] *6* wherein the third predetermined pH is 13.

14. The system of claim [1] *6* wherein the soluble carbonate includes at least one of sodium carbonate, carbon dioxide, ammonium carbonate, or potassium carbonate.

15. The system of claim [1] *6* wherein each of the one or more first reactors is a continuously-stirred tank reactor or a plug-flow reactor.

16. The system of claim [1] *6* wherein there is one first reactor.

17. The system of claim [1] *6* wherein there are two first reactors.

18. The system of claim [1] *6* wherein there are three first reactors.

19. The system of claim [1] *6* wherein there are four first reactors.

20. The system of claim [1] *6* wherein the second filtrate further comprises at least one of ammonium chloride and potassium chloride.

22. The system of claim [1] *6* wherein the fourth filtrate further comprises at least one of rare-earth elements, ammonium nitrate, sodium phosphate, potassium phosphate, ammonium phosphate, and sodium chloride.

23. The system of claim [1] *6* wherein the calcium carbonate separated from the fourth filtrate is in the form of nanoparticles.

*28. The system of claim 6, wherein the first metal includes uranium, thorium, or scandium.*

*29. The system of claim 28, wherein the first metal includes scandium.*

* * * * *